(12) United States Patent
Halalay et al.

(10) Patent No.: US 9,077,038 B2
(45) Date of Patent: Jul. 7, 2015

(54) LITHIUM ION BATTERIES

(71) Applicant: GM Global Technology Operations LLC, Detroit, MI (US)

(72) Inventors: Ion C. Halalay, Grosse Pointe Park, MI (US); Timothy J. Fuller, Pittsford, NY (US); Lijun Zou, Chandler, AZ (US); Thomas C. Jackson, Honeoye Falls, NY (US)

(73) Assignee: GM Global Technology Operations LLC, Detroit, MI (US)

( * ) Notice: Subject to any disclaimer, the term of this patent is extended or adjusted under 35 U.S.C. 154(b) by 280 days.

(21) Appl. No.: 13/670,028

(22) Filed: Nov. 6, 2012

(65) Prior Publication Data

US 2013/0071742 A1    Mar. 21, 2013

Related U.S. Application Data

(63) Continuation-in-part of application No. 13/348,977, filed on Jan. 12, 2012.

(60) Provisional application No. 61/432,084, filed on Jan. 12, 2011.

(51) Int. Cl.

| H01M 4/60 | (2006.01) |
|---|---|
| H01M 4/62 | (2006.01) |
| H01M 2/16 | (2006.01) |

(Continued)

(52) U.S. Cl.
CPC .............. *H01M 4/602* (2013.01); *H01M 4/622* (2013.01); *H01M 2/16* (2013.01); *H01M 2/1653* (2013.01); *H01M 4/608* (2013.01); *H01M 10/0525* (2013.01); *C08F 2/26* (2013.01); *C08F 212/14* (2013.01); *C08F 212/32* (2013.01); *C08F 12/22* (2013.01); *C08F 12/28* (2013.01); *C08F 12/34* (2013.01); *Y02E 60/122* (2013.01)

(58) Field of Classification Search
CPC ................. H01M 2300/00; H01M 2300/0017; H01M 2300/0085; H01M 2300/0088
USPC ....................................... 429/249, 247, 623.1
See application file for complete search history.

(56) References Cited

U.S. PATENT DOCUMENTS

| 5,130,211 A | 7/1992 | Wilkinson |
|---|---|---|
| 7,022,812 B2 | 4/2006 | Yoshimura et al. |

(Continued)

OTHER PUBLICATIONS

Walkowiak, et al., Macrocycle Carriers for Separation of Metal Ions in Liquid Membrane Process—A Review, Desalination 240, 1999, pp. 186-197.

(Continued)

*Primary Examiner* — Jonathan Jelsma
*Assistant Examiner* — Rashid Alam
(74) *Attorney, Agent, or Firm* — Dierker & Associates, P.C.

(57) ABSTRACT

A lithium ion battery includes a positive electrode, a negative electrode, and a microporous polymer separator soaked in an electrolyte solution. The microporous polymer separator is disposed between the positive electrode and the negative electrode. An ion exchange polymer material is any of i) incorporated as a binder in any of the positive electrode or the negative electrode, ii) deposited onto a surface of any of the positive electrode or the negative electrode, iii) incorporated into the microporous polymer separator, or iv) deposited onto a surface of the microporous polymer separator. Examples of methods for making the ion exchange polymer material for use in the lithium ion batteries are also disclosed herein.

11 Claims, 23 Drawing Sheets

(51) Int. Cl.
*H01M 10/0525* (2010.01)
*C08F 2/26* (2006.01)
*C08F 212/14* (2006.01)
*C08F 212/32* (2006.01)
*C08F 12/22* (2006.01)
*C08F 12/28* (2006.01)
*C08F 12/34* (2006.01)

(56) References Cited

U.S. PATENT DOCUMENTS 7,282,109 B2 10/2007 Takata et al.
2011/0151333 A1* 6/2011 Halalay et al. ............... 429/249

OTHER PUBLICATIONS

Komaba, et al., Inorganic Electrolyte Additives to Suppress the Degradation of Graphite Anodes by Dissolved Mn(ll) for Lithium-Ion Batteries, Journal of Power Sources 119-121, 2003, pp. 378-382.

Shahrisa, et al., CHemistry of Pyrones, Part 3: New Podands of 4H-Pyran-4-ones; 5 Molecules, 2000, pp. 200-207.

Bruening, et al., Understanding Cation-Macrocycle Binding Selectivity in Single-Solvent Extractions, and Liquid Membrane Systems by Quantifying Thermodynamic Interations; Cation Binding by Macrocycles, Chapter 2, 1990, pp. 112-113, Marcel Dekker Inc., New York and Basel.

Kaifer, et al., Redox Control of Cation Binding in Macrocyclic Systems; Cation Binding by Macrocycles, 1990, Chapert 8, p. 364, Marcel Dekker Inc., New York and Basel.

Atwood, et al., Cation Complexation by Calizarenes; Cation Binding by Macrocycles, 1990, Chapter 15, pp. 581-582, 587; Marcel Dekker Inc., New York and Basel.

Toner, et al., Modern Aspects of Host-Guest Chemistry: Molecular Modeling and Conformationally Restricted Hosts; Crown Ethers and Analogs, 1989, Chapter 3, pp. 81-83, John Wiley and Sons, New York.

Vogtle, et al., Crown-ether-complexes and Selectivity; Crown Ethers and Analogs, 1989, Chapter 4, pp. 208-215, John Wiley and Sons, New York.

Weber, E., New Developments in Crown Ether Chemistry: Lariats, Spherands, and Second-Sphere Complexes; Crown Ethers and Analogs, 1989, Chapter 5, pp. 306-307, 309, 314-315, 320-321, John Wiley and Sons, New York.

Arora, et al., Battery Separators, Chem. Rev. 104, 2004, pp. 4419-4462.

"Teijin Develops More Heat-Resistant Li-Ion Battery Separator", Trading Markets.Com, Sep. 10, 2009, 3 pages, http://www.tradingmarkets.com.

Plastics Today Staff, "TonenGeneral and Toray team up to create lithium-ion battery separator films", plasticstoday.com, Nov. 4, 2009, 2 pages, http://www.plasticstoday.com.

Montanari, F., et al., "Hydroxymethyl Derivatives of 18-Crown-6 and [2.2.2] Cryptand: Versatile Intermediates for the Synthesis of Lipophilic and Polymer-Bonded Macrocyclic Ligands," J. Org. Chem, 1982, 47, 1298-1302.

Babb, D. A., "Synthesis and Metal Ion Complexation of Synthetic Ionophores," A Ph.D. Dissertation in Chemistry, Texas Tech University, Dec. 1985, 149 pages.

Manecke, G., et al., "Polymere Kryptanden, 1", Makromol. Chem. 182, 1973-1984, (1981).

Kopolow, S., et al., "Poly(vinyl macrocyclic polyethers). Synthesis and Cation Binding Properties", vol. 6, No. 1, Jan.-Feb. 1973, pp. 133-142.

Smid, J., et al., "Synthesis of 4'-Vinylbenzocrown Ethers", Organic Preparations and Procedures Int. 8(4), 1976, pp. 193-196.

* cited by examiner

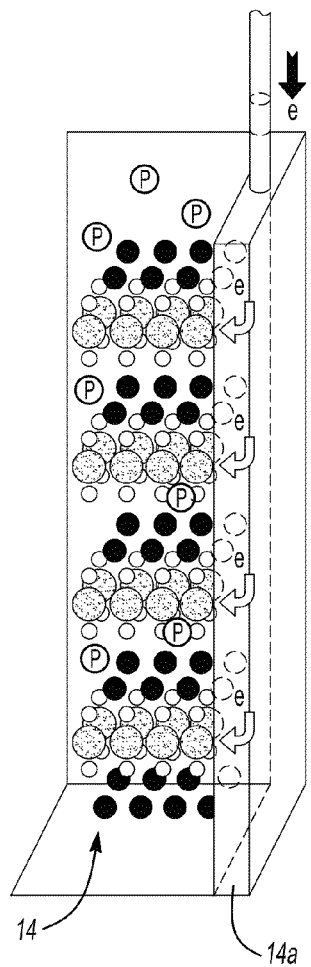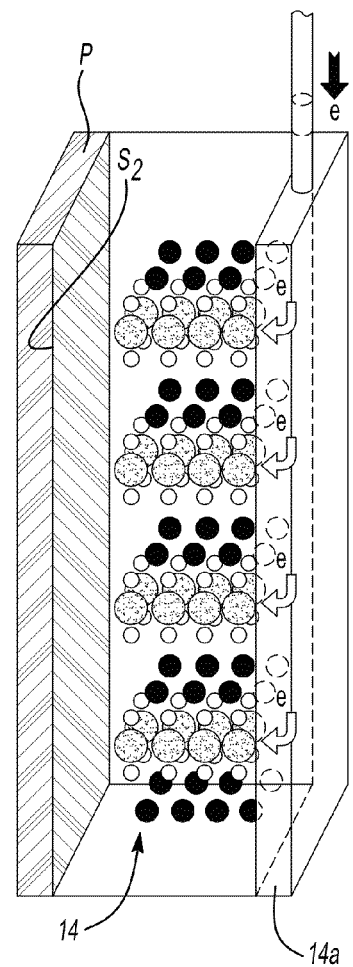
Fig-3A
Fig-3B

LITHIUM ION BATTERIES

CROSS-REFERENCE TO RELATED APPLICATIONS

This application is a continuation-in-part of U.S. patent application Ser. No. 13/348,977, entitled "Lithium Ion Battery" and filed on Jan. 12, 2012, which itself claims the benefit of U.S. Provisional Patent Application Ser. No. 61/432,084 filed Jan. 12, 2011.

TECHNICAL FIELD

The present disclosure relates generally to lithium ion batteries.

BACKGROUND

Secondary, or rechargeable, lithium ion batteries are used in many stationary and portable devices, such as those encountered in the consumer electronic, automobile, and aerospace industries. The lithium ion class of batteries has gained popularity for various reasons including a relatively high energy density, a general nonappearance of any memory effect when compared to other kinds of rechargeable batteries, a relatively low internal resistance, and a low self-discharge rate when not in use.

A lithium ion battery generally operates by reversibly passing lithium ions between a negative electrode (i.e., anode) and a positive electrode (i.e., cathode). The negative and positive electrodes are situated on opposite sides of a microporous polymer separator that is soaked with an electrolyte solution suitable for conducting lithium ions. Each of the negative and positive electrodes is also accommodated by a current collector. The current collectors associated with the two electrodes are connected by an interruptible external circuit that allows an electric current to pass between the electrodes to electrically balance the related migration of lithium ions. Further, the negative electrode may include a lithium intercalation host material, and the positive electrode may include a lithium-based active material that can store lithium ions at a higher electric potential than the intercalation host material of the negative electrode. The electrolyte solution may contain a lithium salt dissolved in a non-aqueous solvent.

A lithium ion battery, or a plurality of lithium ion batteries that are connected in series or in parallel, can be utilized to reversibly supply power to an associated load device. A brief discussion of a single power cycle beginning with battery discharge follows.

At the beginning of a discharge, the negative electrode of a lithium ion battery contains a high concentration of intercalated lithium while the positive electrode is relatively depleted. The establishment of a closed external circuit between the negative and positive electrodes under such circumstances causes the extraction of intercalated lithium from the negative anode. The extracted lithium atoms are split into lithium ions and electrons as they leave an intercalation host at the electrode-electrolyte interface. The lithium ions are carried through the micropores of the interjacent polymer separator from the negative electrode to the positive electrode by the ionically conductive electrolyte solution while, at the same time, the electrons are transmitted through the external circuit from the negative electrode to the positive electrode (with the help of the current collectors) to balance the overall electrochemical cell. This flow of electrons through the external circuit can be harnessed and fed to a load device until the level of intercalated lithium in the negative electrode falls below a workable level or the need for power ceases.

The lithium ion battery may be recharged after a partial or full discharge of its available capacity. To charge or re-power the lithium ion battery, an external power source is connected to the positive and the negative electrodes to drive the reverse of battery discharge electrochemical reactions. That is, during charging, the external power source extracts the lithium present in the positive electrode to produce lithium ions and electrons. The lithium ions are carried back through the separator by the electrolyte solution, and the electrons are driven back through the external circuit, both towards the negative electrode. The lithium ions and electrons are ultimately reunited at the negative electrode, thus replenishing it with intercalated lithium for future battery discharge.

The ability of lithium ion batteries to undergo such repeated power cycling over their useful lifetimes makes them an attractive and dependable power source.

SUMMARY

Example lithium ion batteries are disclosed herein. In one example, the lithium ion battery includes a positive electrode, a negative electrode, and a microporous polymer separator soaked in an electrolyte solution. The microporous polymer separator is disposed between the positive electrode and the negative electrode. An ion exchange polymer material is any of i) incorporated as a binder into any of the positive electrode and the negative electrode, ii) deposited onto a surface of any of the positive electrode and the negative electrode, iii) incorporated into the microporous polymer separator, or iv) deposited onto a surface of the microporous polymer separator.

Also disclosed herein are examples of methods for making the ion exchange polymer material for use in the lithium ion batteries.

BRIEF DESCRIPTION OF THE DRAWINGS

Features and advantages of examples of the present disclosure will become apparent by reference to the following detailed description and drawings, in which like reference characters (e.g., numbers, roman numerals, letters, etc.) correspond to similar, though perhaps not identical, components. For the sake of brevity, reference characters or features having a previously described function may or may not be described in connection with other drawings in which they appear. Furthermore, it is to be understood that isomers of any of the structures disclosed herein are suitable for use in the examples disclosed herein. For example, many of the structures shown are para-substituted aromatic isomers, but it is to be understood that the meta-substituted aromatic isomers may also be used.

FIG. 3A schematically illustrates an example of a positive electrode for a lithium ion battery including polymer particles incorporated therein;

FIG. 3B schematically illustrates another example of the positive electrode including a polymer layer applied to a surface of the electrode;

DETAILED DESCRIPTION

Figure 1:
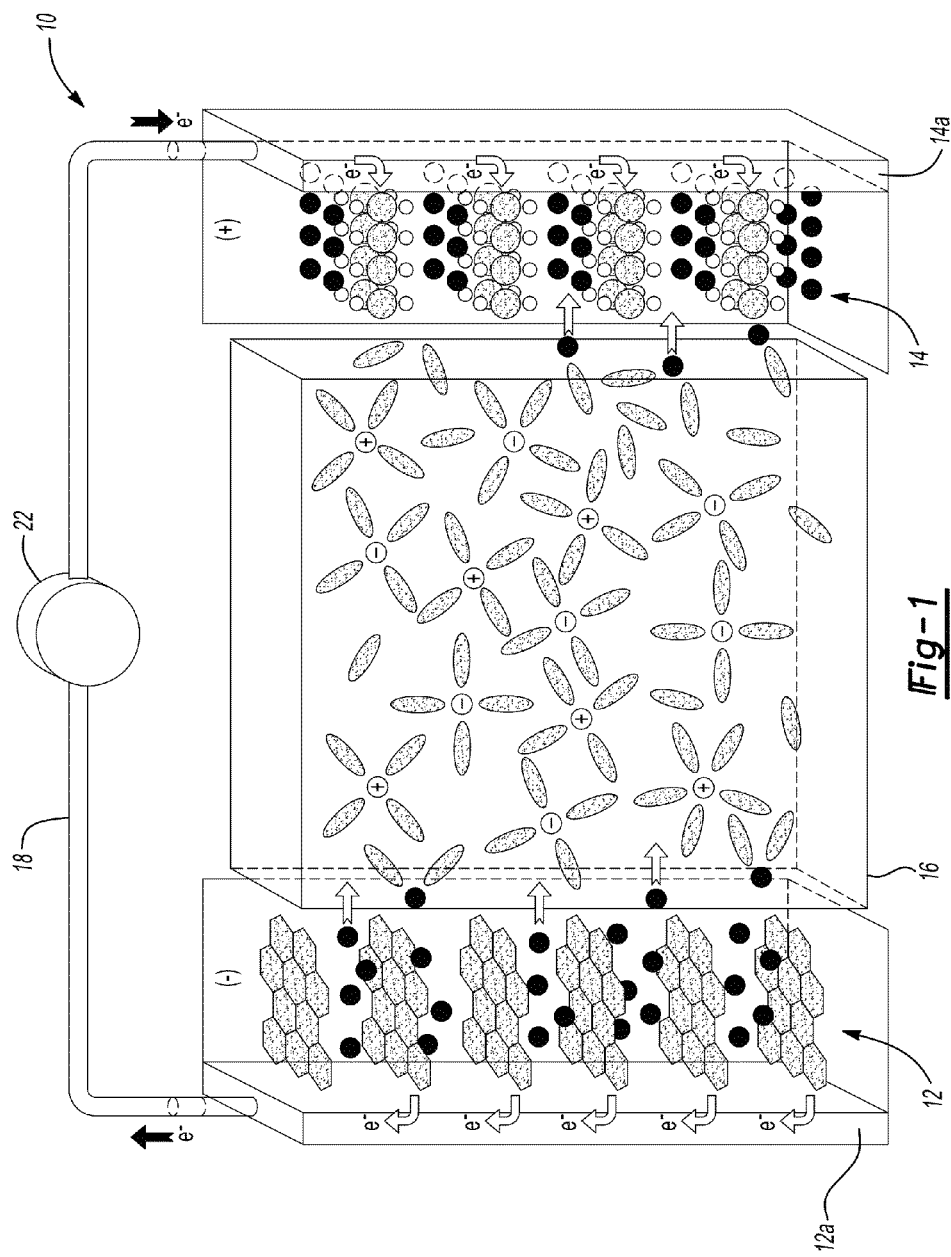
FIG. 1 schematically illustrates an example of a lithium ion battery during a discharging state.

Lithium ion batteries are used in many stationary and portable devices. The lithium ion battery generally operates by reversibly passing lithium ions between a negative electrode (sometimes called an anode) and a positive electrode (sometimes called a cathode). The negative and positive electrodes are situated on opposite sides of a microporous polymer separator soaked with an electrolyte solution that is suitable for conducting lithium ions. Each of the electrodes is also associated with respective current collectors, which are connected by an interruptible external circuit that allows an electric current to pass between the negative and positive electrodes.

It has been found that the lithium ion battery may be deleteriously affected by the presence of metal cations, e.g., by cumulative capacity reductions and/or the like. For instance, the negative electrode of the battery may be poisoned by the metal cations dissolved from the positive electrode. In one example, a graphite electrode may be poisoned by $Mn^{+2}$ cations that dissolve from spinel $Mn_2O_4$ of the positive electrode. For instance, the $Mn^{+2}$ cations may migrate through the battery electrolyte, and deposit onto the graphite electrode. When deposited onto the graphite, the $Mn^{+2}$ cations become Mn atoms. It is believed that a small amount (e.g., 1 ppm) of Mn atoms can poison the graphite electrode, and prevent reversible electrode operation and thus the useful life of the battery.

The poisoning of the lithium ion battery may be reduced or prevented by incorporating an ion exchange polymer material into the battery, where the ion exchange polymer material includes a polymer with a chelating agent tethered thereto. Suitable chelating agents are metal ionophores, which, as used herein, are chemical compounds that bind to particular ions (e.g., $Mn^{+2}$ or other cations) while allowing lithium ions to move across the microporous polymer separator. Inside the battery, the chelating agent tethered to the polymer complexes with the unwanted metal cations so that movement of lithium ions across the microporous polymer separator is not affected during operation of the battery. In an example, the chelating agent selectively complexes with the unwanted metal cations, for example, by immobilizing the metal cations (e.g., $Co^{+2}$, $Fe^{+2}$, $Mn^{+2}$, etc.) that may dissolve into the electrolyte solution from the positive electrode. The chelating agent thus operates as a metal cation scavenger molecule that traps and immobilizes the unwanted metal cations to prevent the migration of the metal cations through the electrolyte solution and to the negative electrode. It is to be understood that the chelating agents do not strongly complex with lithium ions (e.g., a single trapping site out of each one hundred sites are occupied by a Li cation compared to a Mn cation), and thus does not adversely affect the movement of lithium ions between the negative and positive electrodes.

Disclosed herein are examples of the lithium ion battery and the ion exchange polymer material, which can be incorporated into or onto the electrode(s) of the lithium ion battery and/or into or onto the microporous polymer separator of the lithium ion battery. Each of these examples will be described in reference to one or more of FIGS. 1 through 3B.

Lithium Ion Battery

An example of a secondary lithium ion battery 10 is schematically shown in FIG. 1. The battery 10 generally includes a negative electrode 12, a positive electrode 14, a microporous polymer separator 16 sandwiched between the two electrodes 12, 14, and an interruptible external circuit 18 that connects the negative electrode 12 and the positive electrode 14. Each of the negative electrode 12, the positive electrode 14, and the microporous polymer separator 16 are soaked in an electrolyte solution capable of conducting lithium ions. The microporous polymer separator 16, which operates as both an electrical insulator and a mechanical support, is sandwiched between the negative electrode 12 and the positive electrode 14 to prevent physical contact between the two electrodes 12, 14 and the occurrence of a short circuit. The microporous polymer separator 16, in addition to providing a physical barrier between the two electrodes 12, 14, ensures passage of lithium ions (identified by the black dots and by the open circles having a (+) charge in FIG. 1) and related anions (identified by the open circles having a (−) charge in FIG. 1) through the electrolyte solution filling its pores. This helps ensure that the lithium ion battery 10 functions properly. A negative-side current collector 12a and a positive-side current collector 14a may be positioned in contact with the negative electrode 12 and the positive electrode 14, respectively, to collect and move free electrons to and from the external circuit 18.

The lithium ion battery 10 may support a load device 22 that can be operatively connected to the external circuit 18. The load device 22 may be powered fully or partially by the electric current passing through the external circuit 18 when the lithium ion battery 10 is discharging. While the load device 22 may be any number of known electrically-powered devices, a few specific examples of a power-consuming load device include an electric motor for a hybrid vehicle or an all-electrical vehicle, a laptop computer, a cellular phone, and a cordless power tool. The load device 22 may also, however, be a power-generating apparatus that charges the lithium ion battery 10 for purposes of storing energy. For instance, the tendency of windmills and solar panels to variably and/or intermittently generate electricity often results in a need to store surplus energy for later use.

The lithium ion battery 10 can include a wide range of other components that, while not depicted here, are nonetheless known to skilled artisans. For instance, the lithium ion battery 10 may include a casing, gaskets, terminals, tabs, and any other desirable components or materials that may be situated between or around the negative electrode 12 and the positive electrode 14 for performance-related or other practical purposes. Moreover, the size and shape of the lithium ion battery 10, as well as the design and chemical make-up of its main components, may vary depending on the particular application for which it is designed. Battery-powered automobiles and hand-held consumer electronic devices, for example, are two instances where the lithium ion battery 10 would most likely be designed to different size, capacity, and power-output specifications. The lithium ion battery 10 may also be connected in series and/or in parallel with other similar lithium ion batteries to produce a greater voltage output and current (if arranged in parallel) or voltage (if arranged in series) if the load device 22 so requires.

The lithium ion battery 10 can generate a useful electric current during battery discharge by way of reversible electrochemical reactions that occur when the external circuit 18 is closed to connect the negative electrode 12 and the positive electrode 14 at a time when the negative electrode 12 contains a sufficiently higher relative quantity of intercalated lithium. The chemical potential difference between the positive electrode 14 and the negative electrode 12 (ranging from approximately 2.5 to 5.0 volts, depending on the exact chemical make-up of the electrodes 12, 14) drives electrons produced by the oxidation of intercalated lithium at the negative electrode 12 through the external circuit 18 towards the positive electrode 14. Lithium ions, which are also produced at the negative electrode, are concurrently carried by the electrolyte solution through the microporous polymer separator 16 and towards the positive electrode 14. The electrons flowing through the external circuit 18 and the lithium ions migrating across the microporous polymer separator 16 in the electrolyte solution eventually reconcile and form intercalated lithium at the positive electrode 14. The electric current passing through the external circuit 18 can be harnessed and directed through the load device 22 until the intercalated lithium in the negative electrode 12 is depleted and the capacity of the lithium ion battery 10 is diminished.

The lithium ion battery 10 can be charged or re-powered at any time by applying an external power source to the lithium ion battery 10 to reverse the electrochemical reactions that occur during battery discharge. The connection of an external power source to the lithium ion battery 10 compels the otherwise non-spontaneous oxidation of intercalated lithium at the positive electrode 14 to produce electrons and lithium ions. The electrons, which flow back towards the negative electrode 12 through the external circuit 18, and the lithium ions, which are carried by the electrolyte across the microporous polymer separator 16 back towards the negative electrode 12, reunite at the negative electrode 12 and replenish it with intercalated lithium for consumption during the next battery discharge cycle. The external power source that may be used to charge the lithium ion battery 10 may vary depending on the size, construction, and particular end-use of the lithium ion battery 10. Some suitable external power sources include a battery charger plugged into an AC wall outlet and a motor vehicle alternator.

The negative electrode 12 may include any lithium host material that can sufficiently undergo lithium intercalation and deintercalation while functioning as the negative terminal of the lithium ion battery 10. The negative electrode 12 may also include a polymer binder material to structurally hold the lithium host material together. For example, the negative electrode 12 may be formed of an active material, made from graphite or a low surface area amorphous carbon, intermingled with a binder, made from polyvinylidene fluoride (PVdF), an ethylene propylene diene monomer (EPDM) rubber, or carboxymethyl cellulose (CMC). These materials may be mixed with a high surface area carbon, such as acetylene black, to ensure electron conduction between the current collector 12a and the active material particles of the negative electrode 12. Graphite is widely utilized to form the negative electrode because it exhibits favorable lithium intercalation and deintercalation characteristics, is relatively non-reactive, and can store lithium in quantities that produce a relatively high energy density. Commercial forms of graphite that may be used to fabricate the negative electrode 12 are available from, for example, Timcal Graphite & Carbon (Bodio, Switzerland), Lonza Group (Basel, Switzerland), or Superior Graphite (Chicago, Ill.,). Other materials can also be used to form the negative electrode including, for example, lithium titanate. The negative-side current collector 12a may be formed from copper or any other appropriate electrically conductive material known to skilled artisans.

The positive electrode 14 may be formed from any lithium-based active material that can sufficiently undergo lithium intercalation and deintercalation while functioning as the positive terminal of the lithium ion battery 10. The positive electrode 14 may also include a polymer binder material to structurally hold the lithium-based active material together. One common class of known materials that can be used to form the positive electrode 14 is layered lithium transitional metal oxides. In various examples, the positive electrode 14 may include an active material intermingled with a polymeric binder and mixed with a high surface area carbon, such as acetylene black, to ensure electron conduction between the current collector 14a and the active material particles of the positive electrode 14. The active material may be made of at least one of spinel lithium manganese oxide ($LiMn_2O_4$), lithium cobalt oxide ($LiCoO_2$), a nickel-manganese oxide spinel [$Li(Ni_{0.5}Mn_{1.5})O_2$], a layered nickel-manganese-cobalt oxide [$Li(Ni_xMn_yCo_z)O_2$], or a lithium iron polyanion oxide, such as lithium iron phosphate ($LiFePO_4$) or lithium iron fluorophosphate ($Li_2FePO_4F$). The polymeric binder may be made of at least one of polyvinylidene fluoride (PVdF), an ethylene propylene diene monomer (EPDM) rubber, or carboxymethyl cellulose (CMC)). Other lithium-based active materials may also be utilized besides those just mentioned. Examples of those alternative materials include lithium nickel-cobalt oxide ($LiNi_xCo_{1-x}O_2$), aluminum stabilized lithium manganese oxide spinel ($Li_xMn_{2-x}Al_yO_4$), and lithium vanadium oxide ($LiV_2O_5$). The positive-side current collector 14a may be formed from aluminum or any other appropriate electrically conductive material known to skilled artisans.

Any appropriate electrolyte solution that can conduct lithium ions between the negative electrode 12 and the positive electrode 14 may be used in the lithium ion battery 10. In one example, the electrolyte solution may be a non-aqueous liquid electrolyte solution that includes a lithium salt dissolved in an organic solvent or a mixture of organic solvents. Skilled artisans are aware of the many non-aqueous liquid electrolyte solutions that may be employed in the lithium ion battery 10 as well as how to manufacture or commercially acquire them. Examples of lithium salts that may be dissolved in an organic solvent to form the non-aqueous liquid electrolyte solution include $LiClO_4$, $LiAlCl_4$, LiI, LiBr, LiSCN, $LiBF_4$, $LiB(C_6H_5)_4LiAsF_6$, $LiCF_3SO_3$, $LiN(FSO_2)_2$, $LiN(CF_3SO_2)_2$, $LiAsF_6$, $LiPF_6$, and mixtures thereof. These and other similar lithium salts may be dissolved in a variety of organic solvents such as cyclic carbonates (ethylene carbonate, propylene carbonate, butylene carbonate), linear carbonates (dimethyl carbonate, diethyl carbonate, ethylmethylcarbonate), aliphatic carboxylic esters (methyl formate, methyl acetate, methyl propionate), γ-lactones (γ-butyrolactone, γ-valerolactone), chain structure ethers (1,2-dimethoxyethane, 1-2-diethoxyethane, ethoxymethoxyethane), cyclic ethers (tetrahydrofuran, 2-methyltetrahydrofuran), and mixtures thereof.

The microporous polymer separator 16 includes, or in some examples, is a membrane, and this membrane may be formed, e.g., from a polyolefin. The polyolefin may be a homopolymer (derived from a single monomer constituent) or a heteropolymer (derived from more than one monomer constituent), and may be either linear or branched. If a heteropolymer derived from two monomer constituents is employed, the polyolefin may assume any copolymer chain arrangement including those of a block copolymer or a random copolymer. The same holds true if the polyolefin is a heteropolymer derived from more than two monomer constituents. As examples, the polyolefin may be polyethylene (PE), polypropylene (PP), a blend of PE and PP, or multi-layered structured porous films of PE and/or PP.

In another example, the membrane of the microporous polymer separator 16 (which may also be referred to herein as simply the microporous polymer separator 16) may be formed from another polymer chosen from polyethylene terephthalate (PET), polyvinylidene fluoride (PVdF), polyamides (Nylons), polyurethanes, polycarbonates, polyesters, polyetheretherketones (PEEK), polyethersulfones (PES), polyimides (PI), polyamide-imides, polyethers, polyoxymethylene (e.g., acetal), polybutylene terephthalate, polyethylenenaphthenate, polybutene, polyolefin copolymers, acrylonitrile-butadiene styrene copolymers (ABS), polystyrene copolymers, polymethylmethacrylate (PMMA), polyvinyl chloride (PVC), polysiloxane polymers (such as polydimethylsiloxane (PDMS)), polybenzimidazole (PBI), polybenzoxazole (PBO), polyphenylenes (e.g., PARMAX™ (Mississippi Polymer Technologies, Inc., Bay Saint Louis, Miss.)), polyarylene ether ketones, polyperfluorocyclobutanes, polytetrafluoroethylene (PTFE), polyvinylidene fluoride copolymers and terpolymers, polyvinylidene chloride, polyvinylfluoride, liquid crystalline polymers (e.g., VECTRAN™ (Hoechst AG, Germany) and ZENITE® (DuPont, Wilmington, Del.)), polyaramides, polyphenylene oxide, and/or combinations thereof. It is believed that another example of a liquid crystalline polymer that may be used for the membrane of the separator 16 is poly(p-hydroxybenzoic acid).

In yet another example, the membrane of the microporous separator 16 may be chosen from a combination of the polyolefin (such as PE and/or PP) and one or more of the polymers for the separator 16 listed above.

The microporous polymer separator 16 may contain a single layer or a multi-layer laminate fabricated from either a dry or wet process. For example, in one example, a single layer of the polyolefin may constitute the entirety of the microporous polymer separator 16 membrane. In another example, a single layer of one or a combination of any of the polymers from which the microporous polymer separator 16 may be formed (e.g, the polyolefin and/or one or more of the other polymers listed above for the separator 16) may constitute the entirety of the separator 16. As another example, however, multiple discrete layers of similar or dissimilar polyolefins and/or polymers for the separator 16 may be assembled into the microporous polymer separator 16. In one example, a discrete layer of one or more of the polymers may be coated on a discrete layer of the polyolefin for the separator 16. Further, the polyolefin (and/or other polymer) layer, and any other optional polymer layers, may further be included in the microporous polymer separator 16 as a fibrous layer to help provide the microporous polymer separator 16 with appropriate structural and porosity characteristics. A more complete discussion of single and multi-layer lithium ion battery separators, and the dry and wet processes that may be used to make them, can be found in P. Arora and Z. Zhang, "Battery Separators," *Chem. Rev.*, 104, 4424-4427 (2004).

Still other suitable polymer separators 16 include those that have a ceramic layer attached thereto, and those that have ceramic filler in the polymer matrix (i.e., an organic-inorganic composite matrix).

Incorporation of Ion Exchange Polymer Material into Lithium Ion Battery

The examples of the lithium ion battery 10 disclosed herein have the ion exchange polymer material incorporated therein. Various examples of how the ion exchange polymer material may be incorporated into the lithium ion battery 10 are shown and described in reference to FIGS. 2A, 2B, 3A, and 3B. In these examples, the chelating agent is not present in the lithium ion battery as a free molecule.

Figure 2A:
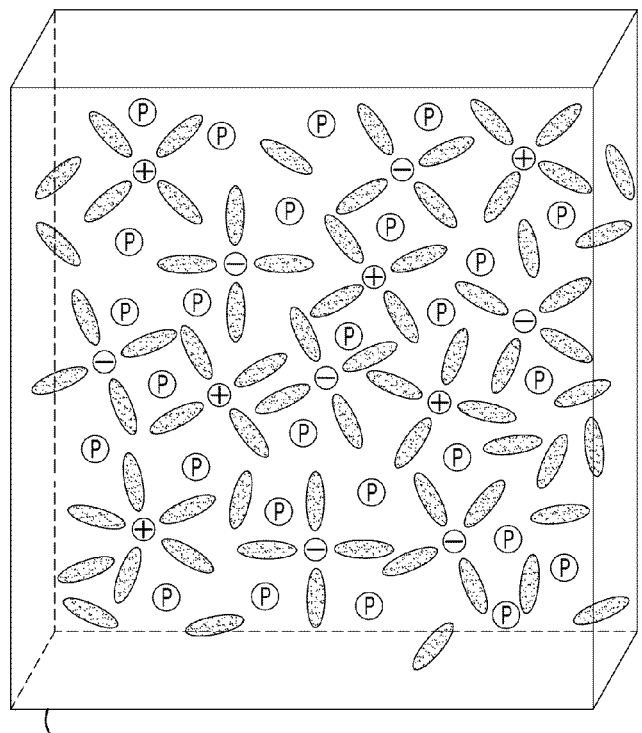
FIG. 2A schematically illustrates an example of a microporous polymer separator of a lithium ion battery including polymer particles incorporated therein.

In one example, the ion exchange polymer material (identified by the letter P) is incorporated into the microporous polymer separator 16, as shown in FIG. 2A. For instance, the ion exchange polymer material P, which may be present in granular or particle form having an effective diameter, e.g., of about 100 nanometers, is dispersed throughout the membrane of the separator 16. The ion exchange polymer material P may, for instance, be incorporated into the separator 16 during fabrication of the separator 16, such as, e.g., by extrusion or solvent casting. The ion exchange polymer material P may also be incorporated into the separator 16 by mixing the ion exchange polymer material P with the main polymer in the separator 16 formulation. The ion exchange polymer material P may function as the separator 16 when, for example, the chelating agent is tethered directly to the main polymer in the separator 16. In still another example, the ion exchange polymer material P in granular form may be floating within the electrolyte solution contained inside the separator 16. In yet another example, the chelating agent of the ion exchange polymer material P may be tethered to a ceramic (e.g., $SiO_2$ or $Al_2O_3$) that is present as a layer on the separator 16 or may be present as a filler within the separator 16.

Figure 2B:
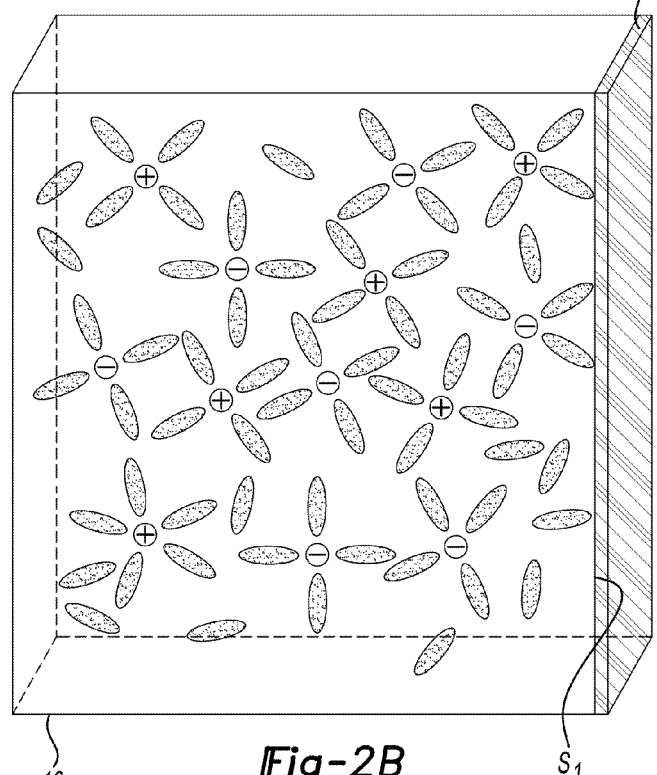
FIG. 2B schematically illustrates another example of the microporous polymer separator including a polymer layer applied to a surface of the separator.

Another example is shown in FIG. 2B, and this example includes applying the ion exchange polymer material P to a surface (e.g., surface $S_1$ as shown in FIG. 2B) of the separator 16. It is to be understood that the ion exchange polymer material P may be applied to a single surface (e.g., $S_1$ as shown in FIG. 2B), or may be applied to two or more surfaces of the separator 16 (e.g., surface $S_1$ and the surface opposed to surface $S_1$). In this example, the ion exchange polymer material P, which may originally be provided in granular form, may be coated (as a thin layer) on the surface $S_1$ of the separator 16, e.g., by dissolving the ion exchange polymer material P in an appropriate solvent, and then applying the solution to the surface $S_1$. The solvent is used to induce the formation of pores in the thin polymer layer. Another method for forming the thin layer of the ion exchange polymer material P includes providing a slurry of the ion exchange polymer material P. The slurry may include the ion exchange polymer material P in the form of insoluble, sub-micron-sized spheres (or some other geometric configuration) in a solvent and binder solution (e.g., PVdF binder in an N-methyl-2-pyrrolidone solvent). The slurry may be deposited onto a pre-existing separator 16 membrane. When the slurry is applied to (or deposited on) the surface $S_1$ of the separator 16, and upon evaporation of the solvent, the binder holds the ion exchange polymer material spheres together and provides adhesion onto the surface $S_1$ as a layer.

Yet other methods of incorporating the ion exchange polymer material P into the separator 16 (either by incorporating the ion exchange polymer material P into the membrane or electrolyte solution, or by applying the ion exchange polymer material P, as a layer, onto the membrane) includes solvent spraying, painting, dip coating, electrophoretic coating, pressure filtration, electrospinning, compression molding, or combinations thereof. In some cases, plasmas, ion etching and chemical etching with free radicals may also be used to graft the ion exchange polymer material P to the membrane.

As shown in FIGS. 3A and 3B, the ion exchange polymer material P is incorporated into (FIG. 3A), or applied to a surface of (FIG. 3B) the positive electrode 14. It is to be understood that the ion exchange polymer material P may otherwise be incorporated into, or applied to a surface of the negative electrode 12 or both of the negative and positive electrodes 12, 14. These examples, however, are not shown in the figures.

Referring now to FIG. 3A, the ion exchange polymer material P is incorporated into the positive electrode 14. In this example, the ion exchange polymer material P, again which may be present in granular form, is dispersed throughout the bulk of the positive electrode 14 material. The process(es) used to incorporate the ion exchange polymer material P into the separator 16 may also be used to incorporate the ion exchange polymer material P into the positive electrode 14.

As shown in FIG. 3B, the ion exchange polymer material P is applied to a surface (e.g., surface S₂ as shown in FIG. 3B) of the positive electrode 14. The process(es) used to apply the ion exchange polymer material P onto a surface of the separator 16 may also be used to apply the ion exchange polymer material P onto a surface of the positive electrode 14. When the ion exchange polymer material P is applied to the surface of the positive electrode 14 (and/or the negative electrode 12), it is to be understood that the surface selected may be the surface that is adjacent to the separator 16.

Ion Exchange Polymer Materials

The ion exchange polymer material P includes the polymer and the chelating agent tethered to the polymer. In an example, the polymer (sometimes depicted as ) may be chosen from any one, or a mixture of any two or more, of the materials identified above for the microporous polymer separator 16. In some instances, the polymer makes up the membrane of the separator 16. In this example, the chelating agent(s) is/are incorporated into the membrane during fabrication of the separator 16. As will be described further below, the polymer may be functionalized to introduce a functional group that the chelating agent can replace or attach to.

In another example, the polymer may be formed from a polymerizable monomer. Some examples of the polymerizable monomer include a vinyl benzene group, such as styrene, vinylbenzyl chloride (i.e., 1-(chloromethyl)-4-vinylbenzene), 1-(chloromethyl-3-vinylbenzene)), divinyl benzene, etc. Some more specific examples of the polymerizable monomer are provided below. The polymerizable monomer may include the chelating agent prior to polymerization, or the chelating agent may be attached to the polymer formed from polymerization of the monomer. Examples of the synthesis will be described further herein.

The chelating agent(s) may be any of a variety of molecules that can complex with unwanted metal cations to form stable and neutral compounds while, at the same time, not adversely affecting the flow of lithium ions between the negative and positive electrodes 12, 14. The particular chelating agent or agents may, in some instances, be chosen to selectively complex with certain metal cations that are known or expected to be present in the electrolyte solution at some point during operational lifetime of the lithium ion battery 10. For example, spinel lithium manganese oxide ($LiMn_2O_4$) that may be present in the positive electrode 14 may leach $Mn^{2+}$ cations into the electrolyte solution during normal operation of the lithium ion battery 10. These mobile $Mn^{2+}$ cations, in turn, can migrate through the electrolyte solution and across the microporous polymer separator 16 until they eventually reach the negative electrode 12. Moreover, if the negative electrode 12 is formed from graphite, the $Mn^{2+}$ cations that reach the negative electrode 12 tend to undergo a reduction reaction and deposit on the graphite surface or within the surface films covering the graphite electrode since the standard redox potential of Mn/Mn(II) is much higher than the potential at which lithium intercalation into graphite occurs. The deposition of manganese onto graphite in the negative electrode 12 catalyzes the reduction of solvent molecules at the contaminated interface of the negative electrode 12 and the electrolyte solution causing the evolution of gases. The poisoned portion of the negative electrode 12 is essentially deactivated and no longer able to facilitate the reversible gain and loss of intercalated lithium. Similarly, the dissolution of cobalt cations ($Co^{2+}$) and iron cations ($Fe^{2+}$) from lithium cobalt oxide ($LiCoO_2$) and lithium iron phosphate ($LiFePO_4$), respectively, that may be present in the positive electrode 14 can also cause capacity losses in the lithium ion battery 10 by the same or related mechanism. The leaching of $Co^{2+}$ cations may occur, in one instance, because of an ancillary chemical reaction with various adhesives normally used in the packaging of the lithium ion battery 10. The leaching of $Fe^{2+}$ cations may occur, in one instance, because of the presence of hydrofluoric acid that may be produced through the ingress and egress of water into the electrolyte solution. $Ni^{+2}$ cations may come from the mixed transition metal oxide of the positive electrode 14.

Regardless of the lithium-based active material(s) used in the positive electrode 14, the leaching rate of metal cations into the electrolyte solution may vary. The leaching rate of metal cations from positive electrode 14 may be relatively slow and require several years for the electrolyte solution to accumulate a concentration of associated metal cations measurable in parts per million (ppm). The leaching rate of metal cations from the positive electrode 14 may also, on the other hand, be relatively fast in that the concentration of associated metal cations in the electrolyte solution increases by about 0.1 weight percent per battery power cycle. The leaching of any amount of metal cations from the positive electrode 14, whether slow or fast, can nevertheless poison large areas of the graphite in the negative electrode 12 and ultimately cause a noticeable and performance-affecting reduction in capacity of the lithium ion battery 10. An amount of chelating agents effective to sequester the cumulative dissolution of metal cations into the electrolyte solution during the operational lifetime of the lithium ion battery 10 may therefore be attached to the polymer P which is incorporated into, or applied (e.g., deposited) to a surface of the microporous polymer separator 16 and/or the negative and/or positive electrodes 12, 14. The exact amount of chelating agents employed, which may vary considerably, is generally predicated on the chemistry of the lithium ion battery 10, the compositional make-up of the negative and positive electrodes 12, 14, and the expected or observed rate at which unwanted metal cations are introduced into the electrolyte solution during operation of the lithium ion battery 10.

The chelating agents may include, for example, a crown ether, a podand, a lariat ether, a calixarene, a calixcrown, or mixtures thereof. Other suitable chelating agents include bipyridine, the —$N(CH_2COO^-Li^+)_2$ group, or the ortho-phenanthroline-4-amino group. Any of these chelating agents are useful because they will not strongly complex with the relatively small lithium ions moving between the negative and positive electrodes 12, 14 because of their size and spatial constructions. Skilled artisans will generally know and understand, or be able to identify the many molecular compounds that may constitute these classes of chelating agents. A generalized description of some of these chelating agents is provided here for convenience, and many examples are provided herein.

A crown ether is a macrocyclic polyether in which the polyether ring includes oxygen donor atoms that can complex with a metal cation. Some or all of the oxygen donor atoms in the polyether ring may be exchanged for nitrogen atoms, a class of crown ethers known as azacrowns, or sulfur atoms, a class of crown ethers known as thiacrowns. The crown ether may be monocyclic, in which the crown ether forms a somewhat two-dimensional ring for complexing with a metal cation, or polycyclic, in which the crown ether forms a more three-dimensional cage for complexing with a metal cation. One example of a polycyclic crown ether is a cryptand (such as, e.g., cryptand [2.2.2], cryptand [2.2.1], and cryptand [2.1.1]). One or more oxygen atoms in the cryptand or other crown ether may also be substituted at any location along its polyether ring by any of a variety of atoms or functional groups known to those skilled in the art. For example, the crown ether may include sulfur substituted at one or more oxygen sites, or may include nitrogen substituted at one or more oxygen sites. It is believed that crown ethers having structures where i) the size of the cavity defined by the crown structure has a diameter that is close to the size of the ion (e.g., the transition metal cation) to be trapped, and ii) a permanent dipole moment possesses a maximum charge for any given separation between positive and negative charges of the structure are most desirable for use in the examples of the lithium battery disclosed herein. For instance, a chelating agent possessing a permanent dipole moment (such as crown ethers having an odd number of oxygen atoms in its polyether ring (e.g., 15-crown-5 or 21-crown-7), and further have thia- (i.e., sulfur) or aza- (i.e., nitrogen) substitutions that tend to break the symmetry of the charge distribution of a symmetric crown ether or an increase in the charge separation on an asymmetric chelating agent) will align counter-parallel to an externally applied electric field to minimize its external potential energy. This will, in effect, maximize the ion trapping ability of the crown ether.

Further, a podand is an acyclic polyether ligand that includes donor-group-bearing arms that can complex with a metal cation. A lariat ether is a crown ether that includes a donor-group-bearing side-arm that provides additional metal cation binding sites beyond those present on the polyether ring. A calixarene is a metacyclophane of methylene-bridged phenol units, and is generally found in one of a cone, partial cone, 1,2-alternate, or 1,3-alternate conformation. A calix-crown is a calixarene that includes a polyether ring that links two phenolic oxygens of the calixarene framework. The indifference these chelating agents show towards complexing with lithium ions is likely ascribed to their relatively large polyether ring or cage structures and/or the spatial orientation of their functional donor-group-bearing arms when compared to the relatively small size of lithium ions. Analogs and structurally related molecules of the chelating agents just mentioned may also be employed.

A list of some crown ethers that can complex with metal cations which may, for example, otherwise leach into the electrolyte solution from the positive electrode 14 (such as cations of manganese, cobalt, and iron) includes:

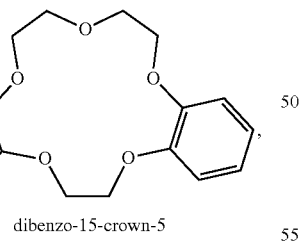
15-crown-5

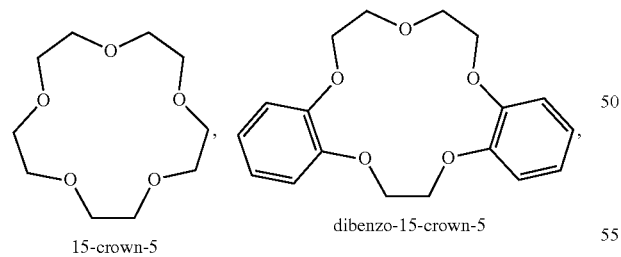
dibenzo-15-crown-5

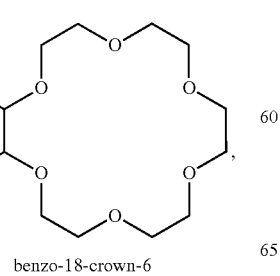
18-crown-6

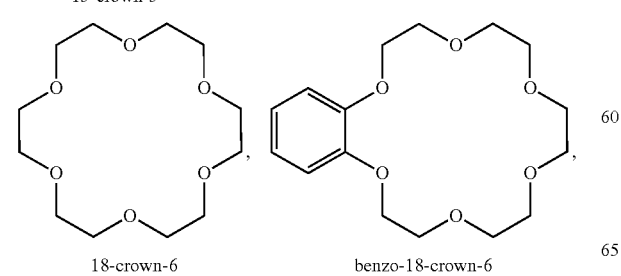
benzo-18-crown-6

-continued

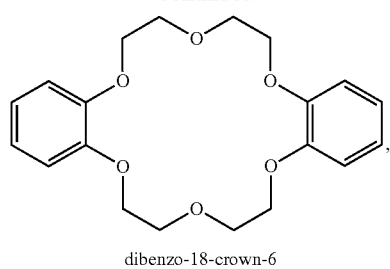
dibenzo-18-crown-6

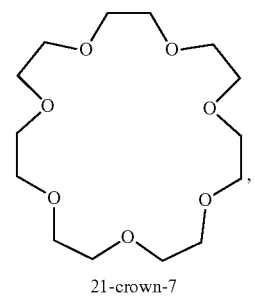
21-crown-7

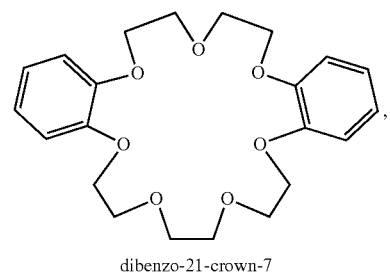
dibenzo-21-crown-7

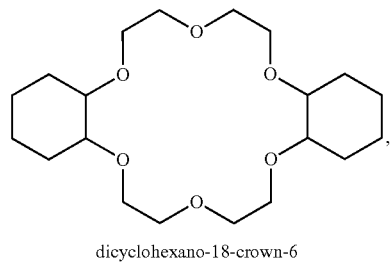
dicyclohexano-18-crown-6

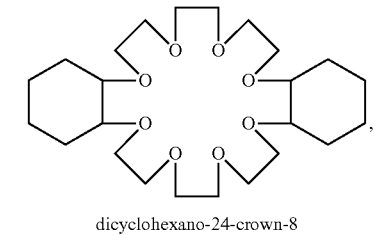
dicyclohexano-24-crown-8

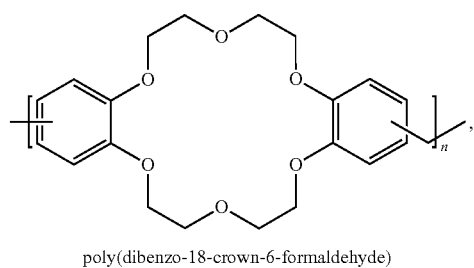
poly(dibenzo-18-crown-6-formaldehyde)

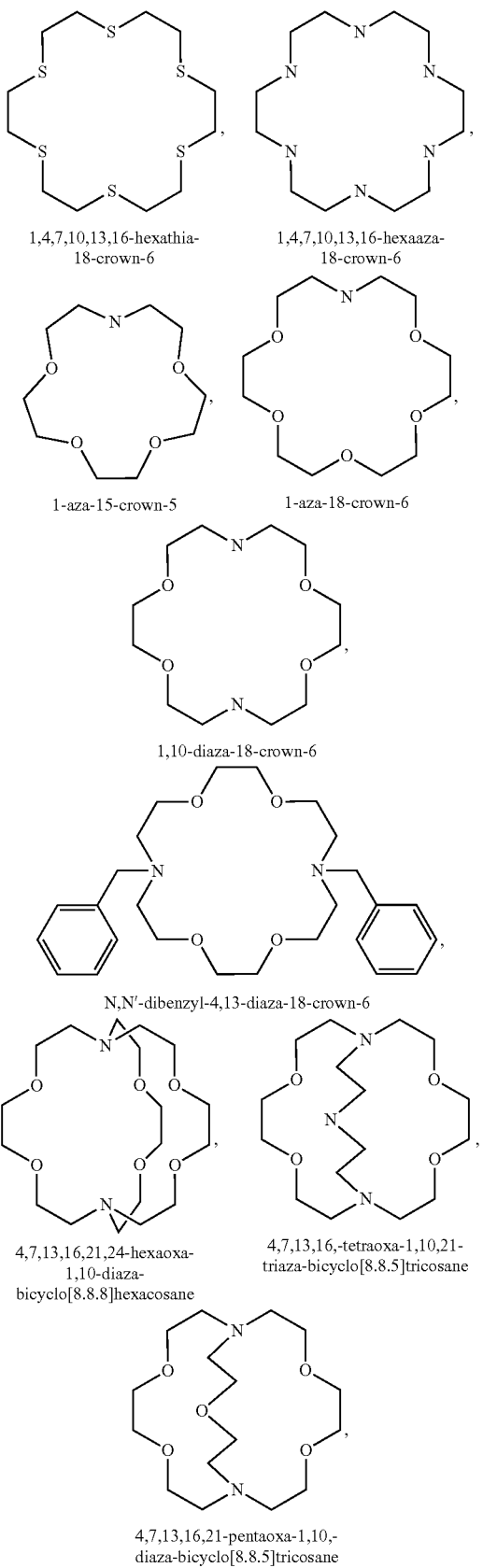

and other like structures. Any hydrogen atoms in these structures are assumed.

Some more examples of crown ethers, including thiacrowns and azacrowns, that may be attached to the polymer can be found in W. Walkowiak and C. A. Kozlowski, "Macrocycle Carriers for Separation of Metal Ions in Liquid Membrane Processes—A Review," *Desalination* 240, Table 1 on pg. 189 (compounds 1-15 that are not already mentioned above) (2009); R. L. Bruening, R. M. Izatt, and J. S. Bradshaw, "Understanding Cation-Macrocycle Binding Selectivity in Single-Solvent Extractions, and Liquid Membrane Systems by Quantifying Thermodynamic Interactions, FIG. 1 on pg. 112 in "Cation Binding by Macrocycles," Y. Inoue and G. W. Gokel (editors), Chapter 2, 1990, Marcel Dekker Inc., New York and Basel; J. L. Tonor, "Modern Aspects of Host-Guest Chemistry: Molecular Modeling and Conformationally Restricted Hosts," FIG. 2 on pg. 82 in "Crown Ethers and Analogs," S. Patai and Z. Rappaport (editors), Chapter 3, 1989, John Wiley and Sons, New York; F. Vögtle and E. Weber, "Crown-ether-complexes and Selectivity," FIGS. 1, 2, and 3 on pg. 209, 210, and 211, respectively, in "Crown Ethers and Analogs," S. Patai and Z. Rappaport (editors), Chapter 4, 1989, John Wiley and Sons, New York, the above-identified portions of each reference being hereby incorporated by reference.

A list of podands that can complex with metal cations which may, for example, otherwise leach into the electrolyte solution from the positive electrode 14 can be found in W. Walkowiak and C. A. Kozlowski, "Macrocycle Carriers for Separation of Metal Ions in Liquid Membrane Processes—A Review," *Desalination* 240, Table 2 on pg. 190 (compounds 32a and 32b) (2009); A. Shahrisa and A. Banaei, "Chemistry of Pyrones, Part 3: New Podands of 4H-Pyran-4-ones, 5 *Molecules,"* FIGS. 1 and 3 on pg. 201 (2000); and F. Vögtle and E. Weber, "Crown-ether-complexes and Selectivity," FIGS. 4, 5, 6, and 7 on pg. 212, 213, 214, and 215, respectively, in "Crown Ethers and Analogs," S. Patai and Z. Rappaport (editors), Chapter 4, 1989, John Wiley and Sons, New York, the above-identified portions of each reference being hereby incorporated by reference.

A list of lariat ethers that can complex with metal cations which may, for example, otherwise leach into the electrolyte solution from the positive electrode 14 can be found in W. Walkowiak and C. A. Kozlowski, "Macrocycle Carriers for Separation of Metal Ions in Liquid Membrane Processes—A Review," *Desalination* 240, Table 1 on pg. 189 (compounds 16-18) (2009); and E. Weber, "New Developments in Crown Ether Chemistry: Lariats, Spherands, and Second-Sphere Complexes," FIGS. 2, 4, and 6 on pg. 307, 309, and 315, respectively, in "Crown Ethers and Analogs," S. Patai and Z. Rappaport (editors), Chapter 5, 1989, John Wiley and Sons, New York, the above-identified portions of each reference being hereby incorporated by reference.

A list of calixarenes that can complex with metal cations which may, for example, otherwise leach into the electrolyte solution from the positive electrode 14 can be found in W. Walkowiak and C. A. Kozlowski, "Macrocycle Carriers for Separation of Metal Ions in Liquid Membrane Processes—A Review," *Desalination* 240, Table 2 on pg. 190 (compounds 22-23) (2009); and J. L. Atwood, "Cation Complexation by Calixarenes," FIGS. 6 and 7 on pg. 587 (the ester functionalized calixarenes) in "Cation Binding by Macrocycles," Y. Inoue and G. W. Gokel (editors), Chapter 15, 1990, Marcel Dekker Inc., New York and Basel, the above-identified portions of each reference being hereby incorporated by reference.

A list of calixcrowns that can complex with metal cations which may, for example, otherwise leach into the electrolyte solution from the positive electrode 14 can be found in W. Walkowiak and C. A. Kozlowski, "Macrocycle Carriers for Separation of Metal Ions in Liquid Membrane Processes—A Review," *Desalination* 240, Table 2 on pg. 190 (compounds 24-27, compound 28 with ester functionality, and compounds 30-31) (2009), the above-identified portions of the reference being hereby incorporated by reference.

It is believed that other known crown ethers, podands, lariat ethers, calixarenes, calixcrowns, and chelating agents not specifically mentioned here may be tethered to the polymer to form the ion exchange polymer material P that is included in the lithium ion battery 10 to sequester and immobilize unwanted metal cations that may be introduced into the electrolyte solution of the lithium ion battery 10.

Some specific examples of the ion exchange polymer material P may have the structure

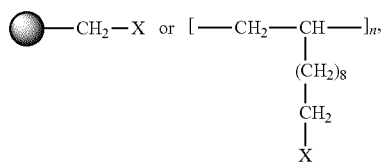

where $50<n<1000$. In these examples, X is the chelating agent that may be chosen from:

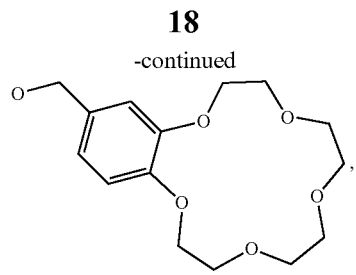
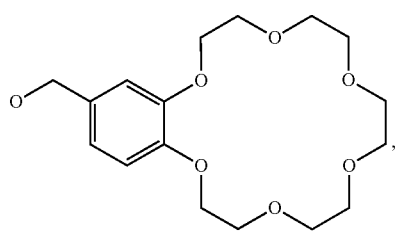
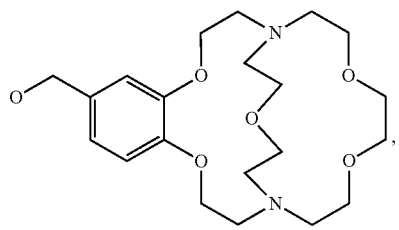
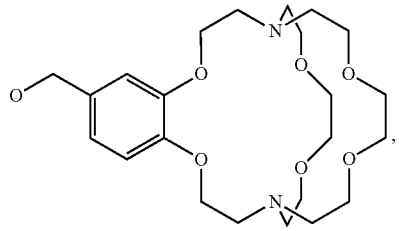
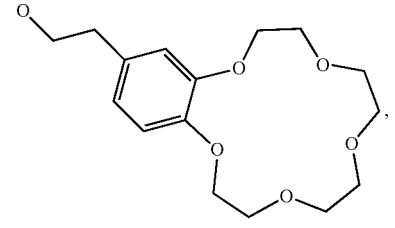
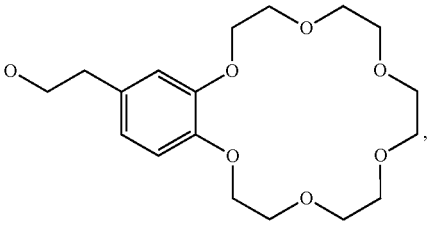
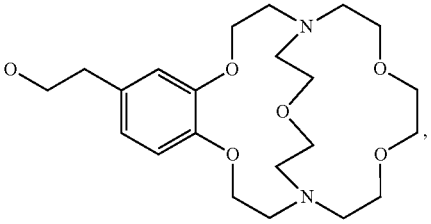

-continued
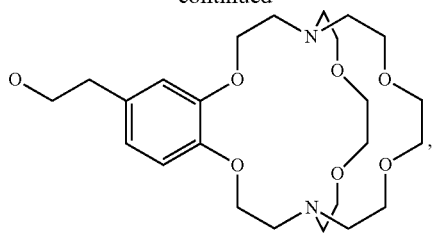
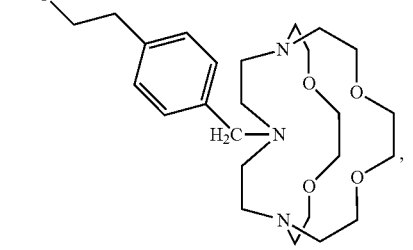
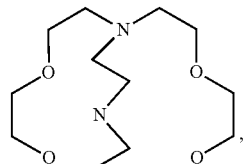
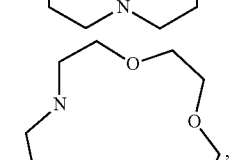
and isomers thereof. Another example of the ion exchange polymer material P has the structure
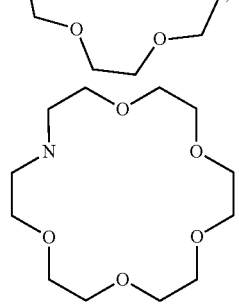
where R is the chelating agent selected from the group consisting of:

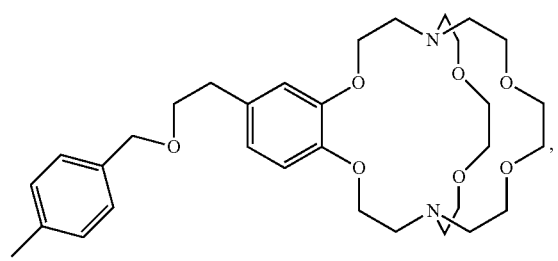,
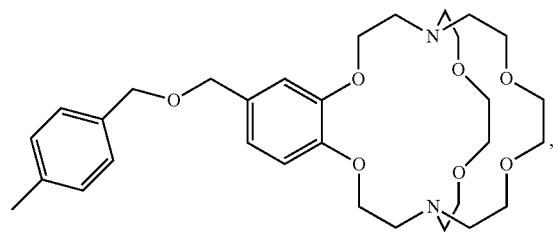,
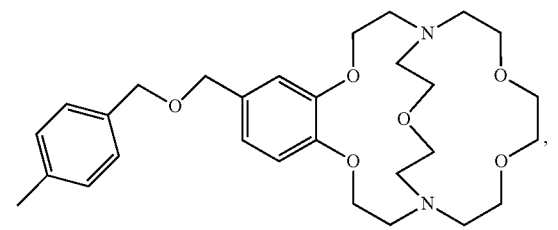,
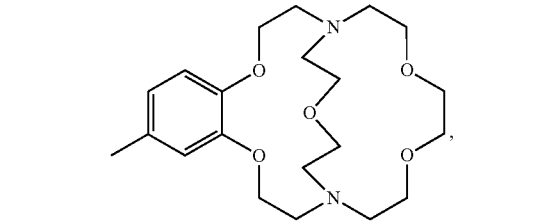,
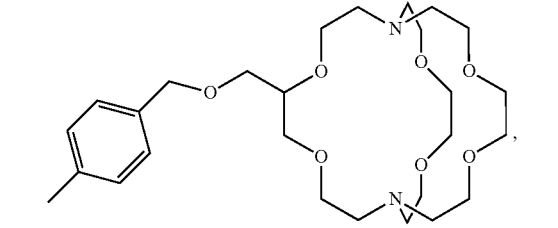,
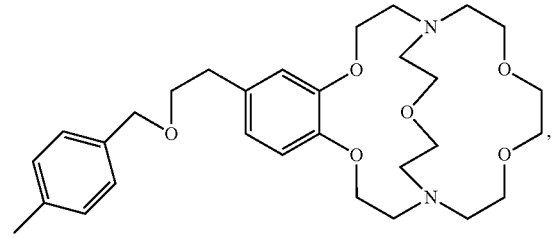,
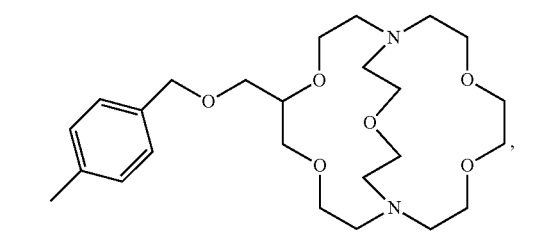,
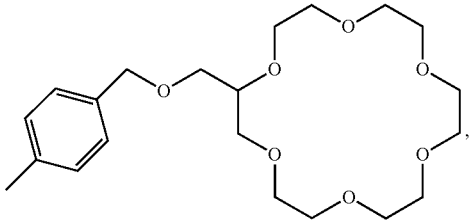,
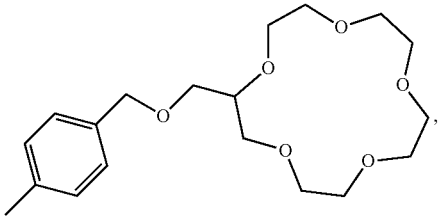,
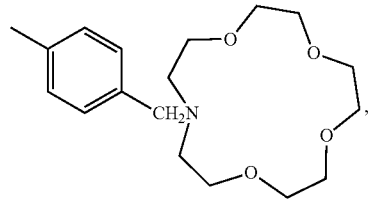,
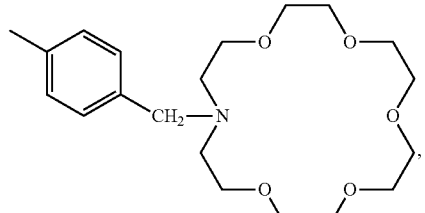,
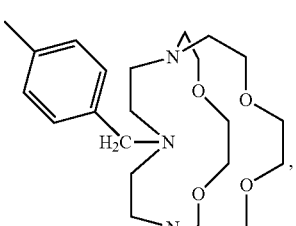,
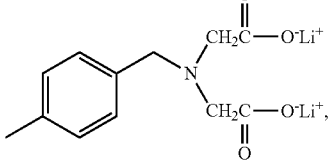
and isomers of each of these structures.
As previously mentioned, the ion exchange polymer material P may also be a polymerized monomer. In some examples, the monomer that is polymerized to form the ion exchange polymer material P has the chelating agent attached thereto. Some examples of these monomers include:

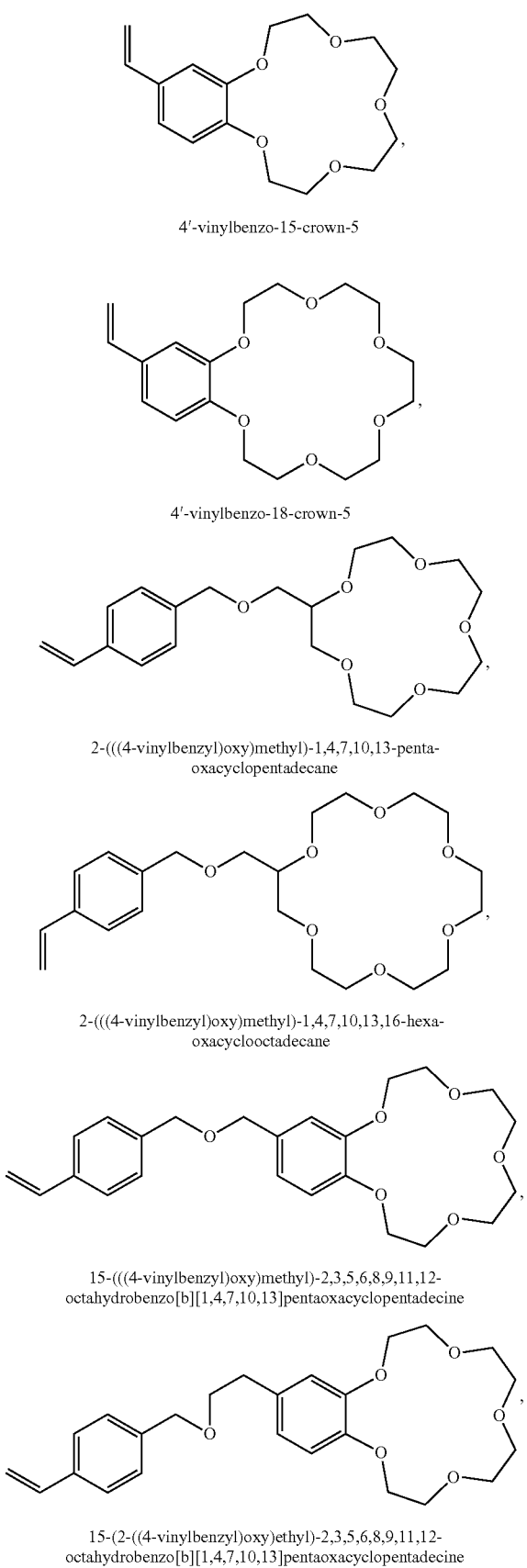

4'-vinylbenzo-15-crown-5

4'-vinylbenzo-18-crown-5

2-(((4-vinylbenzyl)oxy)methyl)-1,4,7,10,13-penta-oxacyclopentadecane 2-(((4-vinylbenzyl)oxy)methyl)-1,4,7,10,13,16-hexa-oxacyclooctadecane 15-(((4-vinylbenzyl)oxy)methyl)-2,3,5,6,8,9,11,12-octahydrobenzo[b][1,4,7,10,13]pentaoxacyclopentadecine 15-(2-((4-vinylbenzyl)oxy)ethyl)-2,3,5,6,8,9,11,12-octahydrobenzo[b][1,4,7,10,13]pentaoxacyclopentadecine

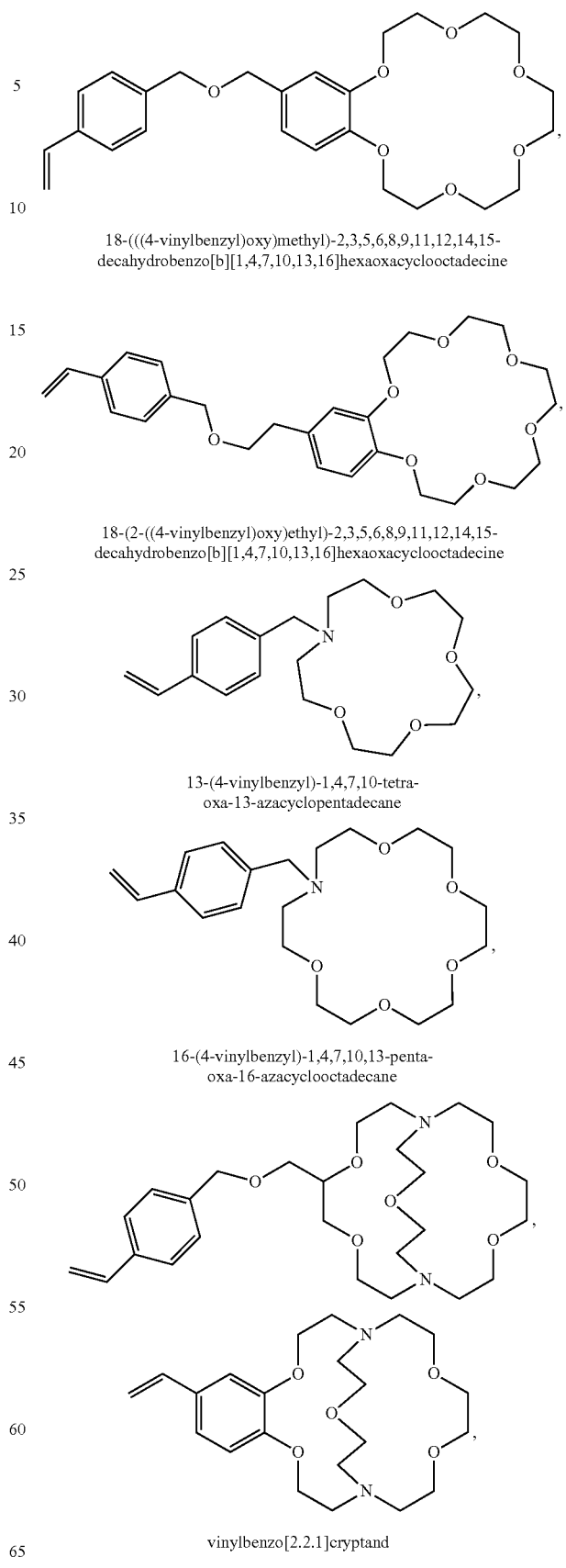

18-(((4-vinylbenzyl)oxy)methyl)-2,3,5,6,8,9,11,12,14,15-decahydrobenzo[b][1,4,7,10,13,16]hexaoxacyclooctadecine 18-(2-((4-vinylbenzyl)oxy)ethyl)-2,3,5,6,8,9,11,12,14,15-decahydrobenzo[b][1,4,7,10,13,16]hexaoxacyclooctadecine 13-(4-vinylbenzyl)-1,4,7,10-tetra-oxa-13-azacyclopentadecane 16-(4-vinylbenzyl)-1,4,7,10,13-penta-oxa-16-azacyclooctadecane vinylbenzo[2.2.1]cryptand

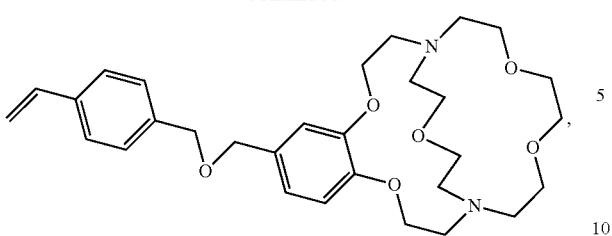
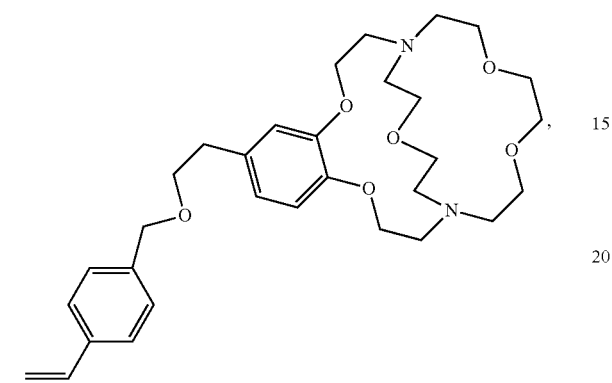
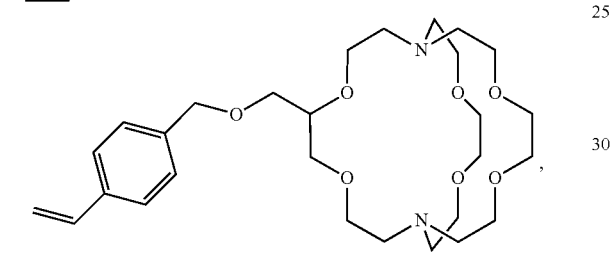
vinylbenzo[2.2.2]cryptand
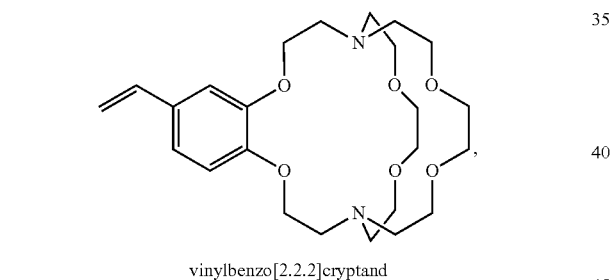
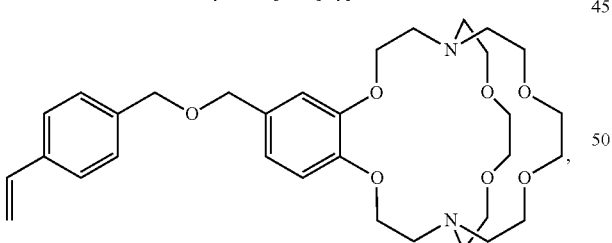
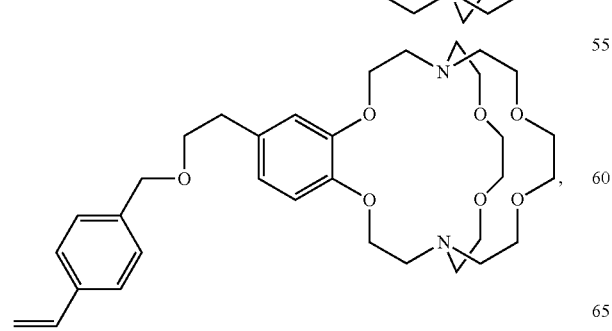
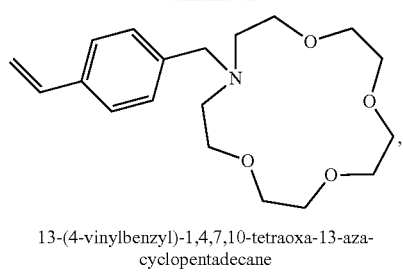
13-(4-vinylbenzyl)-1,4,7,10-tetraoxa-13-aza-cyclopentadecane
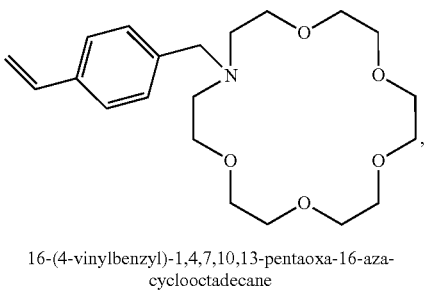
16-(4-vinylbenzyl)-1,4,7,10,13-pentaoxa-16-aza-cyclooctadecane
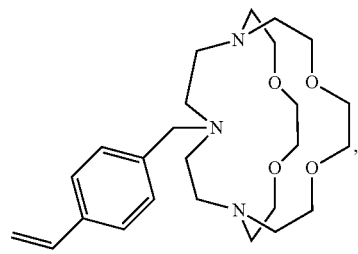
and isomers of each of these structures. Other examples of these monomers have the structure
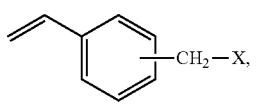
with X being any of:
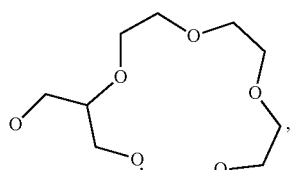
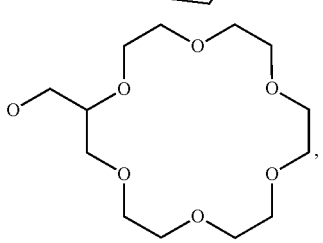

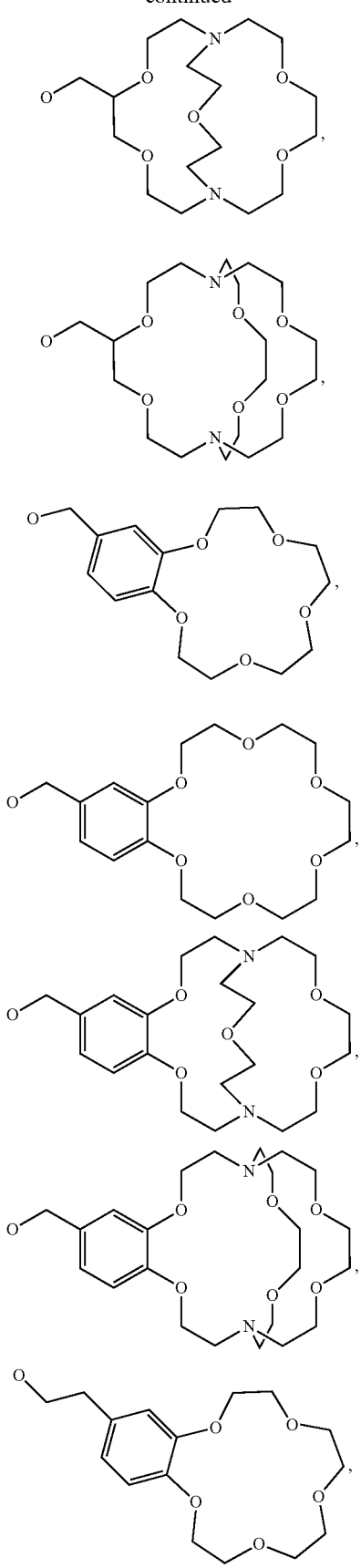
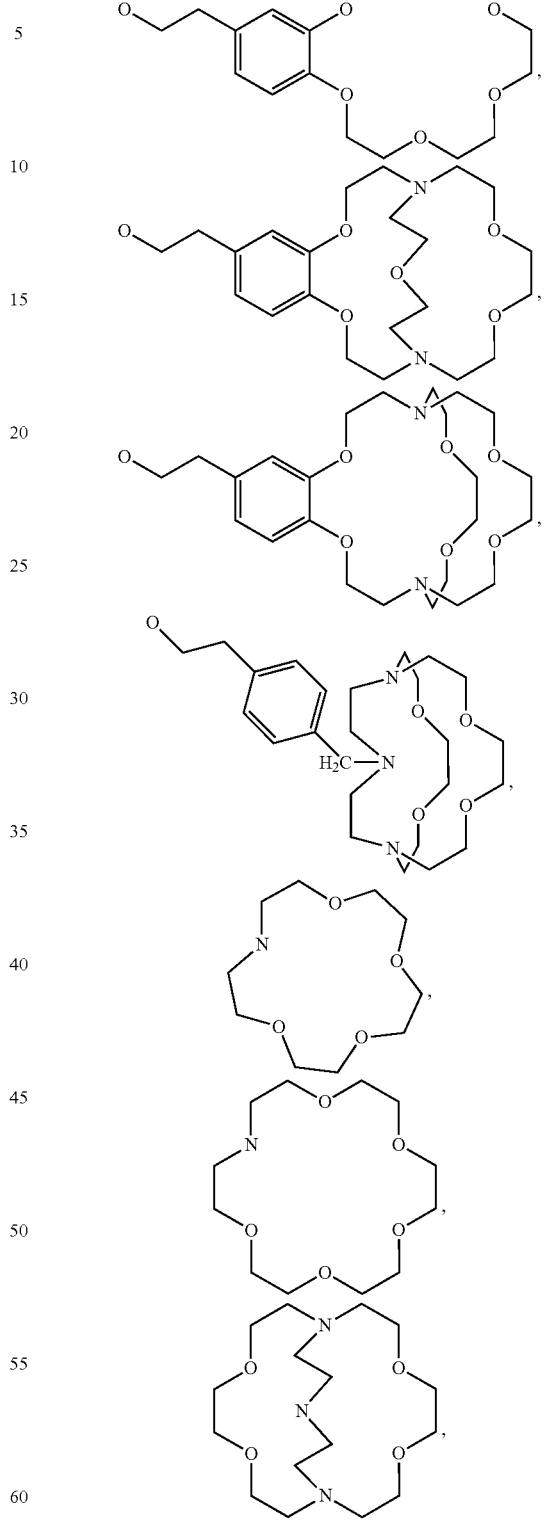
and isomers of these structures.
Still other examples of the ion exchange polymer material P disclosed herein include the polymer reacted with a hydroxy-substitited crown ether or cryptand or with an amino-substituted crown ether or cryptand so that the substituted crown ether or cryptand becomes a pendant group of the polymer. Examples of the polymers that can react with the hydroxy- or amino-substituted chelating agents include a functionalized polymer bead, such as

(where 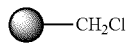 may be any of the polymers discussed herein that can be functionalized with CH₂Cl), or polymerized vinylbenzyl chloride. Examples of the hydroxy-substituted crown ethers or cryptands include:

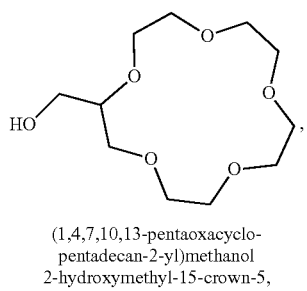

(1,4,7,10,13-pentaoxacyclo-
pentadecan-2-yl)methanol
2-hydroxymethyl-15-crown-5,

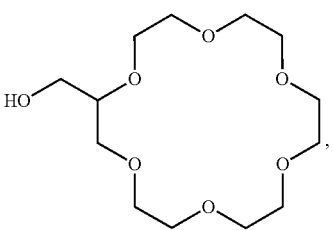

(1,4,7,10,13,16-hexaoxacyclooctadecan-
2-yl)methanol
2-hydroxymethyl-18-crown-6

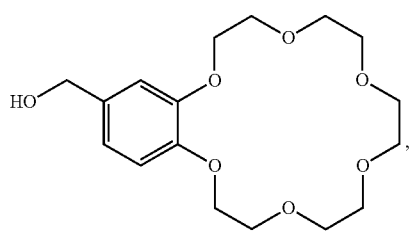

(2,3,5,6,8,9,11,12,14,15-
decahydrobenzo[b][1, 4, 7, 10, 13, 16]
hexaoxacyclooctadecin-18-yl)methanol

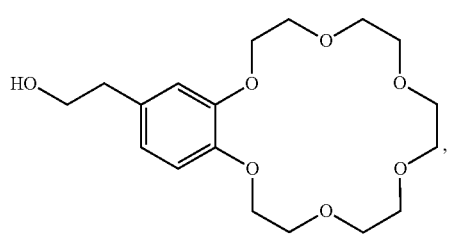

2-(2,3,5,6,8,9,11,12,14,15-
decahydrobenzo[b][1, 4, 7, 10, 13, 16]
hexaoxacyclooctadecin-18-yl)ethanol -continued

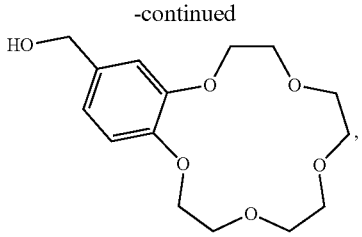

(2,3,5,6,8,9,11,12-octahydrobenzo[b]
[1,4,7,10,13]penta-oxacyclopentadecin-15-yl)
methanol

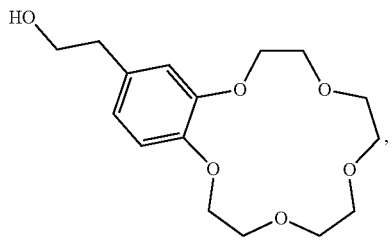

2-(2,3,5,6,8,9,11,12-octahydrobenzo[b]
[1,4,7,10,13]penta-oxacyclopentadecin-15-yl)
ethanol

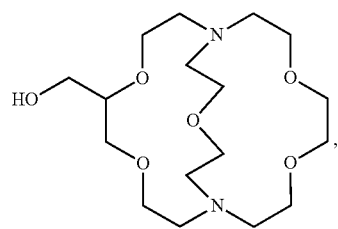

4,7,13,16,21-pentaoxa-1,10-diaza-
bicyclo[8.8.5]tricosan-5-ylmethanol
2-hydroxymethyl[2.2.1]cryptand

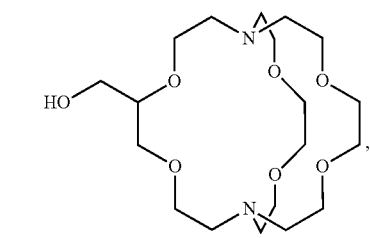

4,7,13,16,21,24-hexaoxa-1,10-
diazabicyclo[8.8.8]
hexacosan-5-ylmethanol
2-hydroxymethyl[2.2.2]cryptand

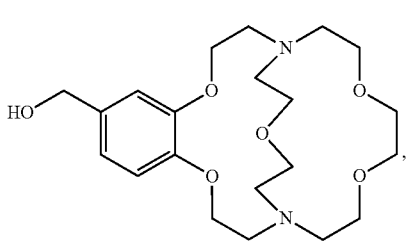

hydroxymethylbenzo[2.2.1]cryptand

-continued

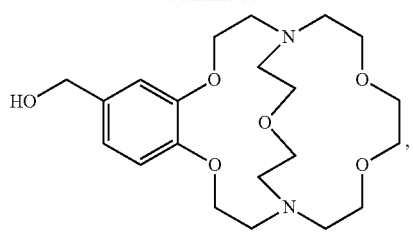

2-hydroxyethylbenzo[2.2.1]cryptand

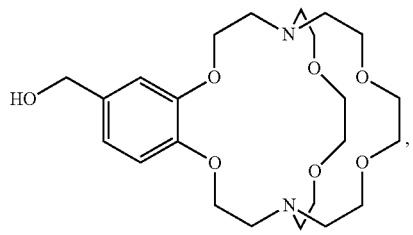

hydroxymethylbenzo[2.2.2]cryptand

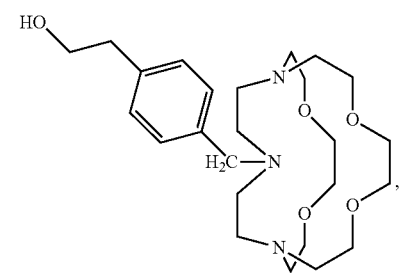

2-(4-(4,7,13,16-tetraoxa-1,1,10,21-triaza-
bicyclo[8.8.5]tricosan-21-ylmethyl)
phenyl)ethanol

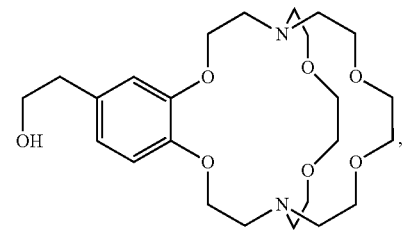

2-hydroxyethylbenzo[2.2.2]cryptand and isomers of these structures.

Examples of the amino-substituted crown ethers and cryptands include

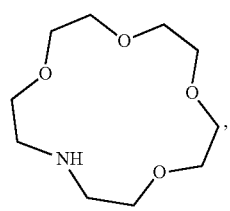

1,4,7,10-tetraoxa-13-
azacyclopentadecane

-continued

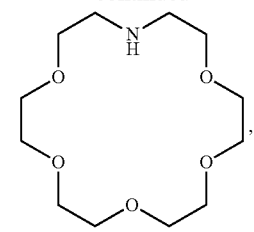

1,4,7,10,13-pentaoxa-16-
azacyclooctadecane

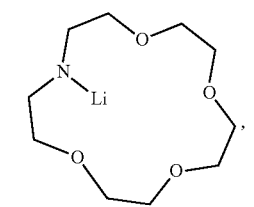

lithium 1,4,7,10-tetraoxa-13-azanidacyclo-
pentadecan-13-ide

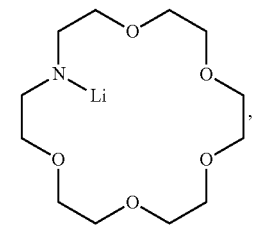

lithium 1,4,7,10,13-pentaoxa-16-azanida-
cyclooctadecan-16-ide

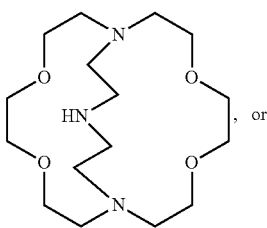

4,7,13,16-tetraoxa-1,10,21-triaza-
bicyclo[8.8.5]tricosane

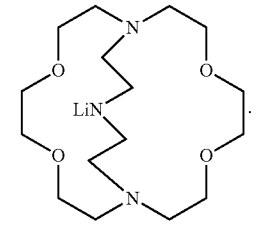

lithium 4,7,13,16-tetraoxa-1,10,21-triaza-
bicyclo[8.8.5]tricosane-21-ide

The synthesis of some examples of the ion exchange polymer material P utilizing the reaction between the polymer and the hydroxy- or amino-substituted chelating agents is further described below in the "Synthesis" section.

Any of the examples of the ion exchange polymer material P disclosed herein may be cross-linked with a cross-linking agent such as divinylbenzene,

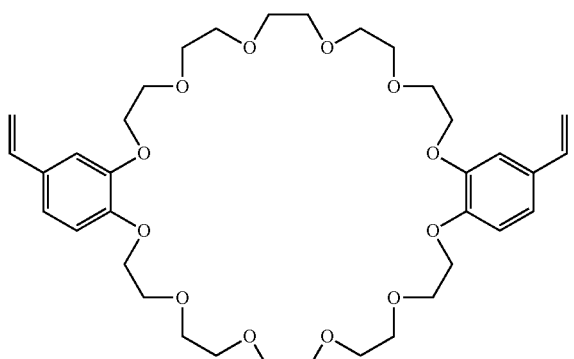

2,23-divinyl-6,7,9,10,12,13,15,16,18,19,26,27,29,30,32,33,35,36,38,39-icosahydrodibenzo[b,t][1,4,7,10,13,16,19,22,25,28,31,34]dodecaoxacyclohexatriacontine or isomers thereof, and

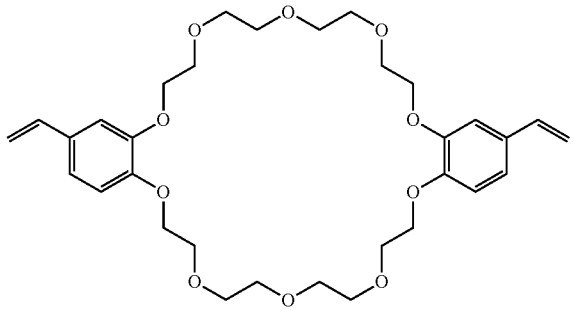

2,20-divinyl-6,7,9,10,12,13,15,16,23,24,26,27,29,30,32,33-hexadecahydrodibenzo[b,q][1,4,7,10,13,16,19,22,25,28]decaoxacyclotriacontine or isomers thereof. These cross-linking agents are dispersable in water and are suitable for use in emulsion polymerization reactions. The latter two cross-linking agents are also pore forming cross-linking agents which allow better lithium ion transfer in the polymer material P and separator 16 (see FIG. 1), as compared, for example, with divinylbenzene. The latter two cross-linking agents are also useful because they allow by-products, in the formation of the reactive crown ethers, to be consumed in a useful manner.

Ion Exchange Polymer Material—Synthesis

Also disclosed herein are example methods of forming the ion exchange polymer material P that includes a polymer having a chelating agent tethered thereto.

Figure 4:
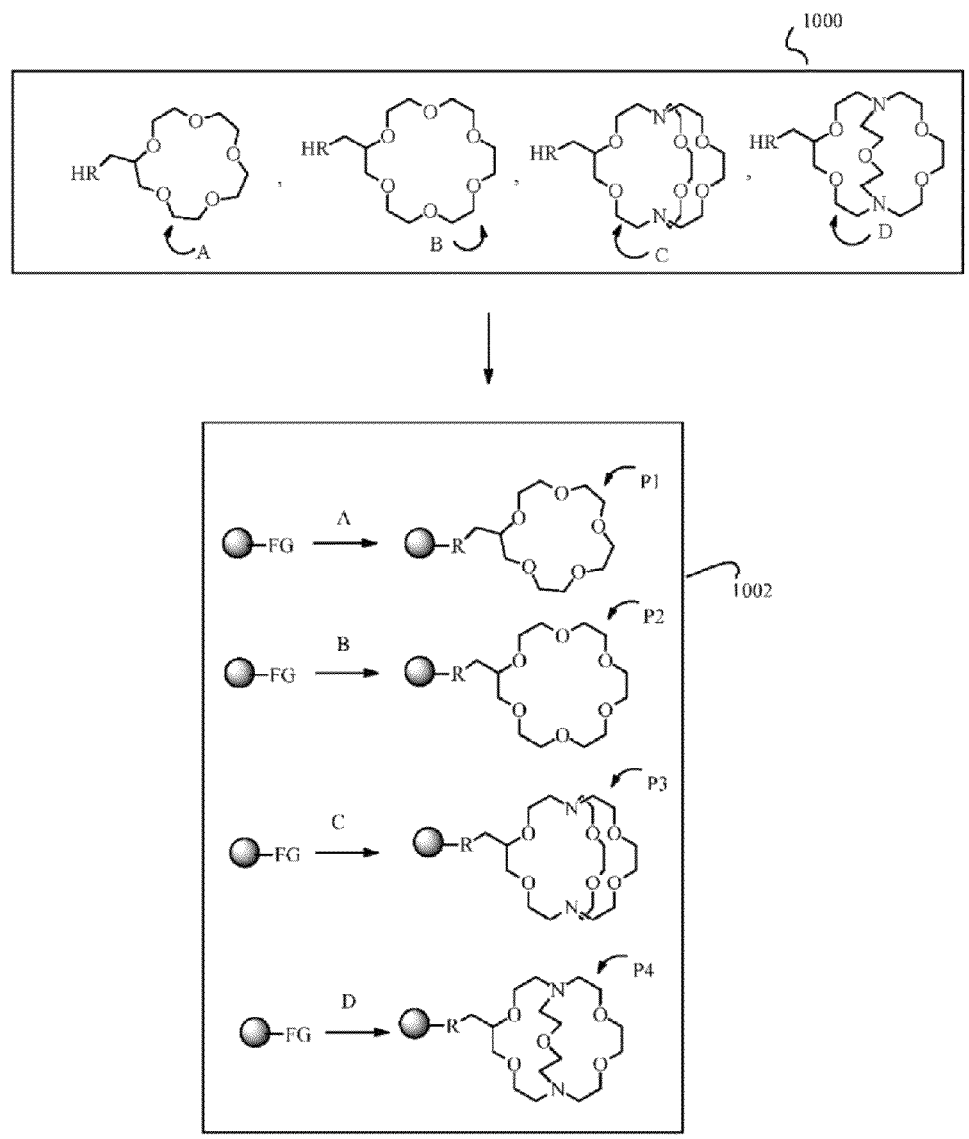
FIG. 4 is a flow diagram depicting an example of a method of forming examples of an ion exchange polymer material, where the ion exchange polymer material includes a polymer having a pendant crown ether or a pendant cryptand.

One example method of forming the ion exchange polymer material P is disclosed herein with reference to FIG. 4. This example method may be used to form the ion exchange polymer bodies P1, P2, P3, or P4. These respective structures include the polymer ◯ having one of the crown ether structures A or B, or one of the pendant structures C or D chemically bonded thereto. Ion exchange polymer material P1 includes the polymer ◯ having crown ether structure A attached thereto. When R=O, crown ether structure A is (1,4,7,10,13-pentaoxacyclopentadecan-2-yl)methanol, which is also known as 2-hydroxymethyl-15-crown-5). Ion exchange polymer material P2 includes the polymer ◯ having crown ether structure B attached thereto. When R=O, crown ether structure B is (1,4,7,10,13,16-hexaoxacyclooctadecan-2-yl)methanol, which is also known as 2-hydroxymethyl-18-crown-6. Ion exchange polymer material P3 includes the polymer ◯ having cryptand structure C attached thereto. When R=O, cryptand structure C is (4,7,13,16,21,24-hexaoxa-1,10-diazabicyclo[8.8.8]hexacosan-5-yl)methanol, which is also known as 2-hydroxymethyl-[2.2.2]cryptand. Ion exchange polymer material P4 includes the polymer ◯ having cryptand structure D attached thereto. When R=O, cryptand structure D is (4,7,13,16,21-pentaoxa-1,10-diazabicyclo[8.8.5]tricosan-5-yl)methanol, which is also known as 2-hydroxymethyl-[2.2.1]cryptand. R of each of the crown ether structures A and B and the cryptand structures C and D may be NH instead of an oxygen atom (O).

The instant example method of forming the ion exchange polymer bodies P1, P2, P3, or P4 involves first forming the crown ether (e.g., crown ethers A and B) or the cryptand (e.g., cryptands C and D). This step is shown by reference numeral 1000 in FIG. 4. The ion exchange polymer bodies P1, P2, P3, or P4 is then formed at step 1002 by replacing a functional group FG attached to the polymer ◯ with the crown ether (A or B) or the cryptand (C or D). The ion exchange polymer bodies P1, P2, P3, or P4 formed by the method shown in FIG. 4 includes the polymer ◯ having a pendant crown ether (e.g., structure A or B) or a pendant cryptand (e.g., structure C or D).

An example of a method for forming the crown ether structures A and B and for forming the cryptand structures C and D is described in Montanari, et al., "Hydroxymethyl Derivatives of 18-Crown-6 and [2.2.2] Cryptand: Versatile Intermediates for the Synthesis of Lipophilic and Polymer-Bonded Macrocyclic Ligands," *J. Org. Chem.*, 1982, 47, 1298-1302. Pages 1298-1302 of the Montanari, et al. reference are incorporated herein by reference. Another example of a method for forming the crown ether structures A and B and for forming the cryptand structures C and D is described in D. A. Babb, "Synthesis and Metal Ion Complexation of Synthetic Ionophores," A Ph.D. Dissertation in Chemistry, Texas Tech University, December, 1985. Pages 2-13, 22-32, 41-43, 46, 47, 51-60, and 77-87 of the Babb reference are incorporated herein by reference.

Figure 5A:
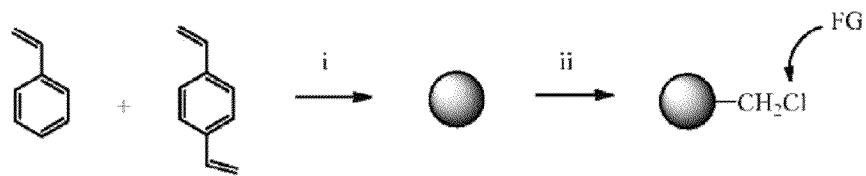
FIGS. 5A through 5C show examples of reaction pathways for forming a functionalized polymer bead.
Figure 5B:
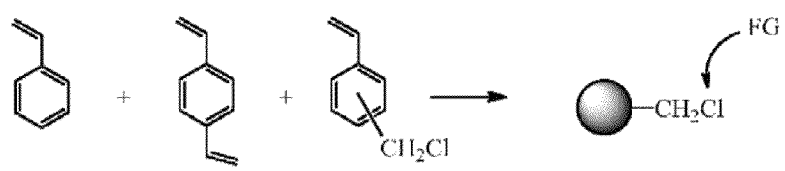

As discussed above, the polymer ◯ may be chosen from any polymer, including those polymers that are suitable for the separator 16. The polymer ◯ may, in an example, take the form of a polymer bead (as shown, e.g., in the FIG. 5 series (i.e., FIGS. 5A, 5B, and 5C), FIG. 6, and FIG. 23), a polymer particle, a polymer microfiber, or a polymer nanofiber. In one example, the polymer ◯ may be formed by polymerizing a monomer. In some instances, two or more different types of monomers are utilized. An example of the polymerization of at least two different monomers to form a polymer bead is shown in FIG. 5A. In this example, at step i, styrene and divinylbenzene are polymerized using an emulsion polymerization process to form the polymer bead ◯ of polystyrene crosslinked with divinylbenzene.

The polymer bead ◯ formed during step i in FIG. 5A may be functionalized in a separate step. Functionalization of the polymer bead ◯ (shown at step ii in FIG. 5A) includes attaching one or more functional groups FG to the polymer bead ◯. The functional group(s) FG may be chosen from bipyridine, the ortho-phenanthroline-4-amino group, the —N(CH$_2$COO$^-$Li$^+$)$_2$ group, a halogen (e.g., Br, Cl, etc.), a metal (e.g., Li, etc.), or an organic molecule including a halogen (e.g., CH$_2$Cl). In the example depicted in FIG. 5A, the functional group FG attached to the polymer bead ◯ is CH$_2$Cl.

In another example, the polymer bead ◯ is formed and functionalized during the same step. For instance, polymer bead ◯ is functionalized during the polymerization of the monomer(s), and not during a subsequent functionalization step. In the example shown in FIG. 5B, styrene, divinylbenzene, and vinylbenzyl chloride are polymerized to form the functionalized polymer bead

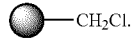

This same functionalized polymer bead

Figure 5C:
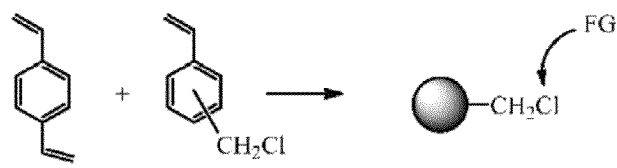

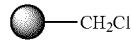

may also be formed via the method shown in FIG. 5C, where divinylbenzene and vinylbenzyl chloride are polymerized.

Figure 6:
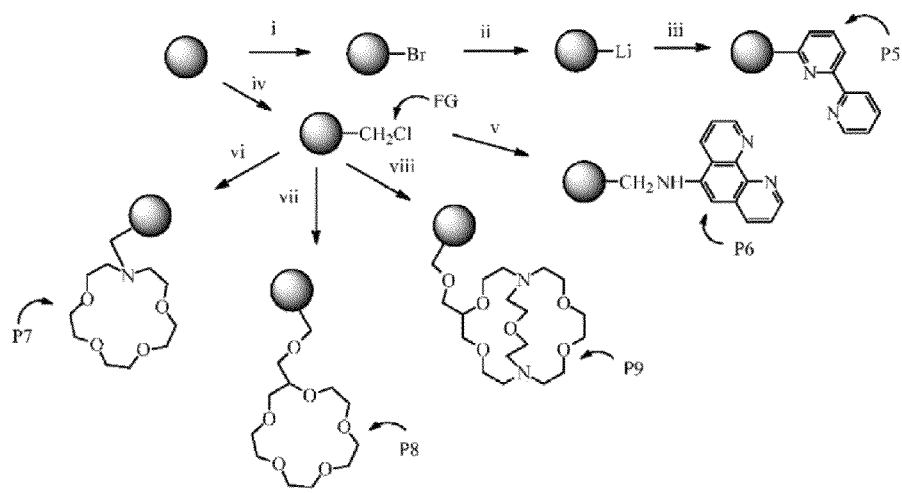
FIG. 6 shows example reaction pathways for forming various examples of the ion exchange polymer material including a polymer bead having one of several pendant chelating agents.

Another example method of the present disclosure is shown in FIG. 6. In this example method, the surface of a polymer bead ● is modified to form one of ion exchange polymer bodies P5, P6, P7, P8, and P9. In the example that includes steps i, ii and iii, the polymer bead ● is first functionalized with a bromine functional group by reacting the polymer bead ● with $Br_2/Fe/CH_2Cl_2$ (step i), and then the bromine functional group is replaced with a lithium functional group by reacting the bromine functionalized polymer bead with n-butyllithium/THF. In this example at step iii, bipyridine reacts with the lithium functionalized polymer bead and replaces the lithium group to form the ion exchange polymer material P5.

In the example shown at steps iv and v of FIG. 6, the polymer bead ● is functionalized with $CH_2Cl$ groups (at step iv) when the polymer bead is first reacted with dimethoxymethane, acetyl chloride, methanol and $SnCl_4$ in $CH_2Cl_2$. The $CH_2Cl$ functionalized polymer bead is then reacted (at step v) with ortho-phenanthroline-4-amine. This reaction results in the formation of ion exchange polymer material P6, where the Cl group of the functionalized polymer bead is replaced with an N group of ortho-phenanthroline-4-amine.

FIG. 6 also illustrates the functionalization of the polymer bead ● with an aza-crown (step vi), a crown ether (step vii), or a cryptand (step viii) after the polymer bead ● is first functionalized with $CH_2Cl$ as previously described for step iv of FIG. 6. The Cl group attached to the polymer bead ● may be, in these examples, entirely replaced with another structure. In one instance, at step vi,

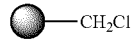

reacts with 1-aza-15-crown-5 in tetrahydrofuran (THF) to replace the Cl group with

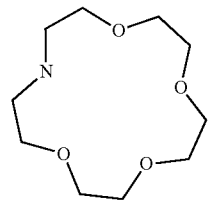 [SMILES: C1COCCOCCOCCOCCN1]

to form the ion exchange polymer material P7. In another instance, at step vii,

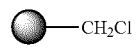

reacts with 2-hydroxymethyl-15-crown-5 (i.e., structure A shown in FIG. 4 when R=OH) in tetrahydrofuran with NaH to replace the Cl group with

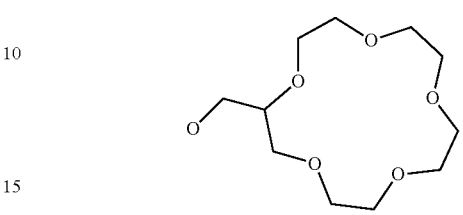

to form the ion exchange polymer material P8. In yet another instance, at step viii,

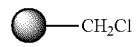

reacts with 2-hydroxymethyl[2.2.1]cryptand (i.e., structure D shown in FIG. 4 when R=OH) in tetrahydrofuran with NaH to replace the Cl group with

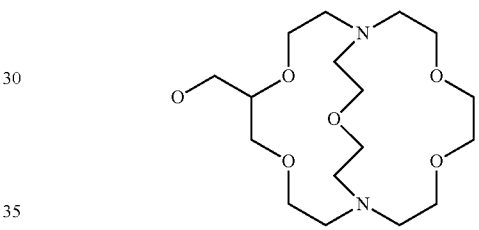

to form the ion exchange polymer material P9.

Figure 7:
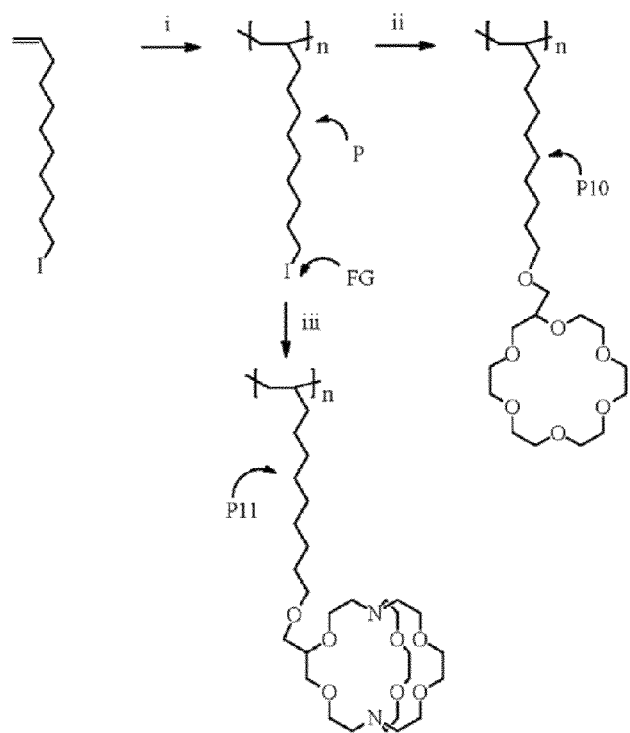
FIG. 7 shows example reaction pathways for forming various examples of the ion exchange polymer material including a polymer strand having a pendant crown ether or a pendant cryptand.
Figure 8A:
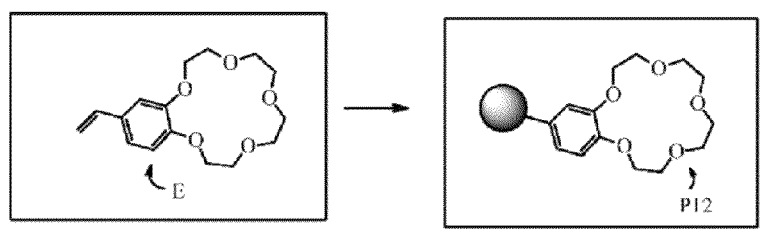
FIGS. 8A through 8F are flow diagrams depicting examples of another method of forming an ion exchange polymer material, where the ion exchange polymer material includes a polymerized crown ether.
Figure 8B:
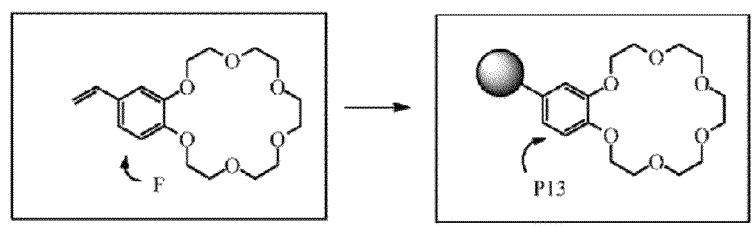
Figure 8C:
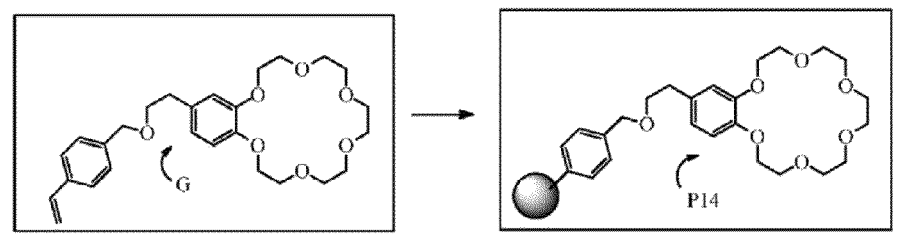
Figure 8D:
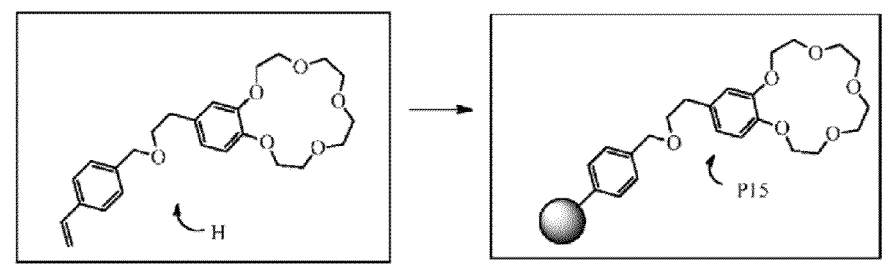
Figure 8E:
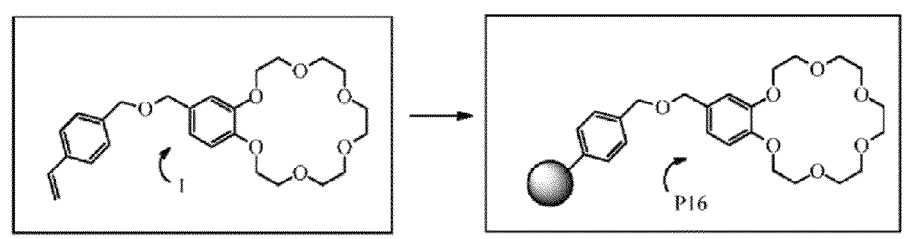
Figure 8F:
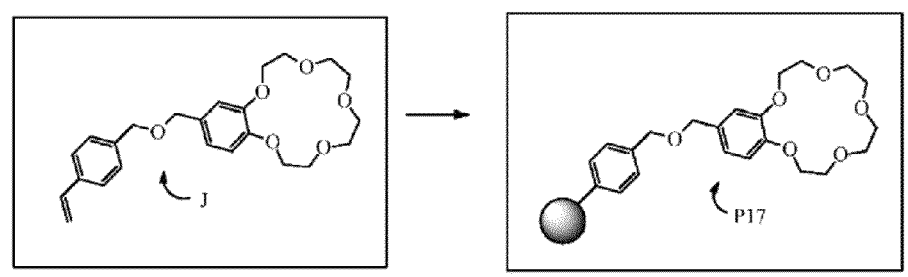
Figure 8G:
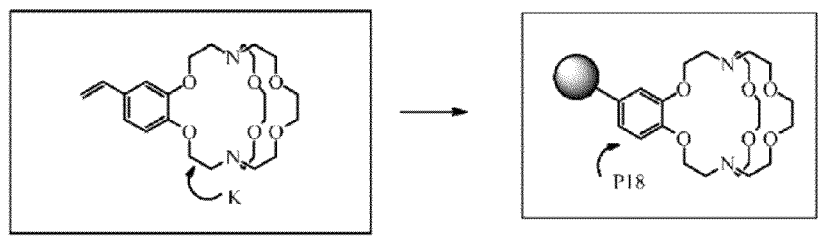
FIGS. 8G through 8M are flow diagrams depicting examples of another method of forming a ion exchange polymer material, where the ion exchange polymer material includes a polymerized cryptand.
Figure 8H:
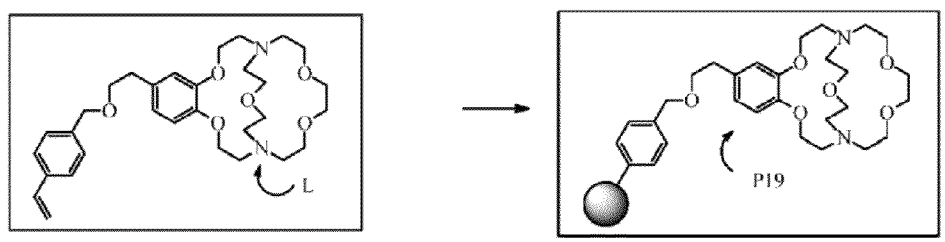
Figure 8I:
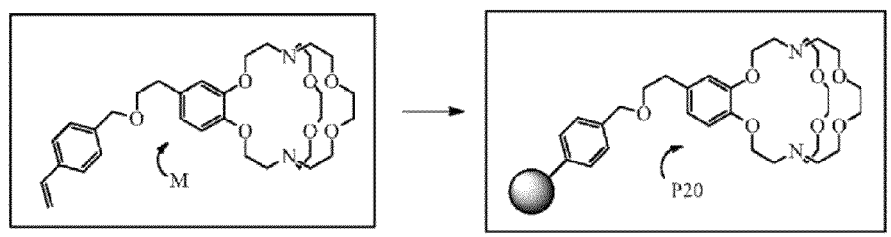
Figure 8J:
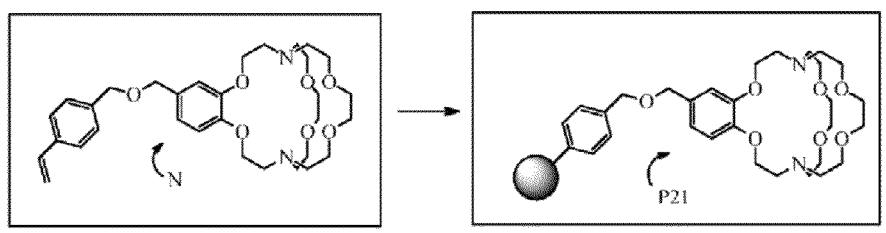
Figure 8K:
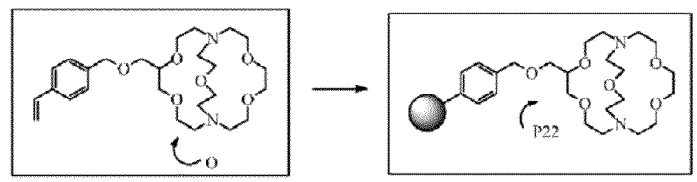
Figure 8L:
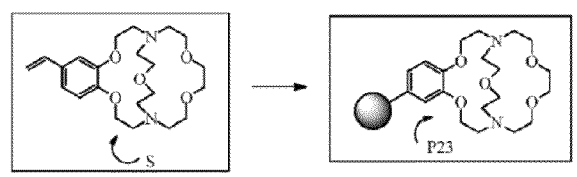
Figure 8M:
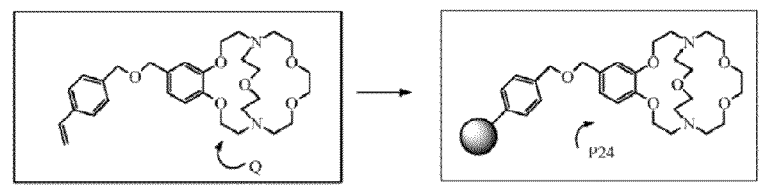

Yet another example method of forming examples of the ion exchange polymer material is depicted in FIG. 7. In this example, a 1-olefin monomer is polymerized, e.g., by Ziegler-Natta polymerization (i.e., polymerization utilizing a Ziegler-Natta catalyst based on titanium in combination with a co-catalyst based on aluminum). For instance, at step i, undecylenyl iodide is polymerized via Ziegler-Natta polymerization in the presence of a $TiCl_3$ Ziegler-Natta catalyst and a diethylaluminum choride co-catalyst. The polymerization may be accomplished in toluene to form the polyolefin structure including an iodo functional group FG. The iodo functional group FG attached to the polymer P may be replaced, for example, with the chelating agent (e.g., with a metal ionophore such as a crown ether structure or a cryptand structure). At step ii in FIG. 7, the polymer P reacts with 2-hydroxymethyl-18-crown-6 (i.e., structure B shown in FIG. 4 when R=O) in THF with NaH to replace the iodo functional group FG with an oxymethyl-18-crown-6 group to form the ion exchange polymer material P10 (i.e., which is a specific example of the ion exchange polymer material P2). In another example, at step iii in FIG. 7, the polymer P reacts with 2-hydroxymethyl-[2.2.2]cryptand) (i.e., structure C shown in FIG. 4 when R=O) to replace the iodo functional group FG with an oxymethyl-[2.2.2]cryptand group to form the ion exchange polymer material P11 (i.e., which is a specific example of the ion exchange polymer material P4).

Another example method of forming examples of the ion exchange polymer material (P12 through P24) is described hereinbelow with reference to FIGS. 8A through 8M. The example methods shown in FIGS. 8A through 8F, for example, involve forming a monomer including a crown ether (e.g., structures E, F, G, H, I, and J as shown on the left side of the arrows in each of these figures). Then, the respective monomers are polymerized to form the respective ion exchange polymer bodies having a pendant crown ether (e.g., structures P12, P13, P14, P15, P16, and P17 as shown on the right side of the arrows in each of these figures). The example methods shown in FIGS. 8G through 8M, for example, involve forming a monomer including a cryptand (e.g., structures K, L, M, N, O, S, and Q as shown on the left side of the arrows in each of these figures). The example method further involves polymerizing the respective monomers to form the respective ion exchange polymer bodies having a pendant cryptand (e.g., structures P18, P19, P20, P21, P22, P23, and P24 as shown on the right side of the arrows in each of these figures).

Examples of forming the crown ether structures E, F, G, H, I, and J and cryptand structures K, L, M, N, O, S and Q will now be described herein.

Figure 9:
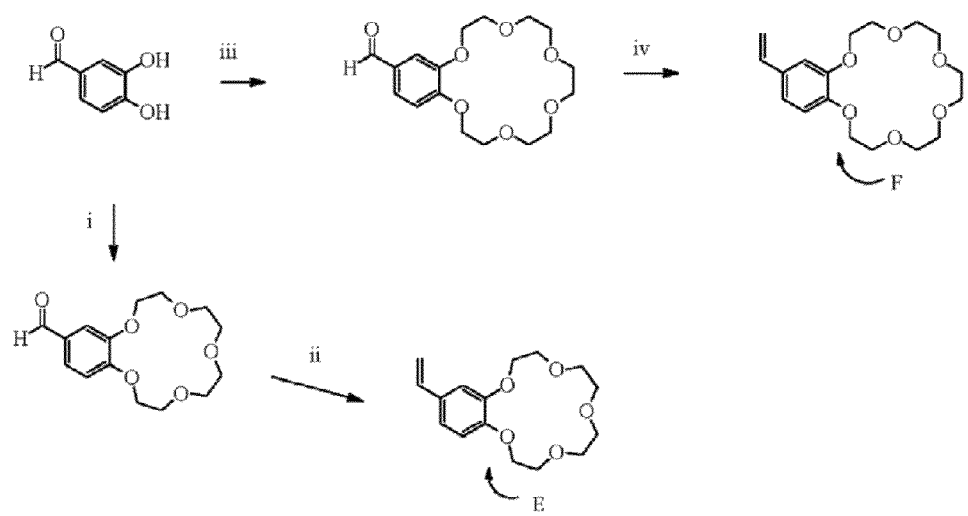
FIG. 9 shows example reaction pathways for forming 4'-vinylbenzo-15-crown-5 and 4'-vinylbenzo-18-crown-6.

FIG. 9 depicts an example reaction pathway for forming monomer E (i.e., 15-vinyl-2,3,5,6,8,9,11,12-octahydrobenzo[b][1,4,7,10,13]pentaoxacyclopentadecine or 4'vinylbenzo-15-crown-5), and an example reaction pathway for forming monomer F (i.e., 18-vinyl-2,3,5,6,8,9,11,12,14,15-decahydrobenzo[b][1,4,7,10,13,16]hexaoxacyclooctadecine or 4'-vinylbenzo-18-crown-6). The reaction pathways for forming monomers E and F are disclosed in Smid, et al., "Synthesis of 4'vinylbenzocrown Ethers," *Organic Preparations and Procedures Int.*, 1976, 8(4), 193-196, and a brief description of each of the reaction pathways is provided below.

Figure 9A:
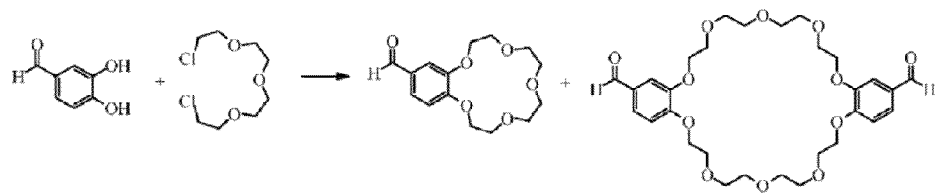
FIG. 9A shows another example reaction pathway for forming 4'-vinylbenzo-15-crown-5, where a dimer structure is formed as a byproduct.

In the example of forming monomer E as shown in FIG. 9, 3,4-dihydroxybenzaldehyde is reacted (at step i) with (ClCH$_2$CH$_2$OCH$_2$CH$_2$)$_2$O (the structure of which is shown in FIG. 9A) in 1-butanol and aqueous sodium hydroxide to form an intermediate structure 2,3,5,6,8,9,11,12-octahydrobenzo[b][1,4,7,10,13]pentaoxacyclopentadecine-15-carbaldehyde (i.e., the structure shown between steps i and ii in FIG. 9). The byproducts formed by this reaction include

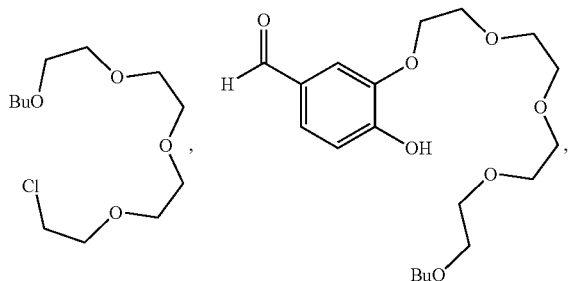

isomers of

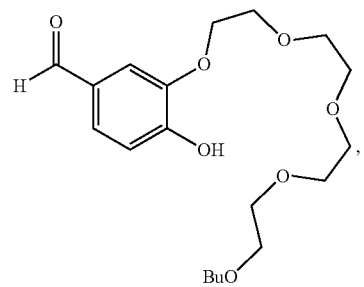

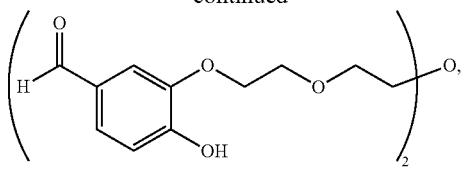

and isomers of

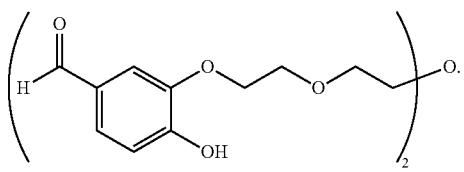

Then at step ii, the intermediate structure 2,3,5,6,8,9,11,12-octahydrobenzo[b][1,4,7,10,13]pentaoxacyclopentadecine-15-carbaldehyde is reacted with methylmagnesium bromide followed by hydrolysis to form monomer E.

Figure 9B:
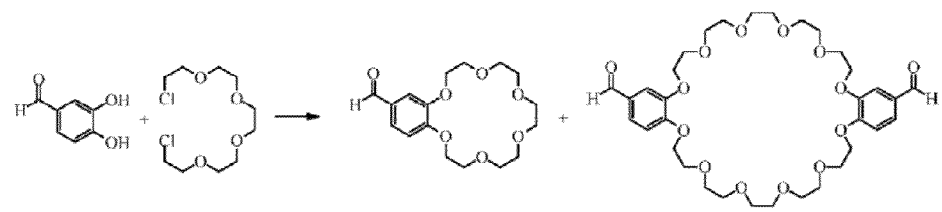
FIG. 9B shows another example reaction pathway for forming 4'-vinylbenzo-18-crown-6, where a dimer structure is formed as a byproduct.

The formation of monomer F (i.e., 18-vinyl-2,3,5,6,8,9,11,12,14,15-decahydrobenzo[b][1,4,7,10,13,16]hexaoxacyclooctadecine, which is also referred to as 4'-vinylbenzo-18-crown-6) may be accomplished using the same method as described above for forming monomer E except that 3,4-dihydroxybenzaldehyde is reacted (at step iii) with ClCH$_2$CH$_2$(OCH$_2$CH$_2$)$_4$Cl (the structure of which is shown in FIG. 9B) in 1-butanol and aqueous sodium hydroxide to form an intermediate structure 2,3,5,6,8,9,11,12,14,15-decahydrobenzo[b][1,4,7,10,13,16]hexaoxacyclooctadecine-18-carbaldehyde (i.e., the structure shown between steps iii and iv in FIG. 9). Then, at step iv, the intermediate structure 2,3,5,6,8,9,11,12,14,15-decahydrobenzo[b][1,4,7,10,13,16]hexaoxacyclooctadecine-18-carbaldehyde is reacted with methylmagnesium bromide followed by hydrolysis to form monomer F.

To eliminate unwanted byproducts (such as those mentioned above) formed during the synthesis of monomers E and F, in an example, the reactions that occur during steps i and iii of FIG. 9 may otherwise be accomplished utilizing t-butanol with potassium t-butoxide. In an example, and as shown in FIG. 9A, the reaction of 3,4-dihydroxybenzaldehyde and (ClCH$_2$CH$_2$OCH$_2$CH$_2$)$_2$O in t-butanol with potassium t-butoxide forms the intermediate structure 2,3,5,6,8,9,11,12-octahydrobenzo[b][1,4,7,10,13]pentaoxacyclopentadecine-15-carbaldehyde and the bis-formyl macrocycle structure

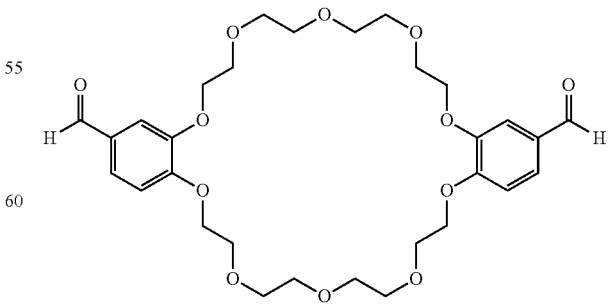

or its isomers as a byproduct. In another example, and as shown in FIG. 9B, the reaction of 3,4-dihydroxybenzaldehyde and ClCH$_2$CH$_2$(OCH$_2$CH$_2$)$_4$Cl in t-butanol with potassium t-butoxide forms the intermediate structure 2,3,5,6,8,9,11,12,14,15-decahydrobenzo[b][1,4,7,10,13,16]hexaoxacyclooctadecine-18-carbaldehyde and the bisformyl macrocycle structure

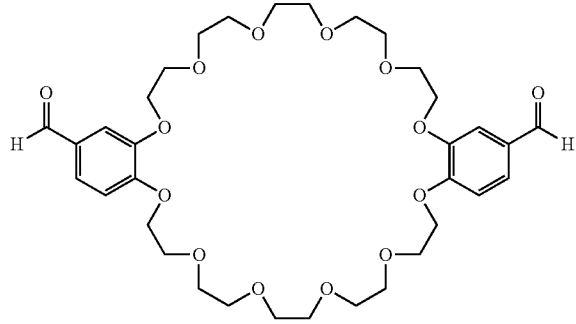 [SMILES: O=Cc1ccc2c(c1)OCCOCCOCCOCCOCCOc1cc(C=O)ccc1OCCOCCOCCOCCOCCO2]

as a byproduct.

Figure 10:
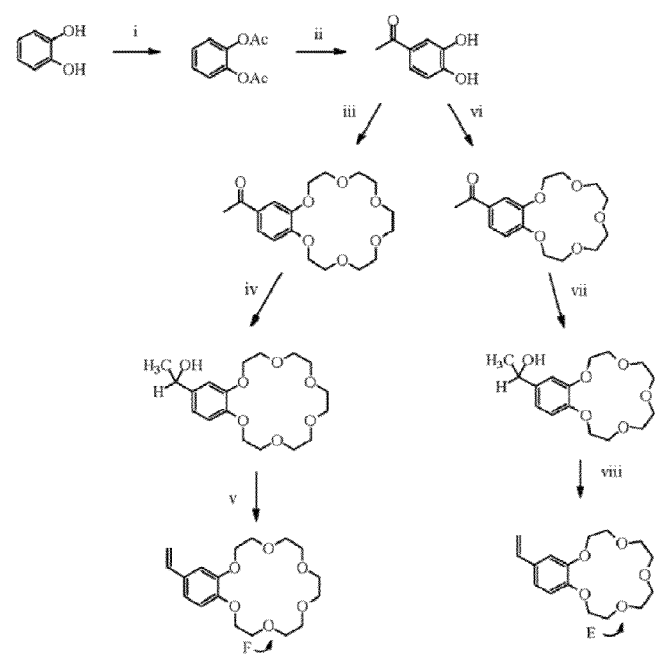
FIG. 10 shows other example reaction pathways for forming 4'-vinylbenzo-15-crown-5 and the 4'-vinylbenzo-18-crown-6.

Another example of a method of forming monomers E and F is shown in the reaction pathways depicted in FIG. 10. These reaction pathways are disclosed by Kopolow, et al., "Poly(vinylmacrocyclic polyethers). Synthesis and Cation Binding Properties," *Macromolecules*, 1973, 6, 133, and a brief description of the reaction pathways is provided herein. The synthesis of each of the monomers E and F may begin by reacting pyrocatechol with acetic anhydride to form 1,2-phenylene diacetate (step i in FIG. 10). At step ii, the 1,2-phenylene diacetate is reacted with AlCl$_3$. During this reaction, a Fries rearrangement takes place where the acetyl group of 1,2-phenylene diacetate migrates and connects directly to the benzene ring to form 1-(3,4-dihydroxyphenyl)ethanone (the structure shown immediately to the right of step ii).

When forming monomer F, the method moves to step iii, where 1-(3,4-dihydroxyphenyl)ethanone reacts with ClCH$_2$CH$_2$(OCH$_2$CH$_2$)$_4$Cl to form 1-(2,3,5,6,8,9,11,12,14,15-decahydrobenzo[b][1,4,7,10,13]hexaoxacyclooctadecin-18-yl)ethanone (the intermediate structure shown between steps iii and iv), which (at step iv) is then reacted with sodium borohydydride in ethanol to form 1-(2,3,5,6,8,9,11,12,14,15-octahydrobenzo[b][1,4,7,10,13]hexaoxacyclooctadecin-18-yl)ethanol (the intermediate structure shown between steps iv and v). At step v of FIG. 10, the intermediate structure 1-(2,3,5,6,8,9,11,12,14,15-octahydrobenzo[b][1,4,7,10,13]hexaoxacyclooctadecin-18-yl)ethanol is reacted with p-toluenesulfonic acid to form 4'-vinylbenzo-18-crown-6 (i.e., monomer F).

When forming monomer E, the method moves from step ii to step vi, where 1-(3,4-dihydroxyphenyl)ethanone is reacted with (ClCH$_2$CH$_2$OCH$_2$CH$_2$)$_2$O to form 1-(2,3,5,6,8,9,11,12-octahydrobenzo[b][1,4,7,10,13]pentaoxacyclopentadecin-15-ypethanone (the intermediate structure shown between steps vi and vii), which is then reacted with sodium borohydydride in ethanol to form 1-(2,3,5,6,8,9,11,12-octahydrobenzo[b][1,4,7,10,13]pentaoxacyclopentadecin-15-yl)ethanol (the intermediate structure shown between steps vii and viii). At step viii of FIG. 10, the intermediate structure 1-(2,3,5,6,8,9,11,12-octahydrobenzo[b][1,4,7,10,13]pentaoxacyclopentadecin-15-yl)ethanol is then reacted with p-toluenesulfonic acid to form 4'-vinylbenzo-15-crown-5 (i.e., monomer E).

Figure 11:
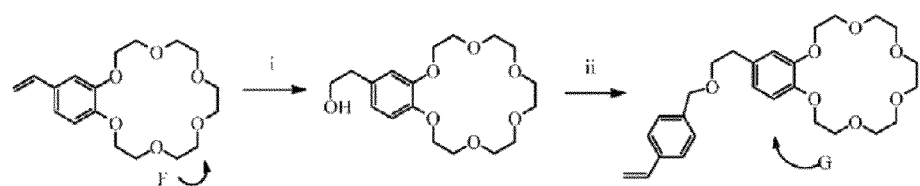
FIG. 11 shows an example reaction pathway for forming 18-(2-((4-vinylbenzyl)oxy)ethyl)-2,3,5,6,8,9,11,12,14,15-decahydrobenzo[b][1,4,7,10,13,16]hexaoxacyclooctadecine utilizing 4'-vinylbenzo-18-crown-6 as a starting material.

In an example, other crown ether monomers (e.g., monomer G) may be formed utilizing monomer F as the starting material, and yet other crown ether monomers (e.g., monomer H) may be formed utilizing monomer E as the starting material. In these examples, monomers E and F may be formed using any of the methods that were previously described. In one example, monomer G may be formed by reacting (at step i in FIG. 11) monomer F with BH$_3$ in tetrahydrofuran, and then with H$_2$O$_2$ and NaOH to form the intermediate structure 2-(2,3,5,6,8,9,11,12,14,15-decahydrobenzo[b][1,4,7,10,13,16]hexaoxacyclooctadecin-18-yl)ethanol (i.e., the structure between steps i and ii in FIG. 11). Then at step ii in FIG. 11, the intermediate structure 2-(2,3,5,6,8,9,11,12,14,15-decahydrobenzo[b][1,4,7,10,13,16]hexaoxacyclooctadecin-18-yl)ethanol is reacted with vinylbenzyl chloride to form monomer G (i.e., 18-(2-((4-vinylbenzyl)oxy)ethyl)-2,3,5,6,8,9,11,12,14,15-decahydrobenzo[b][1,4,7,10,13,16]hexaoxacyclooctadecine).

Figure 12:
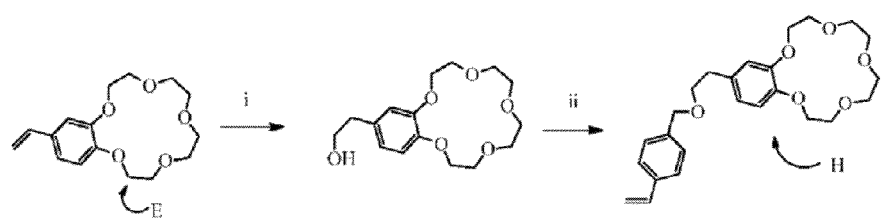
FIG. 12 shows an example reaction pathway for forming 15-(2-((4-vinylbenzyl)oxy)ethyl)-2,3,5,6,8,9,11,12-octahydrobenzo[b][1,4,7,10,13]pentaoxacyclopentadecine utilizing 4'-vinylbenzo-15-crown-5 as a starting material.

Monomer H may be formed utilizing the same method as described above for forming monomer G; however monomer E is used as the starting material. This example is shown in FIG. 12. At step I in FIG. 12, monomer E is reacted with BH$_3$ in tetrahydrofuran, H$_2$O$_2$, and NaOH to form the intermediate structure 2-(2,3,5,6,8,9,11,12-octahydrobenzo[b][1,4,7,10,13]pentaoxacyclopentadecin-15-yl)ethanol (i.e., the structure between steps i and ii in FIG. 12). Then at step ii, the intermediate structure 2-(2,3,5,6,8,9,11,12-octahydrobenzo[b][1,4,7,10,13]pentaoxacyclopentadecin-15-yl)ethanol is reacted with vinylbenzyl chloride to form monomer H (i.e., 15-(2-((4-vinylbenzyl)oxy)ethyl)-2,3,5,6,8,9,11,12-octahydrobenzo[b][1,4,7,10,13]pentaoxacyclopentadecine).

Figure 13:
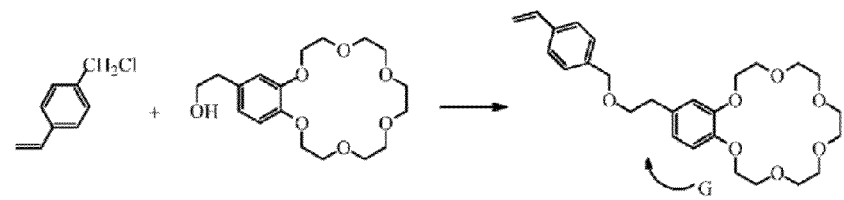
FIG. 13 shows another example reaction pathway for forming 18-(2-((4-vinylbenzyl)oxy)ethyl)-2,3,5,6,8,9,11,12,14,15-decahydrobenzo[b][1,4,7,10,13,16]hexaoxacyclooctadecine utilizing the 4'-vinylbenzo-18-crown-6 structure as a starting material.

Monomer G (i.e., 18-(2-((4-vinylbenzyl)oxy)ethyl)-2,3,5,6,8,9,11,12,14,15-decahydrobenzo[b][1,4,7,10,13,16]hexaoxacyclooctadecine) may be formed (e.g., at step ii in FIG. 11) as shown in FIG. 13. As illustrated, vinylbenzyl chloride is reacted with 2-(2,3,5,6,8,9,11,12,14,15-decahydrobenzo[b][1,4,7,10,13,16]hexaoxacyclooctadecin-18-yl)ethanol in THF with NaH to form monomer G. The 2-(2,3,5,6,8,9,11,12,14,15-decahydrobenzo[b][1,4,7,10,13,16]hexaoxacyclooctadecin-18-yl)ethanol starting material may be formed from monomer F as previously described in conjunction with step i of FIG. 11.

Figure 14:
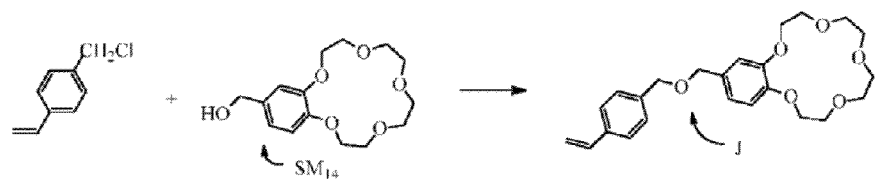
FIG. 14 shows an example reaction pathway for forming 15-(((4-vinylbenzyl)oxy)methyl)-2,3,5,6,8,9,11,12-octahydrobenzo[b][1,4,7,10,13]pentaoxacyclopentadecine.
Figure 15:
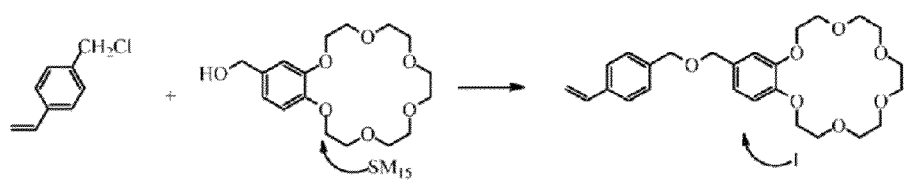
FIG. 15 shows an example reaction pathway for forming 18-(((4-vinylbenzyl)oxy)methyl)-2,3,5,6,8,9,11,12,14,15-decahydrobenzo[b][1,4,7,10,13,16]hexaoxacyclooctadecine.

Monomer J may be formed as shown in FIG. 14. In this example, the starting material labeled SM14 is formed via the reaction of 2,3,5,6,8,9,11,12-octahydrobenzo[b][1,4,7,10,13]pentaoxacyclopentadecine-15-carbaldehyde (i.e., the intermediate structure shown between steps i and ii in FIG. 9) with BH$_3$ and then an acid (e.g., acetic acid). Starting material SM14 is then reacted with vinylbenzyl chloride and NaH in THF to form monomer J (i.e., 2-(((4-vinylbenzyl)oxy)methyl)-1,4,7,10,13-pentaoxacyclopentadecane). Monomer I is formed similarly to monomer J, except that starting material SM15 is used. This is shown in FIG. 15. Starting material SM15 may be formed by reacting 2,3,5,6,8,9,11,12,14,15-decahydrobenzo[b][1,4,7,10,13,16]hexaoxacyclooctadecine-18-carbaldehyde (i.e., the structure shown between steps iii and iv in FIG. 9) with BH$_3$ in THF and an acid (e.g., acetic acid). Starting material SM15 is then reacted with vinylbenzyl chloride and NaH in THF to form monomer I (i.e., 2-(((4-vinylbenzyl)oxy)methyl)-1,4,7,10,13,16-hexaoxacyclooctadecane).

Figure 16:
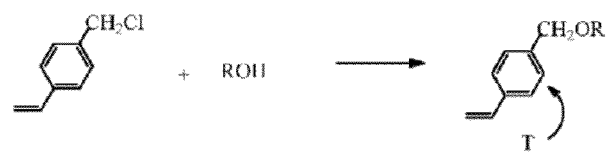
FIG. 16 shows an example reaction pathway for forming a vinylbenzyloxymethylcrown ether utilizing a crown ether structure as a starting material.
Figure 16A:
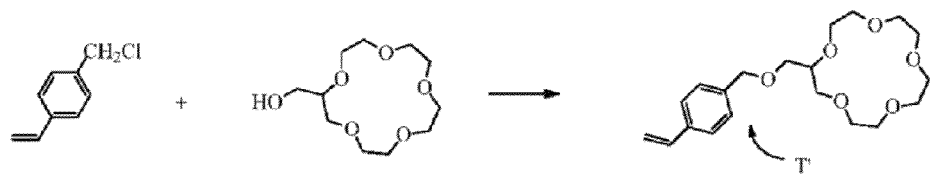
FIG. 16A shows an example reaction pathway for forming 2-(((4-vinylbenzyl)oxy)methyl)-1,4,7,10,13-pentaoxacyclopentadecine utilizing 2-hydroxymethyl-15-crown-5 as a starting material.

Other monomers containing crown ether groups may be formed by the method shown in FIGS. 16 and 16A. FIG. 16 illustrates the generic method where vinylbenzyl chloride is reacted with starting material ROH in NaH and tetrahydrofuran. Starting material ROH is a crown ether structure including the terminal OH group, such as 2-hydroxymethyl-15-crown-5 or 2-hydroxymethyl-18-crown-6. During the reaction, the OR group of the ROH attaches to the CH$_2$ that is attached at the 1 position of the benzene ring, i.e., where the Cl had been attached. This forms monomer T, which is a vinylbenzyloxymethylcrown ether. One specific example of this method is shown in FIG. 16A, where 2-(((4-vinylbenzyl)oxy)methyl)-1,4,7,10,13-pentaoxacyclopentadecane (monomer T') may be formed. In this example, vinylbenzyl chloride is reacted with 2-hydroxymethyl-15-crown-5 in NaH and tetrahydrofuran. It is to be understood that 2-hydroxymethyl-15-crown-5 may be formed using any of the methods that were previously mentioned and/or described above, as well as in the Montanari and Babb references.

Example methods for forming some of the cryptand monomers will now be described. An example of a method of forming cryptand structure K

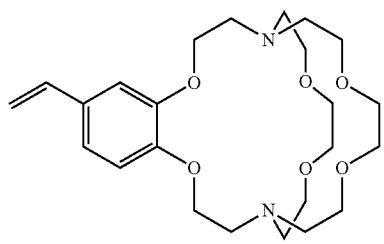 [SMILES: C=Cc1ccc2c(c1)OCCN1CCOCCOCCN(CCOCCOCC1)CCO2]

is described in Manecke, et al., "Polymere Kryptanden", Makromol. Chem. 182, 1973-1984 (1981), Schema 1 of which is incorporated herein by reference. Other routes to monomer K are shown in the reaction pathways depicted in FIG. 17. In this example, at step i, $ClCH_2COOH$ in t-butanol (i.e., t-BuOH) is added to a mixture of 1-HC(O)-3,4-$C_6H_3$(OH)$_2$ (shown in FIG. 17) and potassium t-butoxide ($K^{+-}$OBu-t) in t-BuOH. The mixture may be refluxed and stirred, and the t-BuOH may then be evaporated under a vacuum. Water may be added, and then the mixture may be extracted with diethyl ether ($Et_2O$) to form an aqueous solution. The aqueous solution is then acidified with an acid (e.g., HCl), and then repeatedly extracted with $CH_2Cl_2$ to form a solution. The solution may then be centrifuged, filtered, and evaporated under a vacuum to form 2,2'-((4-formyl-1,3-phenylene)-bix(oxy))diacetic acid (i.e., the intermediate structure shown between steps i and ii in FIG. 17).

Figure 17:
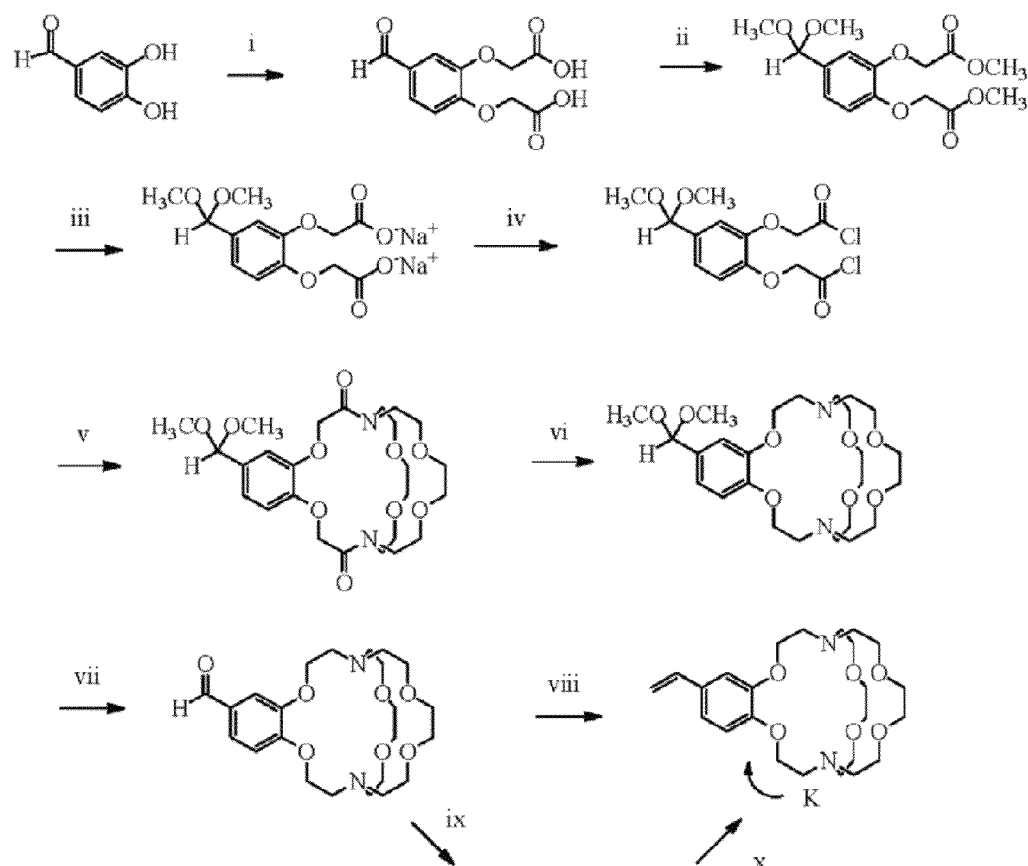
FIG. 17 shows example reaction pathways for forming a 4'-vinylbenzo[2.2.2]cryptand structure.

At step ii in FIG. 17, 2,2'-((4-formyl-1,3-phenylene)-bix(oxy))diacetic acid may be dissolved in a mixture of benzene and methanol, and then p-toluenesulfonic acid may be added. The mixture is heated to reflux in the presence of anhydrous $Na_2SO_4$. The solvent may be removed from the mixture and an ether solution of the residue may be washed with a 5% aqueous $NaHCO_3$ solution. The ether is dried over $Na_2SO_4$, and is removed to form the intermediate structure shown between steps ii and iii in FIG. 17. This intermediate structure is reacted with sodium hydroxide (at step iii) to form sodium 2,2'-((4-dimethoxymethyl)-1,2-phenylene)bis(oxy)diacetate (i.e., the intermediate structure shown between steps iii and iv in FIG. 17). At step iv, sodium 2,2'-((4-dimethoxymethyl)-1,2-phenylene)bis(oxy)diacetate reacts with oxalyl chloride or thionyl chloride ($SOCl_2$) and pyridine to form 2,2'-((4-(dimethoxymethyl)-1,2-phenylene)bis(oxy))diacetyl chloride (i.e., the intermediate structure shown between steps iv and v in FIG. 17). 2,2'-((4-(dimethoxymethyl)-1,2-phenylene)bis(oxy))diacetyl chloride thereafter reacts with

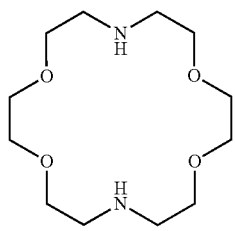 [SMILES: C1COCCOCCNCCOCCOCCN1]

(1,4,10,13-tetraoxa-1,16-diazacyclooctadecane) to form the intermediate structure shown between steps v and vi in FIG. 17. This intermediate structure, i.e.,

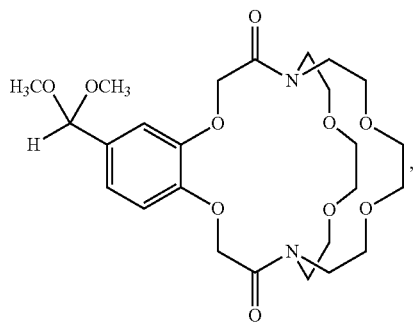 [SMILES: COC(OC)c1ccc2c(c1)OCC(=O)N1CCOCCOCCN(CCOCCOCC1)C(=O)CO2]

is then reacted (at step vi) with $BH_3$ in THF tetrahydrofuran to form the intermediate structure shown between steps vi and vii in FIG. 17.

The method shown in FIG. 17 then moves onto step vii, where the intermediate structure

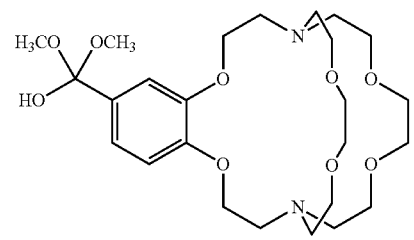 [SMILES: COC(O)(OC)c1ccc2c(c1)OCCN1CCOCCOCCN(CCOCCOCC1)CCO2]

reacts with an acid to form yet another intermediate structure, as shown between steps vii and viii and steps vii and ix.

As shown at step viii of FIG. 17, this intermediate structure,

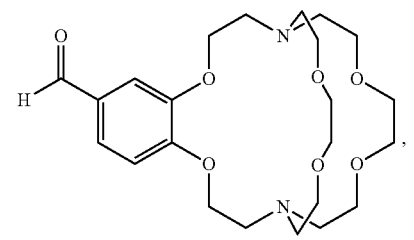 [SMILES: O=Cc1ccc2c(c1)OCCN1CCOCCOCCN(CCOCCOCC1)CCO2]

reacts with methyltriphenylphosphonium bromide and n-butyllithium to form vinylbenzo[2.2.2]cryptand (i.e., structure K).

In another example, as shown at step ix in FIG. 17, the intermediate structure shown between steps vii and ix is reacted with methylmagnesium iodide to form the intermediate structure

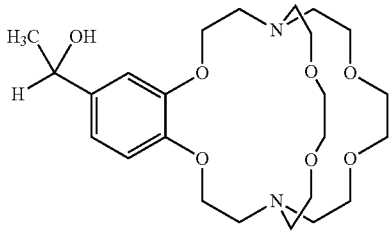 [SMILES: CC(O)c1ccc2c(c1)OCCN1CCOCCOCCN(CCOCCOCC1)CCO2]

(shown between steps ix and x), which is then reacted with p-toluenesulfonic acid to form vinylbenzo[2.2.2]cryptand (i.e., structure K).

Examples of a method of forming cryptand structure S

Figure 18:
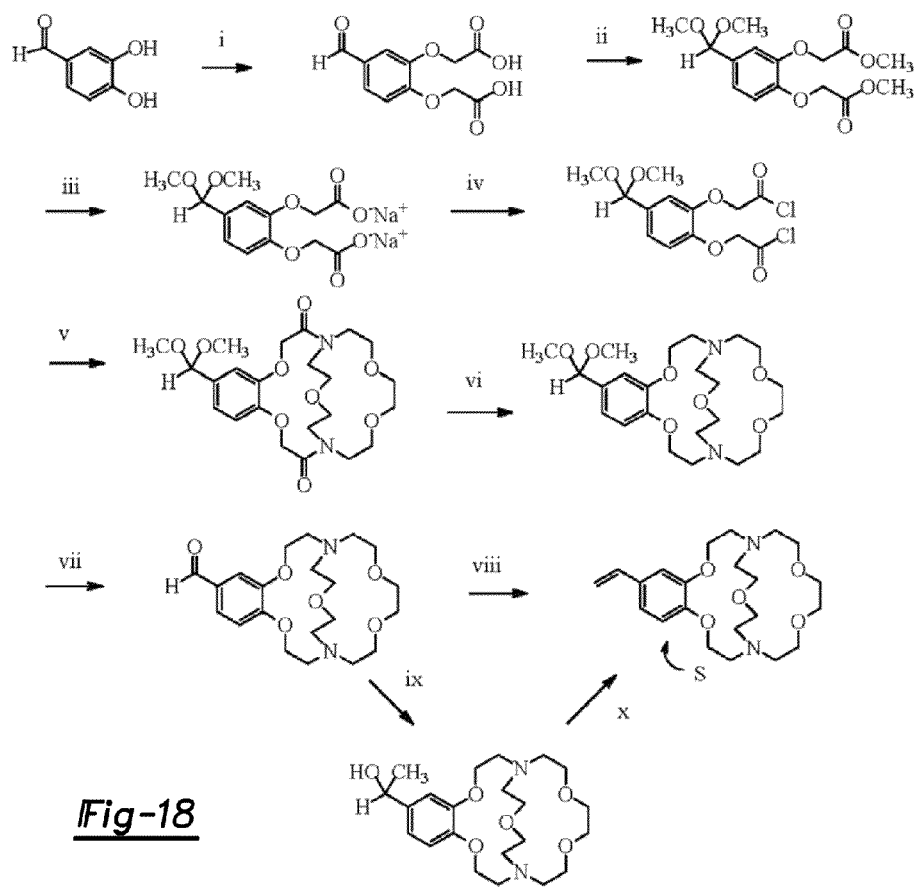
FIG. 18 shows example reaction pathways for forming a 4'-vinylbenzo[2.2.1]cryptand structure.

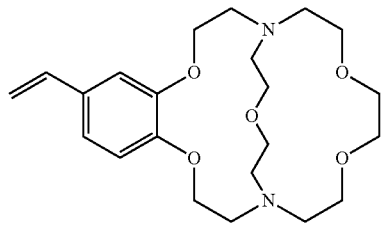 [SMILES: C=Cc1ccc2c(c1)OCCN1CCOCCOCCN(CCOCC1)CCO2]

are shown in the reaction pathways depicted in FIG. 18. At step i, $ClCH_2COOH$ in t-BuOH is added to a mixture of 1-HC(O)-3,4-$C_6H_3(OH)_2$ (shown in FIG. 18) and $K^{+-}OBu$-t in t-BuOH. The mixture is refluxed and stirred, and the t-BuOH is evaporated under a vacuum. Water is added, and after extraction with $Et_2O$, the aqueous solution is acidified with HCl. The acidified solution is then repeatedly extracted with $CH_2Cl_2$, and the solution is centrifuged, filtered, and evaporated under a vacuum to form 2,2'-((4-formyl-1,3-phenylene)-bix(oxy))diacetic acid (i.e., the intermediate structure shown between steps i and ii in FIG. 18).

At step ii, 2,2'-((4-formyl-1,3-phenylene)-bix(oxy))diacetic acid is dissolved in a mixture of benzene and methanol, and then p-toluenesulfonic acid is added. The mixture is heated to reflux in the presence of anhydrous $Na_2SO_4$. The solvent is removed, and an ether solution of the residue is washed with a 5% aqueous $NaHCO_3$ solution. The ether is dried over $Na_2SO_4$, and then removed to form the intermediate structure shown between steps ii and iii in FIG. 18. This intermediate structure is reacted (at step iii) with sodium hydroxide to form sodium 2,2'((4-dimethoxymethyl)-1,2-phenylene)bis(oxy)diacetate (i.e., the intermediate structure shown between steps iii and iv in FIG. 18). Sodium 2,2'-((4-dimethoxymethyl)-1,2-phenylene)bis(oxy)diacetate (at step iv in FIG. 18) is reacted with oxalyl chloride or thionyl chloride ($SOCl_2$) and pyridine in to form 2,2'-((4-(dimethoxymethyl)-1,2-phenylene)bis(oxy))diacetyl chloride (the intermediate structure shown between steps iv and v in FIG. 18). Then, 2'-((4-(dimethoxymethyl)-1,2-phenylene)bis(oxy))diacetyl chloride reacts with (1,4,10-trioxa-7.13 diazacyclopentadecane),

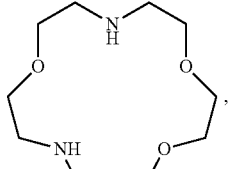

during step v to form

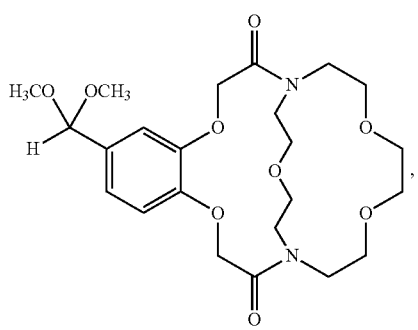 [SMILES: COC(OC)c1ccc2c(c1)OCC(=O)N1CCOCCOCCN(CCOCC1)C(=O)CO2]

which is another intermediate structure. At step vi, this intermediate structure is reacted with $LiAlH_4$ or $BH_3$ in tetrahydrofuran to form

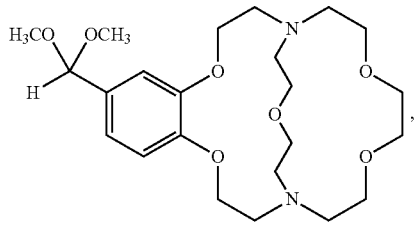 [SMILES: COC(OC)c1ccc2c(c1)OCCN1CCOCCOCCN(CCOCC1)CCO2]

which is then reacted with an acid in step vii to form

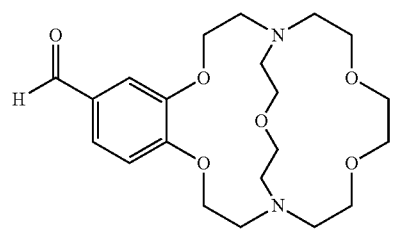 [SMILES: O=Cc1ccc2c(c1)OCCN1CCOCCOCCN(CCOCC1)CCO2]

(i.e., the intermediate structure shown between steps vii and viii and steps vii and ix). At step viii, the intermediate structure shown between steps vii and viii of FIG. 18 is reacted with methyltriphenylphosphonium bromide and n-butyllithium to form vinylbenzo[2.2.1]cryptand (i.e., structure S).

In another example, as shown at step ix in FIG. 18, the intermediate structure shown between steps vii and ix is reacted with methylmagnesium iodide to form the intermediate structure

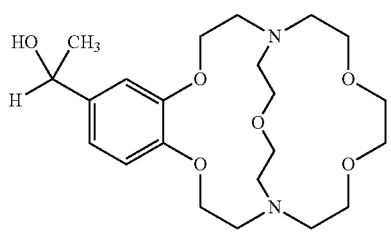 [SMILES: CC(O)c1ccc2c(c1)OCCN1CCOCCOCCN(CCOCC1)CCO2]

(shown between steps ix and x), which is then reacted with p-toluenesulfonic acid to form vinylbenzo[2.2.1]cryptand (i.e., structure S).

In an example, other cryptand structures (e.g., monomer L shown in FIG. 8H) may be formed utilizing monomer S as the starting material, and yet other cryptand structures (e.g., monomer M) may be formed utilizing monomer K as the starting material. In these examples, monomers L and M may be formed using any of the methods that were previously described.

Figure 19:
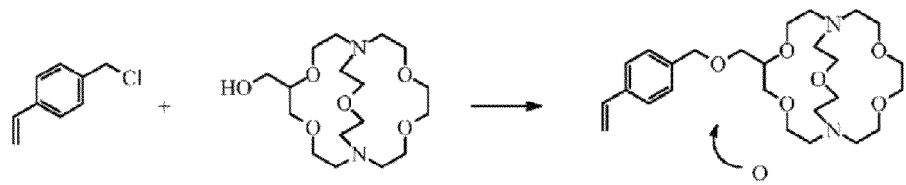
FIG. 19 shows an example reaction pathway for forming 5-(((4-vinylbenzyl)oxy)methyl)-4,7,13,16,21-pentaoxa-1,10-diazabicyclo[8.8.5]tricosane.
Figure 20:
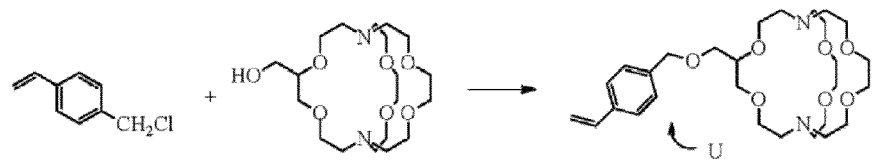
FIG. 20 shows an example reaction pathway for forming 5-(((4-vinylbenzyl)oxy)methyl)-4,7,13,16,21,24-hexaoxa-1,10-diazabicyclo[8.8.8]hexacosane.

As shown in FIG. 19, monomer O may be formed by reacting vinylbenzyl chloride with hydroxymethyl[2.2.1] cryptand. This reaction may take place in THF with NaH. As shown in FIG. 20, monomer U (which is similar to monomer N) may be formed by reacting vinylbenzyl chloride with hydroxymethyl[2.2.2]cryptand. This reaction may take place in THF with NaH.

Figure 21:
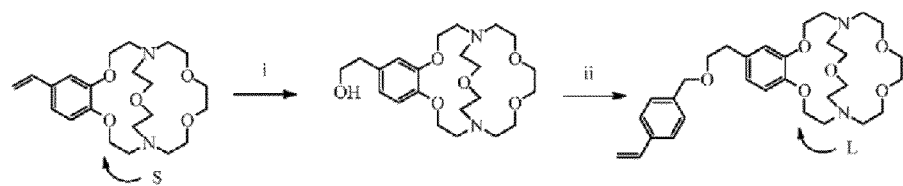
FIG. 21 shows an example reaction pathway for forming vinylbenzyloxy-2'-ethylbenzo[2.2.1]cryptand.

In another example, monomer L may be formed by reacting monomer S with $BH_3$ in tetrahydrofuran and then with $H_2O_2$ and NaOH to form the intermediate structure shown in FIG. 21. At step ii in FIG. 21, the intermediate structure may be reacted with vinylbenzyl chloride to form monomer L. Structure L may also be formed by using the intermediate structure (i.e., the cryptand shown between steps i and ii in FIG. 21) as the starting material, and reacting this cryptand with vinylbenzyl chloride and NaH in THF.

Figure 22:
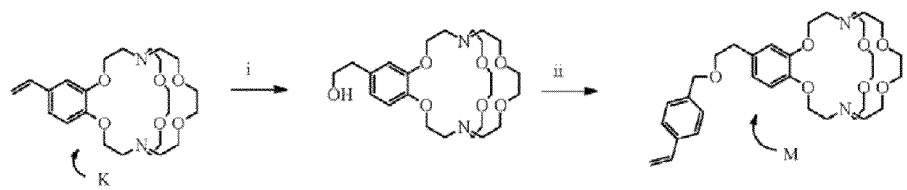
FIG. 22 shows an example reaction pathway for forming vinylbenzyloxy-2'-ethylbenzo[2.2.2]cryptand.

Monomer M may be formed utilizing the same method as described above for forming monomer L; however monomer K is used as the starting material. Briefly, at step in FIG. 22, monomer K reacts with $BH_3$ in tetrahydrofuran and then with $H_2O_2$ and NaOH to form the intermediate structure, which (at step ii) is then reacted with vinylbenzyl chloride to form monomer M.

Figure 23:
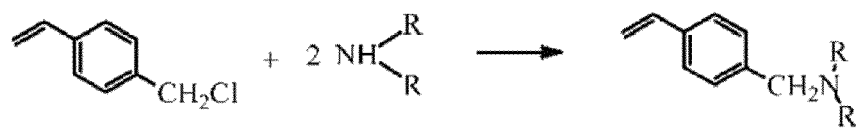
FIG. 23 shows an example reaction pathway for forming an example of a vinylbenzyl aza-crown structure.
Figure 23A:
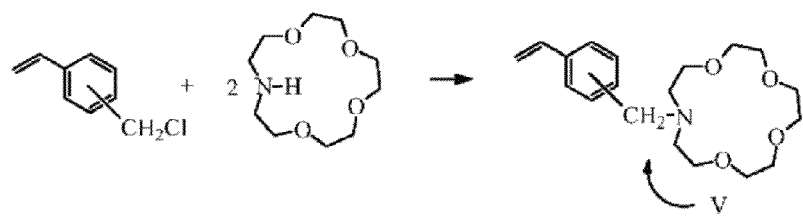
FIG. 23A shows an example reaction pathway for forming 13-(4-vinylbenyl)-1,4,7,10-tetraoxa-13-azacyclopentadecane (i.e., vinylbenzyl-aza-15-crown-5)
Figure 23B:
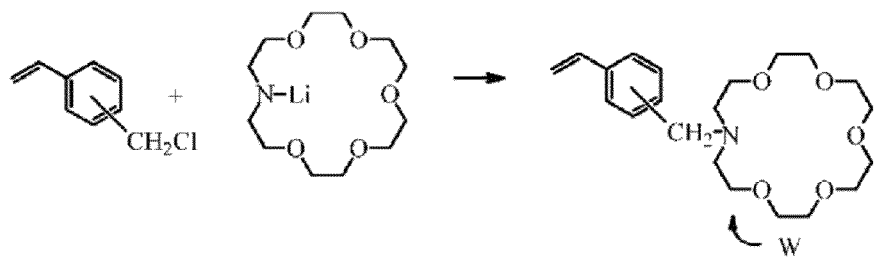
FIG. 23B shows an example reaction pathway for forming 16-(4-vinylbenzyl)-1,4,7,10,13-pentaoxa-16-azacyclooctadecane (i.e., vinylbenzyl-aza-18-crown-6)

Also disclosed herein is a method of forming monomers including a pendant aza-crown ether. It is to be understood that these monomers may also be used to form the ion exchange polymer bodies disclosed herein. FIG. 23 is a general reaction scheme for preparing a polymerizable, vinylbenzyl aza-crown. An aza-crown (shown as 2 molar equivalents of HNRR in FIG. 23, where NRR is the aza-crown structure) is allowed to react with vinylbenzyl chloride in THF at 23° C. for 2 days. In FIGS. 23A and 23B, the monomers V and W are formed, respectively in THF, which may be polymerized to form examples of the polymer material P used as a chelating agent in lithium ion batteries. In FIG. 23B, monomer W can also be made as shown by reacting 2-molar equivalents of aza-18-crown-6 with 1-molar equivalent of vinylbenzyl chloride. The excess aza-18-crown-6 serves as an acceptor for HCl formed in the reaction.

For attachment to a preformed polymer material

Figure 24:
FIG. 24 shows an example reaction pathway for forming lithium 1,4,7,10-tetraoxa-13-azanidacyclopentadecan-13-ide (i.e., lithio-aza-15-crown-5)

the lithio salt of an aza-crown may be formed at the onset. The lithio aza-crown may be formed by reacting the aza-crown with n-butyllithium in THF at about −30° C. One example of the formation of a lithio salt of an aza-crown is shown in FIG. 24, where aza-15-crown-5 is reacted with n-butyllithium at about −30° C. in THF to form lithio-aza-15-crown-5.

Figure 25:
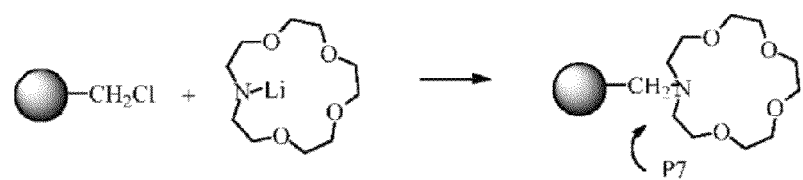
FIG. 25 shows an example of forming an ion exchange polymer material including a polymer bead having a pendant aza-crown structure.

FIG. 25 illustrates the formation of an ion exchange polymer material having a pendant aza-crown. In this example, a cross-linked, polystyrene bead with pendant $CH_2Cl$ groups (shown as

reacts with the lithio-aza-15-crown-5 to form the ion exchange polymer material P7 with pendant aza-15-crown-5 groups (also shown in FIG. 6). When applied to a Celgard 2320 battery separator, the ion exchange polymer material P7 effectively traps $Mn^{2+}$ ions.

Polymerization of the monomers E, F, G, H, I, J, K, L, M, N, O, Q, S, T, U, V, and W may be accomplished by emulsion polymerization. For instance, any of the monomers may be polymerized using radicals in emulsions. It is to be understood, however, that any known vinyl polymerization technique may also be used to polymerize the monomers, such as anionic, free radical, and controlled free radical polymerization. Some examples of such techniques include RAFT, nitroxyl mediated free radical, ATRP, and/or the like. Some specific examples of emulsion polymerization of the crown ether or cryptand structures are described below in the Examples.

Figure 26:
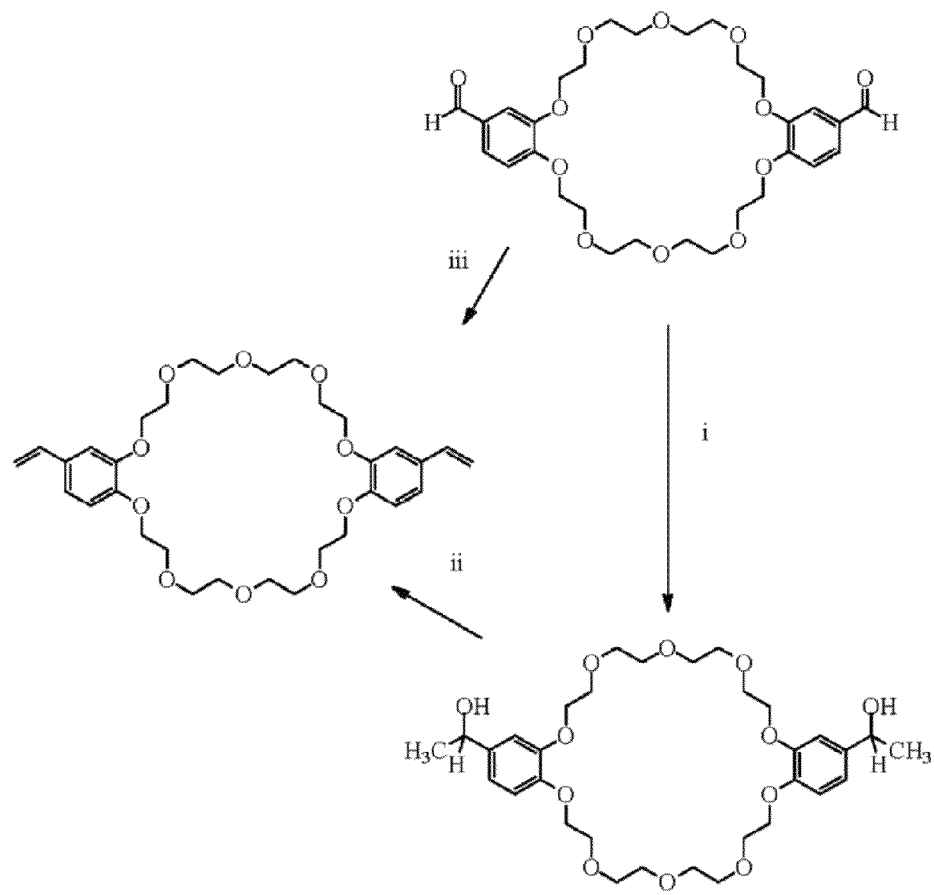
FIG. 26 shows example reaction pathways for forming an example of a bis-vinylbenzo macrocycle.

The inventors of present disclosure have found that polymerization of the polymerizable monomers including the crown ether or the cryptand may also be accomplished in an emulsion with a crosslinking dimer such as, e.g.,

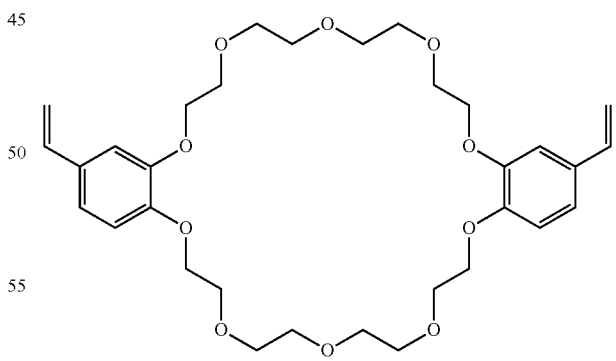

which is a bis-vinyl macrocycle that can be formed via the reaction pathways shown in FIG. 26. One way of forming this crosslinking dimer is to utilize the byproduct of the method shown in FIG. 9A. This byproduct is the starting material in the methods shown in FIG. 26. At step i, the bis-formyl macrocycle byproduct is reacted with methyl magnesium iodide to form the intermediate structure

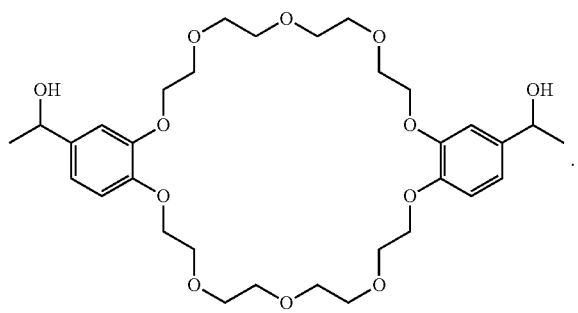 [SMILES: CC(O)c1ccc2c(c1)OCCOCCOCCOCCOc1cc(C(C)O)ccc1OCCOCCOCCOCCO2]

At step ii, the intermediate structure may be treated with p-toluenesulfonic acid to form the dimer structure shown to the left of the arrow at step ii in FIG. 26. This dimer structure may be suitable for use as a crosslinking agent in the emulsion polymerization of monomers E and F.

FIG. 26 also illustrates a one-step reaction for forming

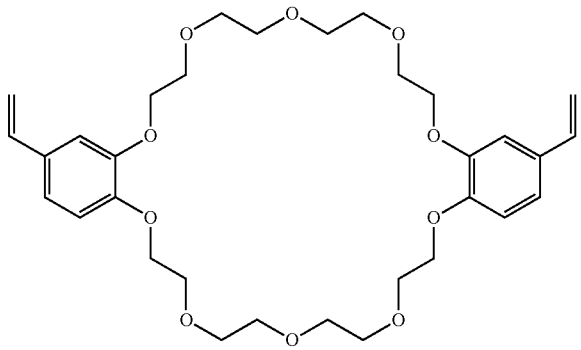 [SMILES: C=Cc1ccc2c(c1)OCCOCCOCCOCCOc1cc(C=C)ccc1OCCOCCOCCOCCO2]

or its isomers. This is shown at step iii in FIG. 26. In this example, the starting material is reacted with methyltriphenylphosphonium bromide and n-butyllithium in diethyl ether or tetrahydrofuran to form the dimer structure product (i.e., the Wittig Reaction).

Figure 27:
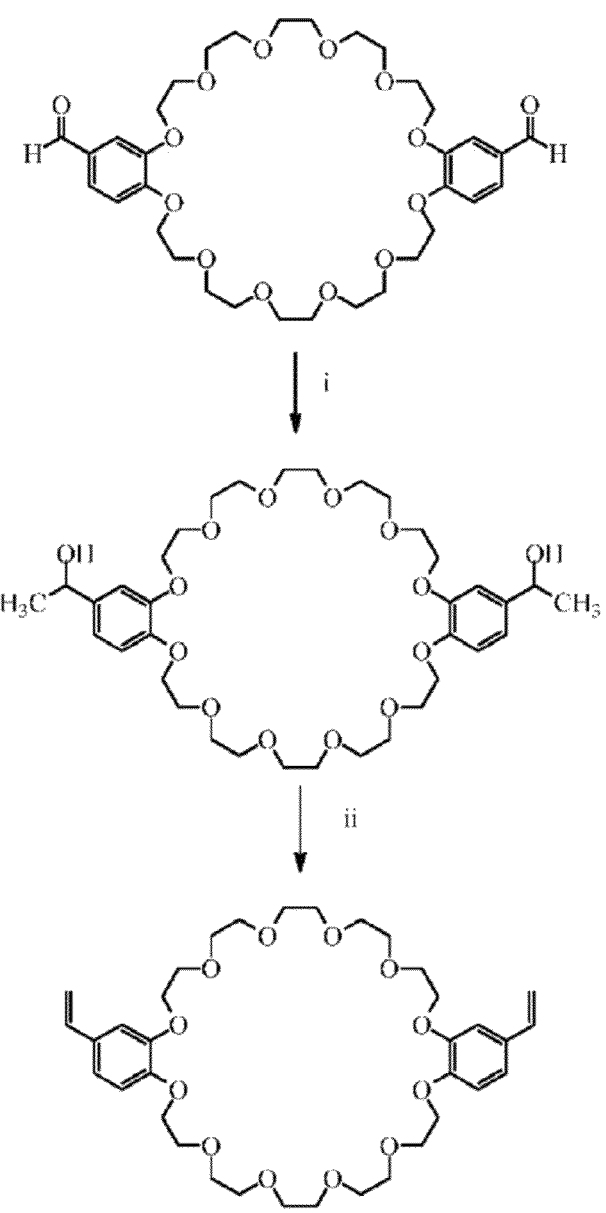
FIG. 27 shows another example reaction pathway for forming another example of a bis-vinylbenzo macrocycle.

Another suitable crosslinking dimer is shown as the product in FIG. 27. In this example, the bis-formyl macrocycle byproduct of the method shown in FIG. 9B is used as the starting material. At step i in FIG. 27, the bis-formyl macrocycle is reacted with methyl magnesium iodide in ether or THF to form the intermediate structure shown between steps i and ii. The intermediate structure is then reacted with p-toluenesulfonic acid in benzene to form the dimer structure (or isomers thereof) product shown in FIG. 27. This dimer structure may also be made by reacting the bis-formyl macrocycle byproduct of the method shown in FIG. 9B with methyltriphenylphosphonium bromide in ether or THF.

To further illustrate the present disclosure, examples are given herein. It is to be understood that these examples are provided for illustrative purposes and are not to be construed as limiting the scope of the disclosure.

EXAMPLES

Example 1

4'-HC(O) $C_6H_3(OCH_2COOH)(OCH_2COOH)$,

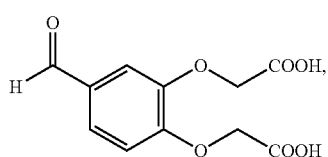 [SMILES: O=Cc1ccc(OCC(=O)O)c(OCC(=O)O)c1]

was prepared as follows. Under argon, about 23.6 g of $ClCH_2COOH$ (about 0.25 mol) in about 80 mL of t-BuOH was added slowly to a refluxing mixture of 13.8 g of a 1-HC(O)-3,4-$C_6H_3(OH)_2$,

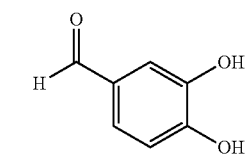

(about 0.1 mol) and about 56.1 g of $K^+OBu$-t (0.5 mol) in about 400 mL of t-BuOH. The mixture was refluxed and stirred for about 4 h, and was then stirred at 23° C. for about 6 h. The t-BuOH was evaporated under a vacuum, and then about 100 mL of $H_2O$ was added. After extraction with diethyl ether ($Et_2O$), the aqueous layer was acidified with HCl and was repeatedly extracted with $CH_2Cl_2$. The combined $CH_2Cl_2$ solutions were centrifuged, filtered, and evaporated under a vacuum to yield about 10 g of 4'-HC(O)—$C_6H_3$(OCH$_2$COOH)(OCH$_2$COOH).

Example 2

Structure

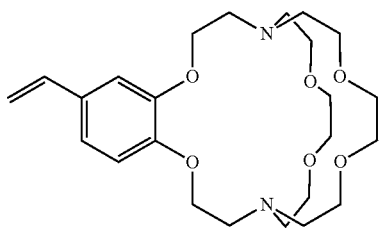 [SMILES: C=Cc1ccc2c(c1)OCCN1CCOCCOCCN(CCOCCOCC1)CCO2]

was formed as follows. About 10 g of

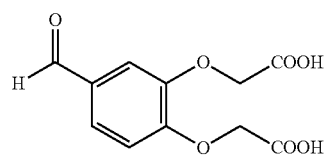 [SMILES: O=Cc1ccc(OCC(=O)O)c(OCC(=O)O)c1]

(prepared by the method described in Example 1) was dissolved in about 400 mL of a 1:1 volume mixture of benzene and methanol. Then about 2 g of p-toluenesulfonic acid was added, and the mixture was heated to reflux for about 16 h with continuous circulation of condensed vapors through anhydrous $Na_2SO_4$. This was accomplished in a thimble of a Soxhlet extractor. Benzene and methanol were then removed, and an ether solution of the residue was washed with a 5% aqueous $NaHCO_3$ solution. The ether layer was dried over $Na_2SO_4$, and was then removed to yield about 10 g of

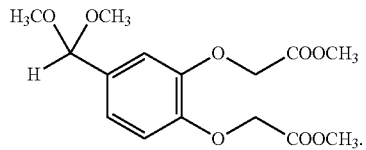

About 1 equivalent of a diazacrown ether (1,4,10,13-tetraoxa-7,16-diazacyclooctadecane) in 50 mL of dry tetrahydrofuran was treated with two equivalents of n-butyllithium (1.6 M in hexanes). The mixture was added dropwise to about 0.5 equivalents of

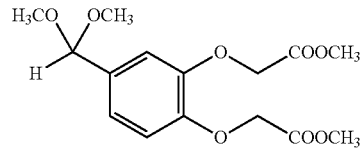

in about 50 mL of THF with magnetic stirring. After stirring for about 16 h at about 23° C., the mixture was stirred at reflux for about 8 h. Removal of the solvent yielded a cryptand diamide. Then, reduction with $LiAlH_4$ in THF, followed by acid hydrolysis, and then a reaction with $LiCH_2P(C_6H_5)_3$ in ether produced the cryptand structure

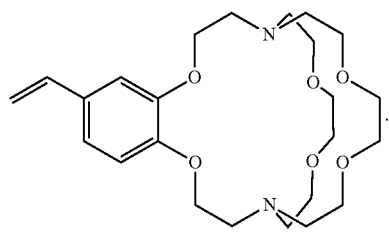 [SMILES: C=Cc1ccc2c(c1)OCCN1CCOCCOCCN(CCOCCOCC1)CCO2]

Example 3

Compound

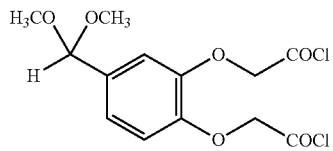 [SMILES: COC(OC)c1ccc(OCC(=O)Cl)c(OCC(=O)Cl)c1]

was prepared as follows. About 5 mL of a 50 wt. % solution of aqueous sodium hydroxide was added dropwise to a stirred solution of about 5 g of

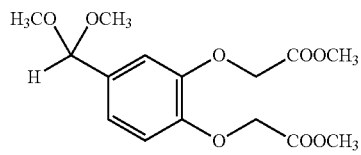

in methanol while keeping the temperature at less than about 40° C. The mixture was left at about 23° C. for about 4 h, and was then extracted with about 100 mL of ether and acidified with dilute hydrochloric acid. A diacid was obtained after repeated extraction with $CH_2Cl_2$, drying of the combined organic layers over $Na_2SO_4$, and filtration and evaporation. Then, about 0.906 mmol of the diacid was dissolved in about 20 mL of dry benzene, and about 10.7 g of oxalyl chloride (84 mmol) was added. Dissolving of the diacid in the benzene and the addition of the oxalyl chloride was accomplished in the same step. A small amount (e.g., about 3 drops) of pyridine was added as a catalyst, which caused an immediate reaction. Further, the flask was fitted with a drying tube, and was stirred for about 48 h at about 23° C. The mixture was then quickly filtered under nitrogen through a dry sintered glass Schlenk funnel, and the solvent was evaporated in vacuo and then co-evaporated once with dry benzene. The residue was

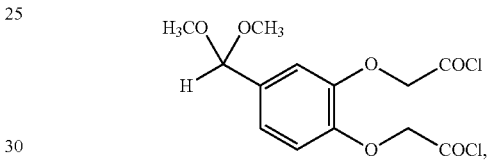

which was stirred under a vacuum for about 30 minutes.

Example 4

4'-vinylbenzo-[2.2.2]cryptand,

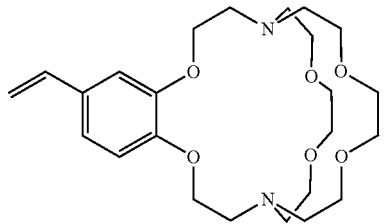 [SMILES: C=Cc1ccc2c(c1)OCCN1CCOCCOCCN(CCOCCOCC1)CCO2]

was formed as follows. A diazacrown ether (1,4,10,13-tetraoxa-7,16-diazacyclooctadecane) and about 2.5 g of triethylamine (about 24.7 mmol) was diluted to about 110 mL in toluene. A diacid chloride

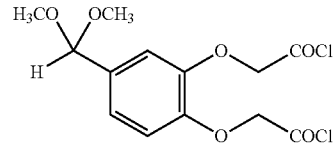 [SMILES: COC(OC)c1ccc(OCC(=O)Cl)c(OCC(=O)Cl)c1]

(about 9.2 mmole) was diluted to about 110 mL in toluene. The diluted diazacrown ether and the diacid chloride were added simultaneously to about 350 mL of toluene, with vigorous stirring at a temperature ranging from about 0° C. to about 5° C. in a Morton flask over a period of about 7 h to about 8 h. After the addition was complete, the mixture was stirred overnight at about 23° C. The solid precipitate was filtered and washed with toluene and then with diethyl ether (Et₂O). The filtrate was combined with the washings and evaporated in vacuo, and the residue was subjected to chromatography on alumina using a 40:1 ratio of ethyl acetate (EtOAc)/methanol (MeOH) as an eluent to produce a cryptand diamide.

A 1.0 M solution of BH₃.Me₂S complex (about 20 mL) in THF was added dropwise to a solution of the cryptand diamide (about 5.4 mmol) while stirring at about 23° C. in about 10 mL of dry THF. The mixture was stirred at reflux for about 9 h. The solution was then cooled to about 23° C., and was further cooled in an ice bath. Thereafter, about 5 mL of water was added slowly to destroy the excess BH₃. The solution was evaporated in vacuo, and the remaining solid was refluxed in a mixture of about 10 mL of water and a 6M HCl solution for about 12 h. After cooling the solution to about 23° C., 50 wt. % of NaOH was added slowly with stirring to adjust the pH of the solution to about 10, and the solution was then evaporated in vacuo. The resulting precipitate was washed with 2×30 mL of methanol (MeOH). The washings were combined after filtration, and diethyl ether (Et₂O) was added to precipitate the inorganic salts by adding a small amount of the Et₂O, filtering the solution, collecting the filtrate, and then adding more Et₂O. This was done repeatedly, while evaporating some solution to reduce the volume needed, until no more solid precipitated from the solution. The filtrate was evaporated in vacuo, and the residue was purified by chromatography on alumina using a 25:1 ratio of CHCl₃/MeOH as an eluent to produce 4'-formylbenzo-[2.2.2]cryptand.

Alternatively, a cyclic diamide in about 20 mL of THF was added to a stirred suspension of LiAlH₄ in about 20 mL of THF at about 23° C. The solution was stirred at reflux for about 24 h, cooled to about 23° C., and then further cooled to about 0° C. using an ice bath. About 15 mL of a solution of 15% NaOH was added, and the suspension was stirred for about 24 h. After filtration and solvent evaporation, the residue was subjected to chromatography on alumina using a 25:1 ratio of CHCl₃ and ethanol as an eluent to produce the cryptand.

Using a gas-tight syringe, about 1.2 mL of a 1.6 M solution of n-butyllithim in hexanes was added to about 2.11 g of methyltriphenylphosphonium bromide in about 100 mL of dry ether under argon with magnetic stirring. The yellow mixture was boiled at reflux under argon for about 1 h, and about 50 mL of 4'-formylbenzo-[2.2.2]cryptand (about 1.2 g) in dry ether was added dropwise. Boiling at reflux was continued for about 1 h, and the reaction was stirred for about 48 h at about 23° C. The solution was filtered, and the ether layer was filtered through a plug of Merck silica in a column eluting with ether. After a second filtration through a plug of silica with ether, the ether was removed and about 1 g of 4'-vinyl-benzo-[2.2.2]cryptand,

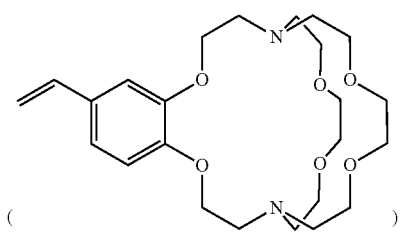 [SMILES: C=Cc1ccc2c(c1)OCCN1CCOCCOCCN(CCOCCOCC1)CCO2]

as obtained.

Example 5

[4'-HC(O)C₆H₃(O)₂(CH₂CH₂OCH₂CH₂OCH₂CH₂OCH₂CH₂)]

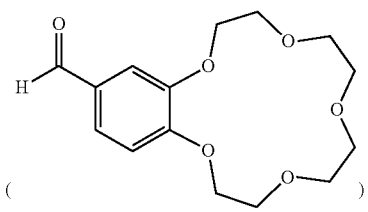 [SMILES: O=Cc1ccc2c(c1)OCCOCCOCCOCCO2]

was formed as follows. To 1-L of t-butanol, about 27.6 g of 1-HC(O)C₆H₃(OH)₂ (about 0.2 mol) was added, and the mixture was purged for about 0.5 h under N₂. A solution of about 46 g of K⁺⁻OBu-t (about 0.41 mol) was added to about 328 mL of t-BuOH, and then about 46.2 g of (ClCH₂CH₂OCH₂CH₂)₂O (about 0.2 mol) was added over 15 minutes. The reaction mixture was refluxed for about 24 hours. The mixture was cooled, and the solvent (t-butanol) was removed using a rotary evaporator. Water was added, and the mixture was extracted multiple times with CH₂Cl₂. The combined organic layers were dried over sodium sulfate, filtered, and the CH₂Cl₂ was evaporated. The residue was extracted multiple times with ether (about 0.5 L each) to yield 20 g of [4'-HC(O)C₆H₃(O)₂(CH₂CH₂OCH₂ CH₂OCH₂ CH₂OCH₂CH₂)] (i.e., 4'-formylbenzo-15-crown-5

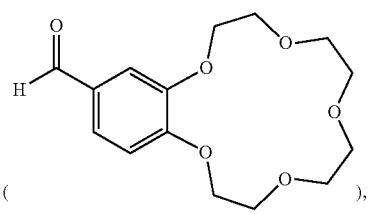 [SMILES: O=Cc1ccc2c(c1)OCCOCCOCCOCCO2]

and the byproduct

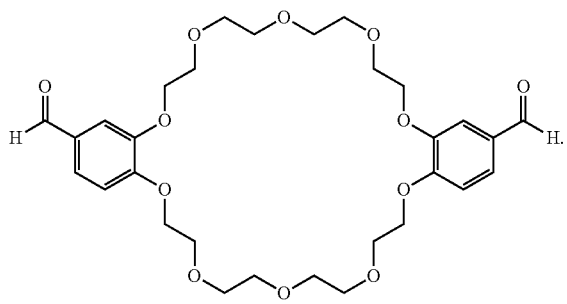

Example 6

[4'-HC(O)C₆H₃(O)₂(CH₂CH₂OCH₂CH₂OCH₂CH₂OCH₂CH₂)]

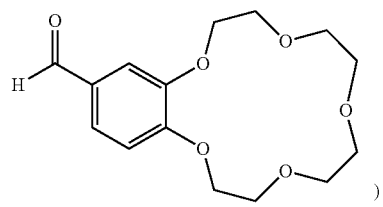

was formed as follows. To 1-L of t-butanol, about 27.6 g of 1-HC(O)C₆H₃(OH)₂ (about 0.2 mol) was added, and the mixture was purged for about 0.5 h under N₂. A solution of about 46 g of K⁺⁻OBu-t (about 0.41 mol) was added to about 328 mL of t-BuOH, and then about 46.2 g of $(ClCH_2CH_2OCH_2CH_2)_2O$ (about 0.2 mol) was added over 15 minutes. The reaction mixture was refluxed for about 60 h at about 70° C. The mixture was cooled, and the t-butanol was removed using a rotary evaporator. The residue was washed with hexanes to remove residual unreacted ether, and was then washed with diethyl ether. About 100 mL of aqueous 10 wt. % hydrochloric acid was added, and the mixture was extracted multiple times with $CH_2Cl_2$. The combined organic layers were separated with the aid of a centrifuge, and were then dried over sodium sulfate, filtered, and $CH_2Cl_2$ was evaporated. The residue was extracted multiple times with ether (e.g., about 0.5 g to about 1 g of the residue dissolves in about 1 L of ether) and was then cooled to yield in total about 9.66 g of recrystallized [4'-HC(O)C$_6$H$_3$(O)$_2$(CH$_2$CH$_2$OCH$_2$CH$_2$OCH$_2$CH$_2$OCH$_2$CH$_2$)], 4'-formyl-benzo-15-crown-5

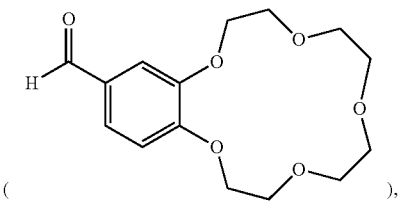 [SMILES: O=Cc1ccc2c(c1)OCCOCCOCCOCCO2]

and the byproduct

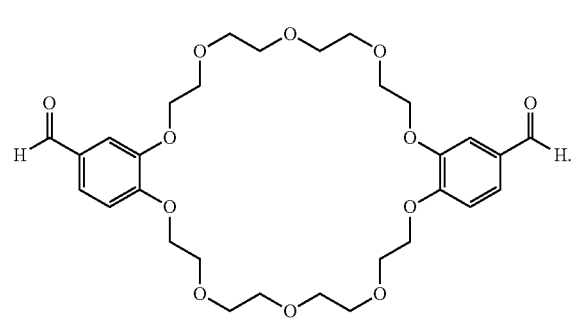

Example b 7

6,7,9,10,12,13,15,16,23,24,26,27,29,30,32,33-hexadecahydrodibenzo[b,q][1,4,7,10,13,16,19,22,25,28]decaoxacyclotriacontine-2,20-dicarbaldehyde

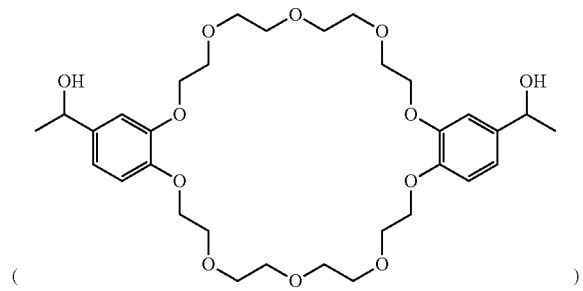 [SMILES: CC(O)c1ccc2c(c1)OCCOCCOCCOCCOc1cc(C(C)O)ccc1OCCOCCOCCOCCO2]

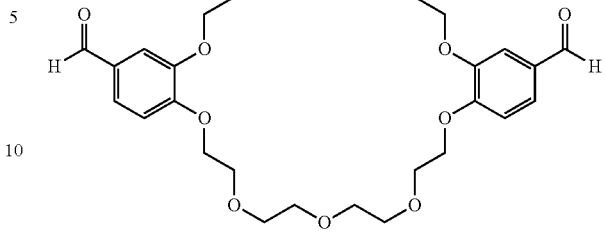

in about 400 mL of dry ether and ii) a 100 mL of dry benzene were added dropwise. A white precipitate formed immediately. After complete addition, the mixture was heated for about 1 h at reflux, was cooled, and a 15% aqueous NH$_4$Cl solution was added until two layers were formed. The aqueous layer was extracted four times with about 100 mL CHCl$_3$. The diethyl ether and the CHCl$_3$ layers were then combined and dried. The residue was recrystallized from about 500 mL ether to produce about 5 g of

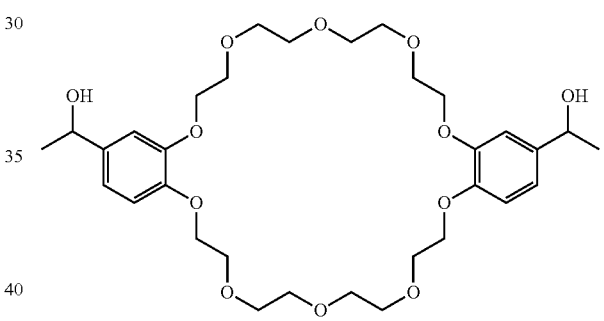

Example 8

2,20-divinyl-6,7,9,10,12,13,15,16,23,24,26,27,29,30,32,33-hexadecahydrodibenzo[b,q][1,4,7,10,13,16,19,22,25,28]decaoxacyclotriacontine

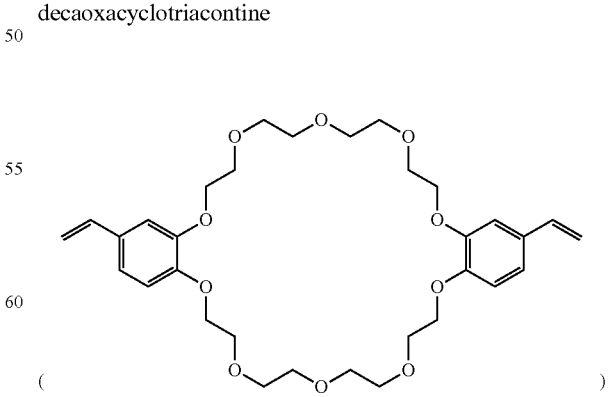

was formed as follows. A methyl Grignard was made by adding about 17.5 g of methyl iodide and about 50 mL of dry ether to about 3 g Mg in about 20 mL of dry ether. After the Mg dissolved, i) about 7 g of was formed as follows. A trace amount of p-toluenesulfonic acid monohydrate was added to about 4 g of

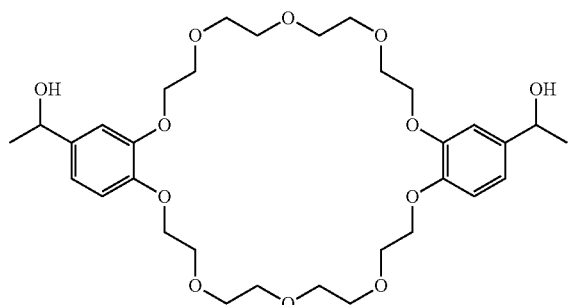

in about 350 mL benzene. The mixture was refluxed with removal of $H_2O$ for about 14 h. After cooling to about 23° C., five drops of pyridine were added. Benzene was then evaporated, and the product crystallized upon standing. Structure

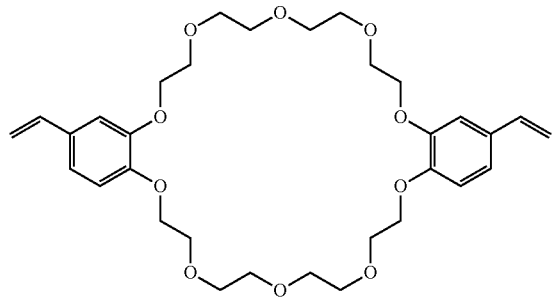 [SMILES: C=Cc1ccc2c(c1)OCCOCCOCCOCCOc1cc(C=C)ccc1OCCOCCOCCOCCO2]

was dissolved in about 100 mL of $CH_2Cl_2$, extracted four times with 100 mL of $H_2O$, and then the $CH_2Cl_2$ layer was dried over $Na_2SO_4$. After filtration, the $CH_2Cl_2$ was removed, and the residue was recrystallized from about 225 mL of petroleum ether to yield about 3 g of product.

Example 9

To a 250 mL round-bottom flask with a mechanical stirrer, reflux condenser, and an additional funnel, about 43.5 g of NaI (about 0.29 mol) and about 75 mL of acetone was added. About 43 g of undecylenyl chloride (about 0.2226 mol) was added dropwise, and the mixture was refluxed for about 16 h. More NaI (about 9 g more) was then added, and was boiled at reflux for about 4 days. $CH_2Cl_2$ was added, the reaction mixture was filtered, the solvent was removed, and the residue was vacuum distilled. 11-iodoundecene was the product that was collected between 95° C. and 98° C. at 1 mm Hg.

Example 10

Poly(11-undecylenyl iodide) was prepared as follows. Under nitrogen, undecylenyl iodide (5 g), toluene (30 g), diethylaluminum chloride ($Et_2AlCl$, 10 mL of a 1.8 M solution in toluene), and $TiCl_3.AA$ (0.5 teaspoon, ≈2 g) were combined, sealed in a glass jar, and allowed to react for 16 h at 25° C. The mixture was then blended with methanol, and the filtered polymer was washed with water and then methanol. Another reactant ratio used was: undecylenyl iodide (12 g), toluene (40 g), $Et_2AlCl$ (22 mL of a 1.8 M solution), and $TiCl_3.AA$ (1 teaspoon), which was reacted for 16 h at 25° C.

Example 11

The reaction of the cryptand structure

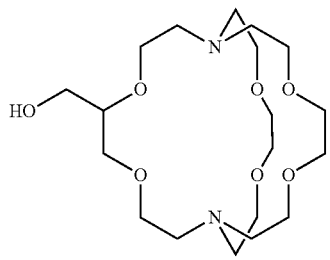 [SMILES: OCC1COCCN2CCOCCOCCN(CCOCCOCC2)CCO1]

and poly(11-undecylenyl iodide) to form a polymer material was performed as follows. About 100 mL of freshly distilled tetrahydrofuran (THF) and about 6 g of 60 wt. % of sodium hydride in mineral oil was added to about 1 g of poly(11-undecylenyl iodide). With magnetic stirring under argon, about 2 g of cryptand structure

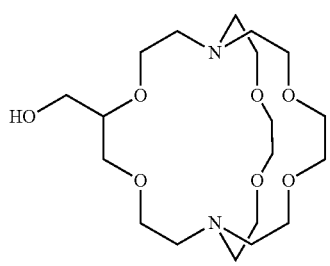 [SMILES: OCC1COCCN2CCOCCOCCN(CCOCCOCC2)CCO1]

was added, and the mixture was stirred at about 23° C. for about 7 days. Isopropanol was added cautiously to quench the remaining sodium hydride. The reaction mixture was concentrated using a rotary evaporator, and the mixture was then added to about 100 mL of water. The mixture was centrifuged, and the solids were washed with water and centrifuged to form the polymer material.

The polymer material (1 g) was extruded at 135° C. with poly(2-ethyl-2-oxazoline) (10 g, 50,000-molecular weight, Aldrich) and the extrudate was chopped with a blender and then washed in water. The resultant particles were filtered using a Millipore pressure filter, washed with water, and then suspended in isopropanol. The particles were then vacuum filtered onto Celgard 2320 and then air-dried. The composite was then used as a lithium ion battery separator.

Example 12

The reaction of 2-hydroxymethyl-18-crown-6 and poly (11-undecylenyl iodide) to form an ion exchange polymer material was performed as follows. About 100 mL of freshly distilled THF and about 6 g of 60 wt. % sodium hydride in mineral oil was added to about 1 g of poly(11-undecylenyl iodide). With magnetic stirring under argon, about 2 g of 2-hydroxymethyl-18-crown-6 was added, and the mixture was stirred at about 23° C. for about 7 days. Isopropanol was added cautiously to quench the remaining sodium hydride. The reaction mixture was concentrated using a rotary evaporator, and then was added to about 100 mL of water. The mixture was centrifuged, and the solids were washed with water and centrifuged to form the polymer material.

The polymer material (1 g) was extruded at 135° C. with poly(2-ethyl-2-oxazoline) (10 g, 50,000-molecular weight, Aldrich) and the extrudate was chopped with a blender and then washed in water. The resultant particles were filtered using a Millipore pressure filter, washed with water, and then suspended in isopropanol. The particles were then vacuum filtered onto Celgard 2320 and then air-dried. The composite was then used as a lithium ion battery separator.

Example 13

Polymerization of 4'-vinylbenzo-[2.2.2]cryptand

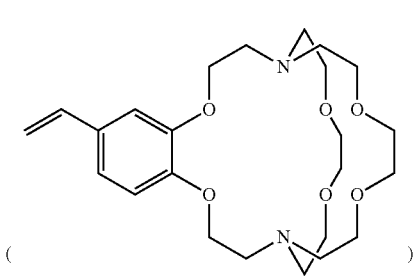 [SMILES: C=Cc1ccc2c(c1)OCCN1CCOCCOCCN(CCOCCOCC1)CCO2]

was accomplished as follows. De-ionized water, about 0.5 mg of ammonium persulfate, about 0.5 mg of sodium hydrogen phosphate, about 0.01 g of sodium lauryl sulfate, about 0.5 g of 4'-vinylbenzo-[2.2.2]cryptand, and about 0.01 g of divinylbenzene or about 0.01 g of compound

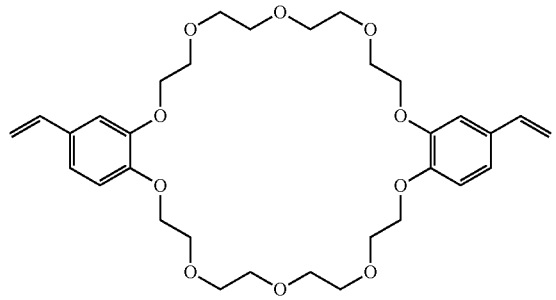 [SMILES: C=Cc1ccc2c(c1)OCCOCCOCCOCCOc1cc(C=C)ccc1OCCOCCOCCOCCO2]

were added to a 250 mL, 3-neck flask equipped with a stir bar, reflux condenser, and an argon inlet. The flask was situated in an oil bath, and the mixture was purged for about 15 minutes with argon. The purged mixture was then heated at about 70° C. for about 2 h under argon with stirring. The reaction temperature was increased to about 95° C., and was maintained there for about 16 h. The mixture at about 23° C. was transferred to a dialysis tube (e.g., from Spectropore), and was dialyzed against about 4 L of water with two water changes per day for 7 days to form a milky dispersion. The milky dispersion was concentrated using a rotary evaporator, and dry particles of polymer were obtained by freeze drying the dispersion.

The freeze-dried particles were suspended in isopropanol and vacuum filtered onto Celgard 2320. After air-drying the composite was used as a lithium battery separator.

Example 14

A reaction of 2-hydroxymethyl-15-crown-5 and vinylbenzyl chloride was performed as follows. About 1.4 g of vinylbenzyl chloride (about 0.009173 mol) in about 45 g of freshly distilled, dry THF with an excess of about 1.7 g of 60 wt. % sodium hydride in oil were magnetically stirred. About 1.432 g of 2-hydroxymethyl-15-crown-5 (about 0.005721 mol) was added in a minimal amount (e.g., about 5 mL) of THF. The reaction vessel was stoppered, and the reaction mixture was stirred at about 23° C. for about 16 h. A portion of the reaction was pressure filtered through a 5 micrometer Mitex filter (Millipore), and the solvent was removed from the filtrate. The residue when analyzed using gc/ms analysis identified the product as 2-(((4-vinylbenzyl)oxy)methyl)-1,4,7,10,13-pentaoxacyclopentadecane

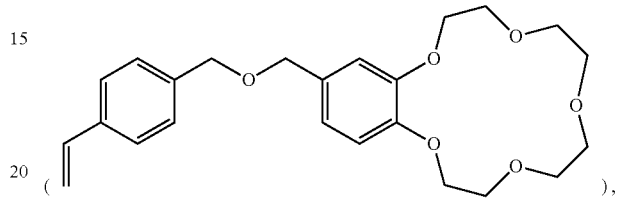

which also contains some unreacted vinylbenzyl chloride. About 20 mL of water was thereafter added, and the mixture was extracted with about 100 mL of hexanes. The hexanes layer contained about 1.48 g of oil, and the compound shown below and unreacted vinylbenzyl chloride. Distillation of this mixture produced oil and vinylbenzyl chloride in a volatile portion, and the residue polymerized. The aqueous layer was extracted with about 100 mL of the solvent (i.e., about 0.49 g of toluene, about 0.19 g of ether, and about 0.213 g of methylene chloride), which on drying yielded structure

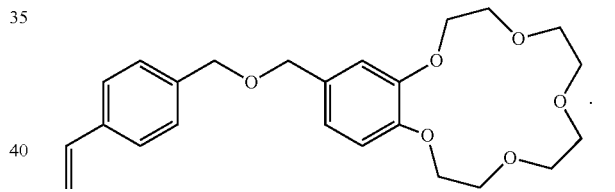

Figure 28:
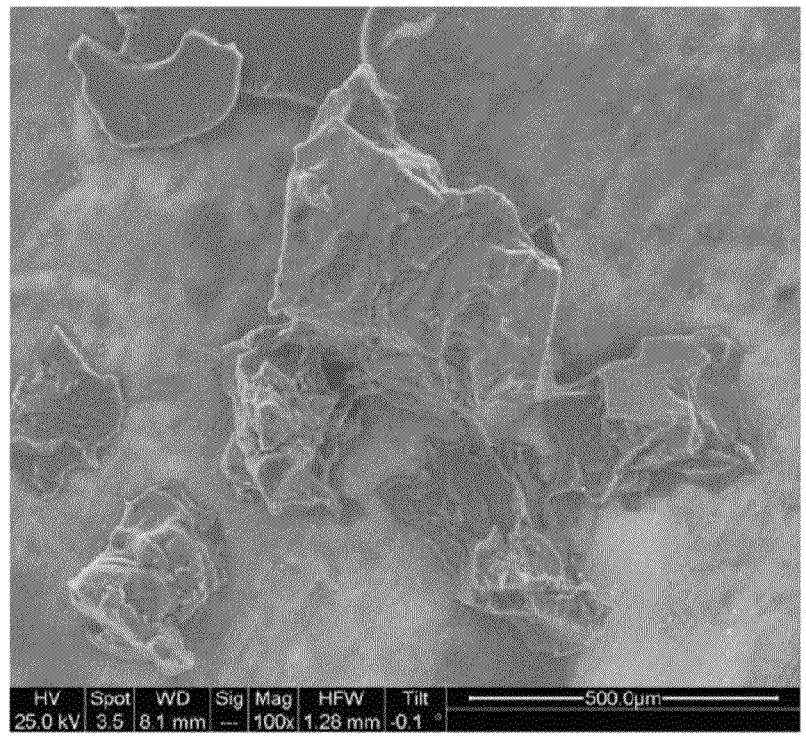
FIG. 28 is a scanning electron microscope (SEM) image of the monomer polymerized with vinylbenzyl chloride.

The polymer that formed during distillation at about 80° C. contained about 1.5 wt. % of chlorine, and consisted of large (e.g., from about 100 micrometer to about 500 micrometer) flat flakes of poly[2-(((4-vinylbenzyl)oxy)methyl)-1,4,7,10,13-pentaoxacyclopentadecane]. This is shown in the scanning electron microscope (SEM) image in FIG. 28.

Example 15

Figure 29:
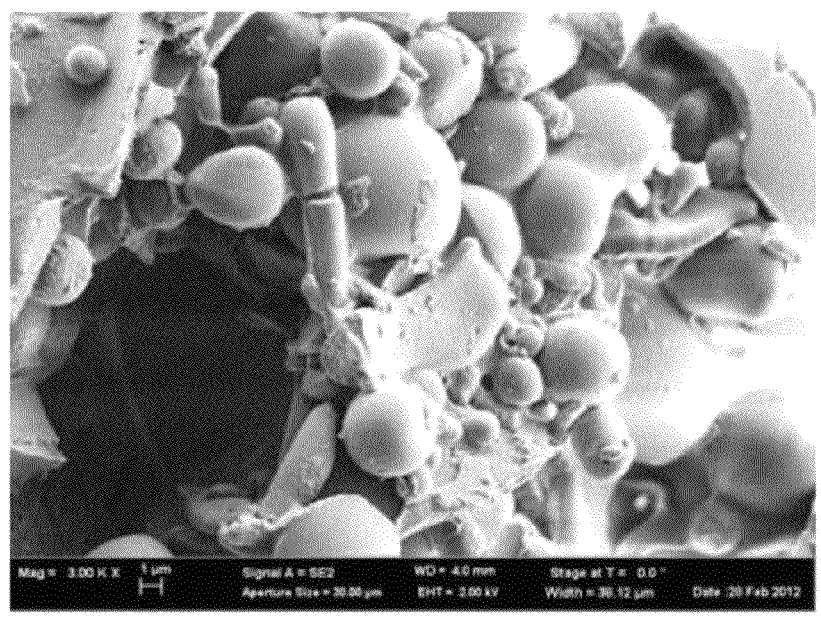
FIG. 29 is an SEM image of particles of polymerized and styrene moities.

Polymerization of structure 2-(((4-vinylbenzyl)oxy)methyl)-1,4,7,10,13-pentaoxacyclopentadecane,

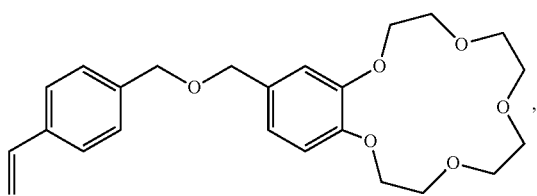 [SMILES: C=Cc1ccc(COCc2ccc3c(c2)OCCOCCOCCOCCO3)cc1]

with styrene was accomplished as follows. About 0.907 g of 2-(((4-vinylbenzyl)oxy)methyl)-1,4,7,10,13-pentaoxacyclopentadecane, (about 0.003085 mol) was dissolved in about 0.533 g of distilled styrene monomer (about 0.005125 mol) and about 0.1 g of divinylbenzene was added to form a monomer. The monomer was added to a mixture of about 0.01 g of potassium persulfate, about 0.01 g of sodium hydrogen phosphate, and about 0.1 g of sodium dodecylsulfate in about 20 mL of deionized water in a beverage bottle (e.g., 6.5 fluid ounce volume) equipped with a rubber septum and a magnetic stir bar. The emulsion was sparged with argon for about 30 minutes, and was then heated at about 70° C. for about 24 h. After cooling, the contents of the bottle were transferred to a dialysis tube (e.g., from Spectropore), and were dialyzed for 1 week against 4 L of deionized water with water changes occurring at least twice per day. The residue was freeze dried to yield about 1 g of polymer particles as shown in FIG. 29. These polymer particles are about 63 wt. % crown ether (about 37.6 mol. %), and the remainder was attributed to styrene moieties (about 37.6 mol. %).

The freeze-dried particles were suspended in isopropanol and vacuum filtered onto Celgard 2320. After air-drying the composite was used as a lithium battery separator.

Example 16

Figure 30A:
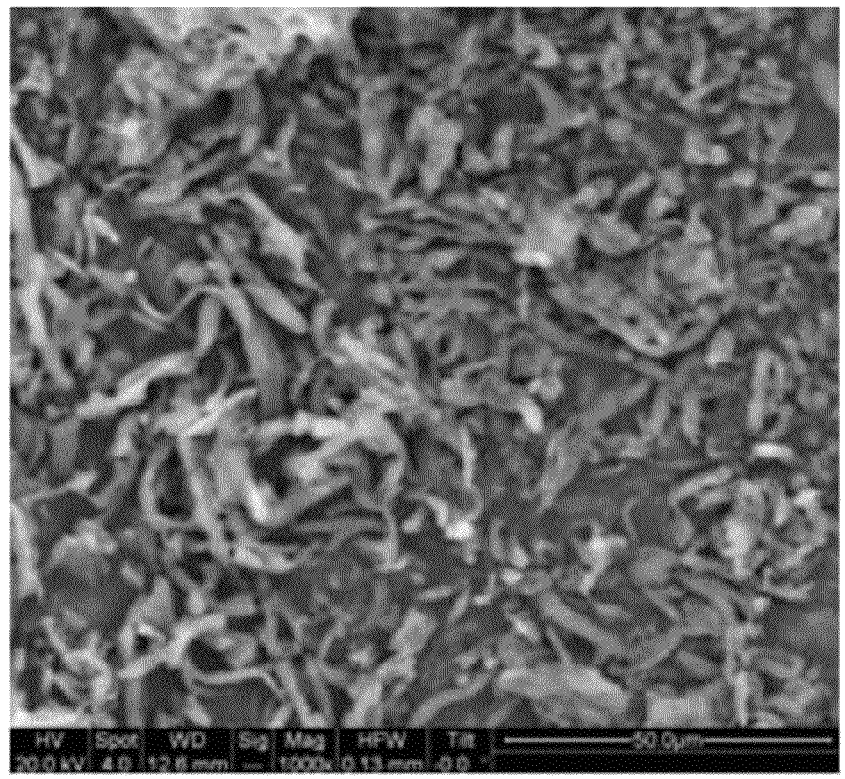
FIGS. 30A and 30B are SEM images of strands and particles of polymerized 4'-vinylbenzo-18-crown-6.
Figure 30B:
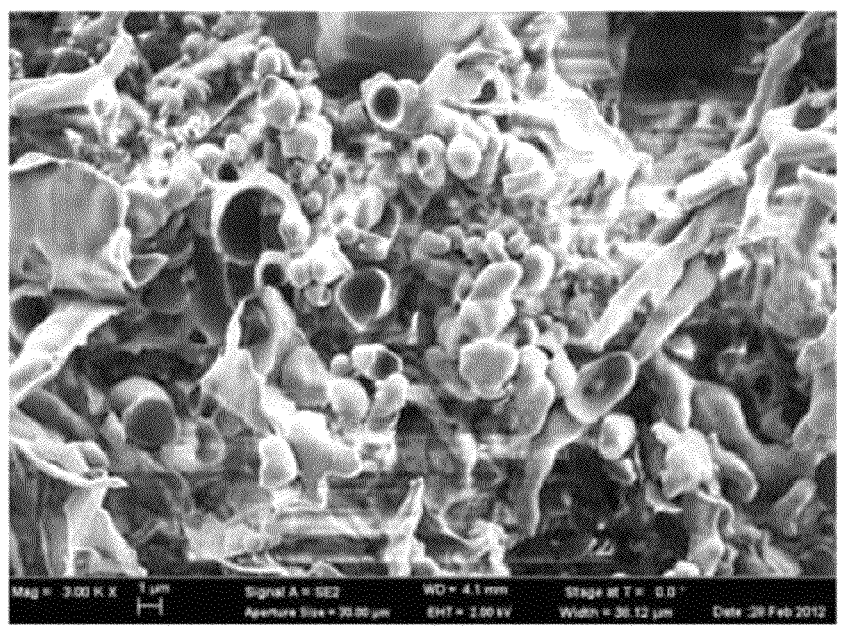

Polymerization of 4'-vinylbenzo-18-crown-6 was performed as follows. About 3 g of 4'-vinylbenzo-18-crown-6 and about 0.1 g of divinylbenzene were added to a mixture of about 0.02 g of potassium persulfate, about 0.02 g of sodium hydrogen phosphate, and about 0.02 g of sodium dodecylsulfate in about 40 mL of deionized water in a beverage bottle (6.5 fluid ounce volume) equipped with a rubber septum and a magnetic stir bar. The emulsion was sparged with argon for about 30 minutes, and was then heated at about 70° C. for about 48 hours. After cooling, the contents of the bottle were transferred to a Spectropore dialysis tube, and were dialyzed for 1 week against about 4 L of deionized water with water changes occurring at least twice per day. The residue was freeze dried to yield about 3 g of polymer fibers and particles as shown in FIGS. 30A and 30B.

The freeze-dried particles were suspended in isopropanol and vacuum filtered onto Celgard 2320. After air-drying the composite was used as a lithium battery separator.

Example 17

Figure 31:
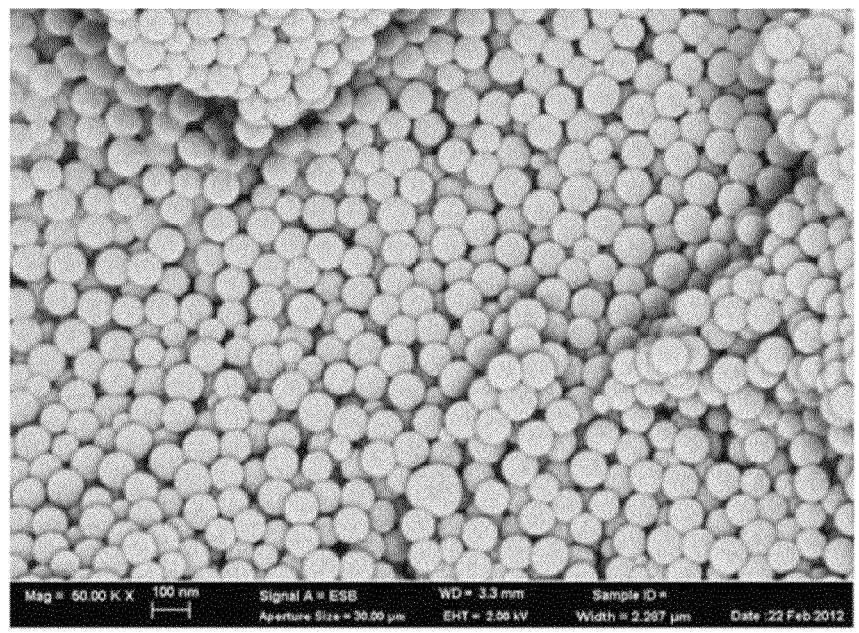
FIG. 31 is an SEM image of particles formed by emulsion polymerization of styrene and divinylbenzene with persulfate after dialysis and freeze drying.

Emulsion polymerization of styrene and divinylbenzene with persulfate was performed as follows. About 100 g water, about 0.05 g potassium persulfate, about 0.05 g sodium hydrogen phosphate, and about 1 g sodium laurylsulfate were placed in a bottle (e.g., about 6.5 fluid ounce bottle). When the mixture was dissolved, a mixture of 25 g styrene and 3% divinylbenzene was added. Argon was bubbled through the mixture to replace the air and to disperse the styrene. The argon tube was thereafter removed, the bottle was capped and sealed, and the mixture was stirred at about 70° C. for about 2 h, and then at about 95° C. for about 2 h. The latex was transferred to a dialysis tube, and was dialyzed for 1 week with frequent water changes. The polymer product is shown in FIG. 31 after dialysis and freeze-drying. This reaction was repeated four more times with styrene and 5 wt. %, 10 wt. % (EXAMPLE 18), 20 wt. %, and 40 wt. % (EXAMPLE 24) divinyl benzene, respectively.

Each of the reaction products consisting of about 100-nm particles was purified by dialysis and then isolated by freeze drying.

Example 18

Figure 32:
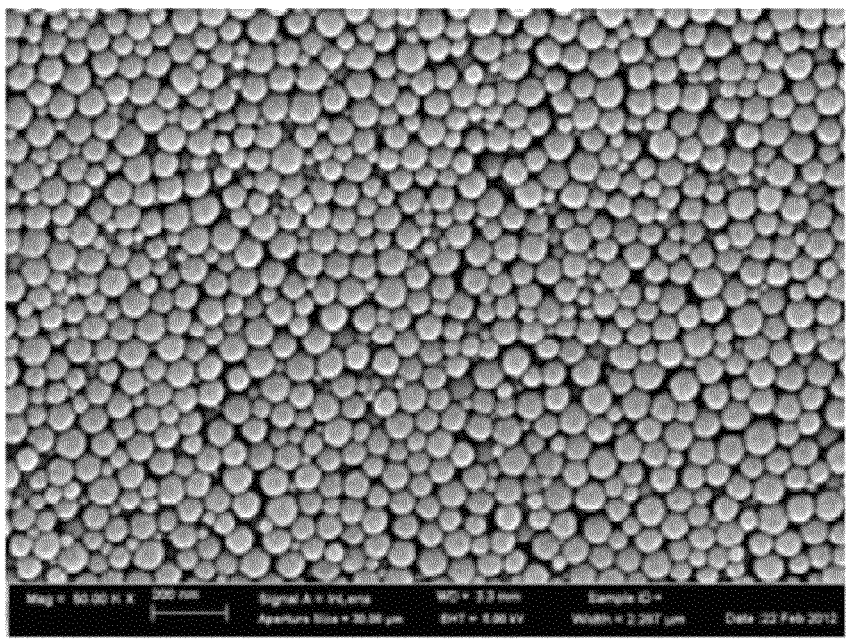
FIG. 32 is another SEM image of particles formed by emulsion polymerization of styrene, divinylbenzene, and persulfate after freeze-drying and dialysis were performed.

Emulsion polymerization of styrene and 10 wt. % divinylbenzene with persulfate was performed as follows. About 100 g water, about 0.1 g potassium persulfate, about 0.1 g sodium hydrogen phosphate, and about 1 g sodium dodecylsulfate were placed in a 3-necked, 500-mL round-bottom flask equipped with a mechanical stirrer, condenser, and argon inlet. When this mixture dissolved, another mixture of about 25 g styrene and about 3 g of divinylbenzene (for 10 wt. % cross-linking) was added. After about 30 minutes at about 23° C., this mixture was stirred i) at about 40° C. for about 64 h, ii) then at about 60° C. for about 4 h, and iii) then at about 70° C. for about 16 h. The latex that formed was transferred to a dialysis tube, and was dialyzed for 1 week with frequent water changes. Particle size of the product that was produced was measured to be about 96 nm in diameter. From the result, the inventors found that it was more desirable to freeze dry the product before dialysis, because freeze-drying will remove unreacted monomer before it dissolves the particles. The resultant particles formed by the method described in Example 18 are shown in FIG. 32.

Example 19

Reaction of vinylbenzyl chloride (e.g., a 75% mixture of 3- and 4-isomers) and aza 15-crown-5

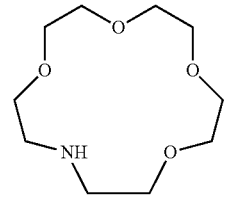 [SMILES: C1COCCOCCOCCOCCN1]

to form

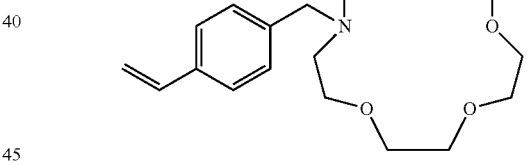

as a mixture of isomers was accomplished as follows. About 0.640 g of vinylbenzyl chloride (about 0.00456 mol) in about 8.36 g of dry tetrahydrofuran was roll milled in a 25 mL Wheaton jar (which had a polyolefin screw cap) with about 1.236 g of 1-aza-15-crown-5 (about 0.005637 mol) dissolved in about 9 g of tetrahydrofuran. The clear, water white solutions immediately turned yellow when the solutions were combined. After roll milling for about 24 hours, about 1 g more of the 1-aza-15-crown-5 was added and roll-milling was maintained for another 24 hours. The solvent was removed, and the residue consisted of an oil. After washing the oil with hexanes, the hexanes-soluble fraction consisted of about 11.7% vinylbenzyl chloride and about 88.3% 13-(4-vinylbenzyl)-1,4,7,10-tetraoxa-13-azacyclopentadecane with about 8.6% unreacted 1,7-aza-15-crown-5 of the total mixture. A hexanes-insoluble white crystalline fractions remained that consisted of about 3% vinylbenzyl chloride and about 95.1% 13-(4-vinylbenzyl)-1,4,7,10-tetraoxa-13-azacyclopentadecane. After the reaction was stopped, a 1:1 mixture of unreacted 1,7-aza-15-crown-5 and protonated 1,7-aza-15-crown-5 formed, each consisting of about 19.5% of the total mixture. The mixture was polymerized in an emulsion with divinylbenzene. The 13-(vinylbenzyl)-1,4,7,10-tetraoxa-13-azacyclopentadecane) and divinylbenzene (0.06 g) were dissolved in about 40 mL of water, and about 1 g of sodium dodecylsulfate, about 0.1 g of potassium persulfate, and about 0.1 g of sodium hydrogen phosphate were added. Polymerization was carried out for 1 day at about 40° C. and 1 day at about 60° C. The liquid (i.e., the emulsion) was dialyzed against 4 L of water for 1 week with frequent water changes, and then the polymer emulsion (which exhibited a light-yellow color) was freeze-dried to yield particles of poly[13-(4-vinylbenzyl)-1,4,7,10-tetraoxa-13-azacyclopentadecane]. In this example, the yield of particles was relatively low, and so the procedure in EXAMPLE 23 was developed.

Example 20

Figure 33A:
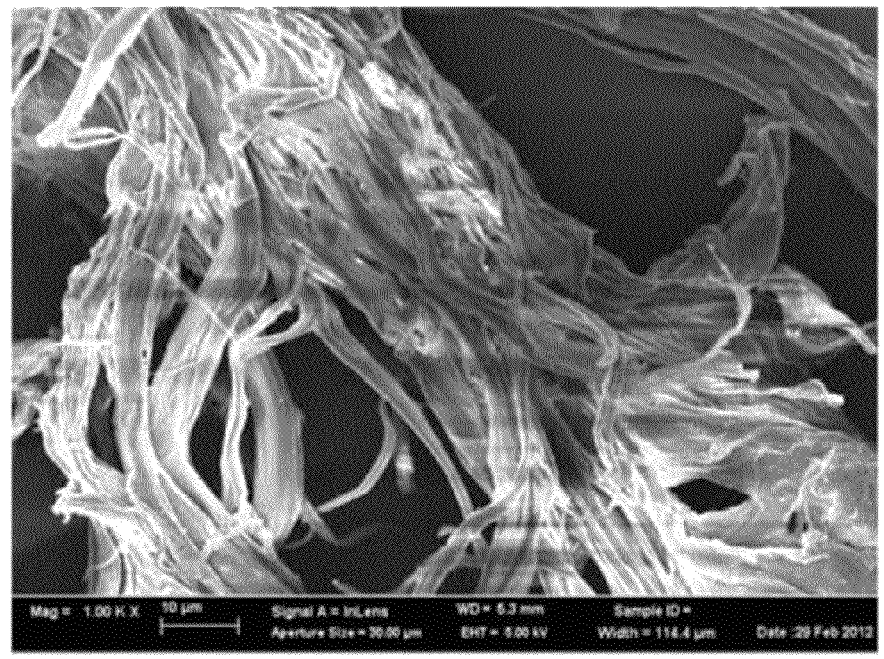
FIGS. 33A and 33B are SEM images of polystyrene-3 wt. % divinylbenzene particles after a chloromethylation reaction.
Figure 33B:
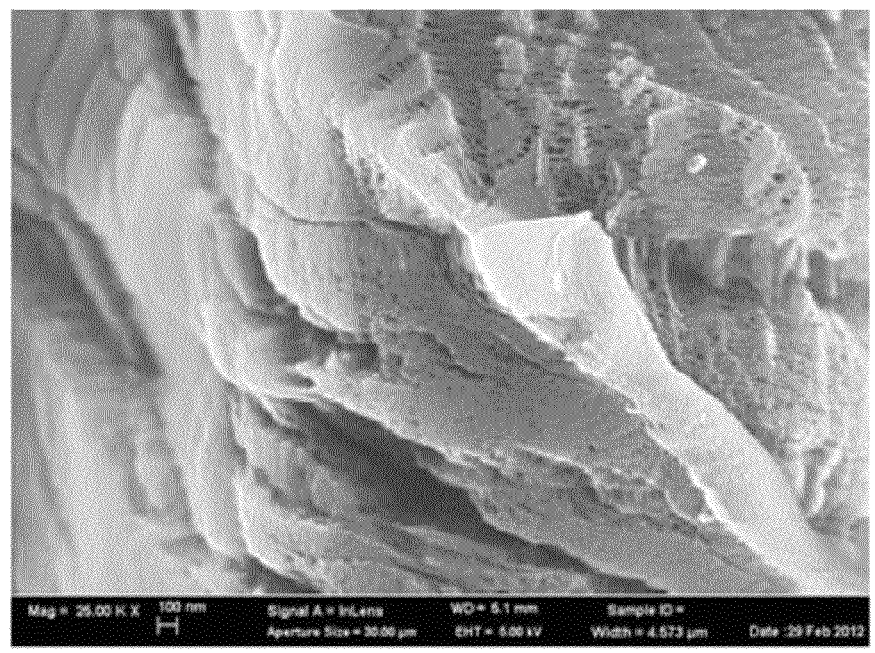

Chloromethylation of emulsion polymerized styrene-divinylbenzene particles was accomplished as follows. A solution of chloromethyl ether in methyl acetate was made by adding about 31.1 mL of acetyl chloride to a mixture of about 44 mL of dimethoxymethane and about 10 mL of methanol to a 500-mL, 3-neck flask. The flask was placed in an oil bath, and was equipped with a condenser, a mechanical stirrer, an argon inlet, and an addition funnel. About 130 mL of dichloromethane was added to the mixture. Tin tetrachloride (0.5 mL) was added via syringe to the addition funnel equipped with a rubber septum and containing 20 mL of dichloromethane. This solution was added dropwise to the reaction mixture at a slow enough rate to control the sudden, vigorous reflux that may occur soon after a portion of the tin tetrachloride is added. After the addition was complete and refluxing subsided, the styrene-divinyl benzene particles (5 g) were added all at once with vigorous stirring. Dichloromethane (40 mL) was used to complete the transfer of the particles to the reaction mixture. A homogenizer (IKA Turrax T25) was used to completely disperse the particles in the reaction mixture. Then the oil bath temperature was increased to 50° C. and boiling at reflux with stirring was maintained for 18 h. After cooling to 23° C., methanol (about 50 mL) was added via a squirt bottle until the mixture turned from red to colorless. The solvent was partly removed using a rotary evaporator until a solid coagulates with the consistency of taffy. The solid was blended with 250 mL of methanol using a Waring blender with a Variac to control the stirring speed, and the particulates were filtered, washed with methanol and dried. The wt. % of chlorine was between 4.4 and 4.6 (about 5%). The mass increase in the product compared with starting material was consistent with 7% Cl. This corresponded to about 1 chloromethyl group per 7 styrene groups (calculated at 4.57%). SEM pictures of the resultant product are shown below in FIGS. 33A and 33B. Chloromethylation of polymer beads made with greater amounts of divinylbenzene (e.g., more than 5 wt. %) as described in Examples 17 and 18 are required to prevent the particles from losing their 100 nm dimensions.

Example 21

Reaction of chloromethylated polystyrene-divinylbenzene particles with 2-hydroxymethyl-15-crown-5 was performed as follows. Some of the chloromethylated particles (1 g), after being ground up with a mortar and pestle, were suspended in dry tetrahydrofuran (100 mL) with 50 wt. % sodium hydride in oil and 2-hydroxymethyl-15-crown-5 (1 g) was added. The mixture was magnetically stirred under argon for 3 days at 23° C., and then methanol was cautiously added. After the sodium hydride was consumed, the particles were isolated by filtration, washed with methanol and dried. The particles had crown ethers attached. One gram of polystyrene-divinylbenzene with 1 chloromethyl group per 6 styrene groups required 0.37 g of hydroxymethyl-15-crown-5. Replacement of the chloride from the chloromethyl groups with 1-aza-15-crown-5 required 0.33 g at 1 molar equivalent/1 molar equivalent, or 0.66 g at 2 molar equivalents of 1-aza-15-crown-5 per molar equivalent of chloromethyl groups. Replacement of the chloride from the chloromethyl groups with aza-15-crown-5 was also carried out in THF with 2-molar equivalents of lithio-aza-15-crown-5 within 5 days at 23° C.

The particulate product was then dispersed into reverse osmosis (RO) water using a Misonix 3000 ultrasonic homogenizer for 5 minutes. The homogenizer was set to pulse mode (10 seconds on-10 seconds off) at 18 Watts. The resulting dispersion was filtered onto a Millipore filter (0.5-μm pore), washed with isopropanol, and then air-dried to break-up the particles into smaller dimensions. The particles were suspended in isopropanol and vacuum filtered onto Celgard 2320. After air-drying, the composite was used as a lithium battery separator.

Example 22

Figure 34A:
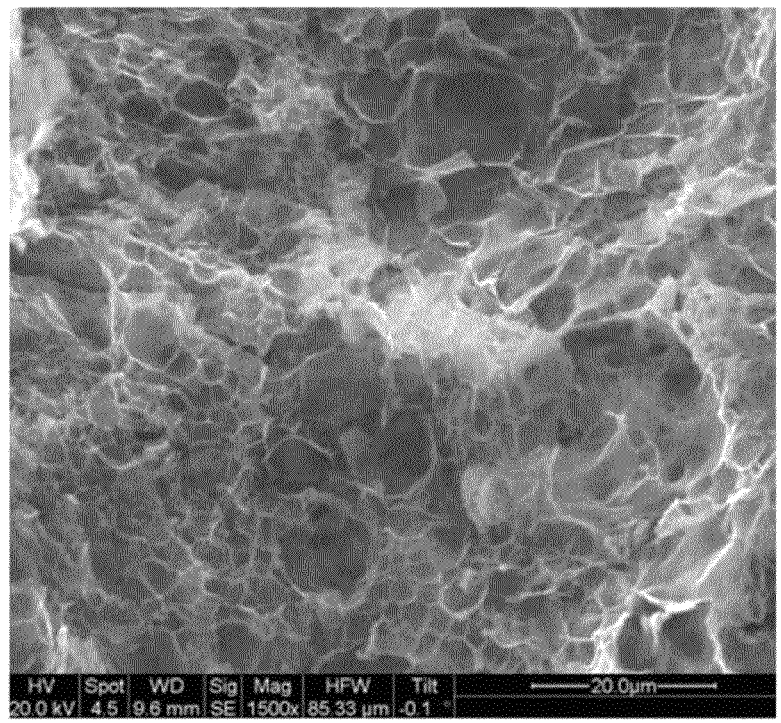
FIGS. 34A, 34B, and 34C are SEM images of brominated polymerized styrene-divinylbenzene particles.
Figure 34B:
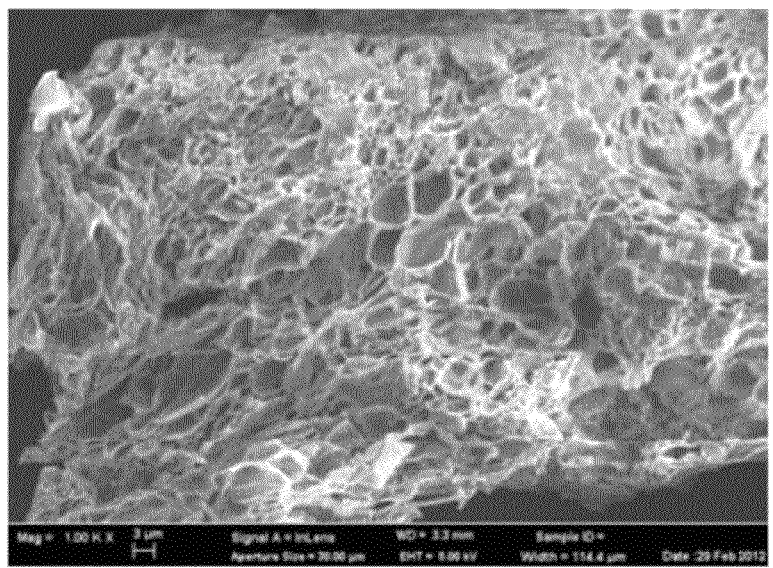
Figure 34C:
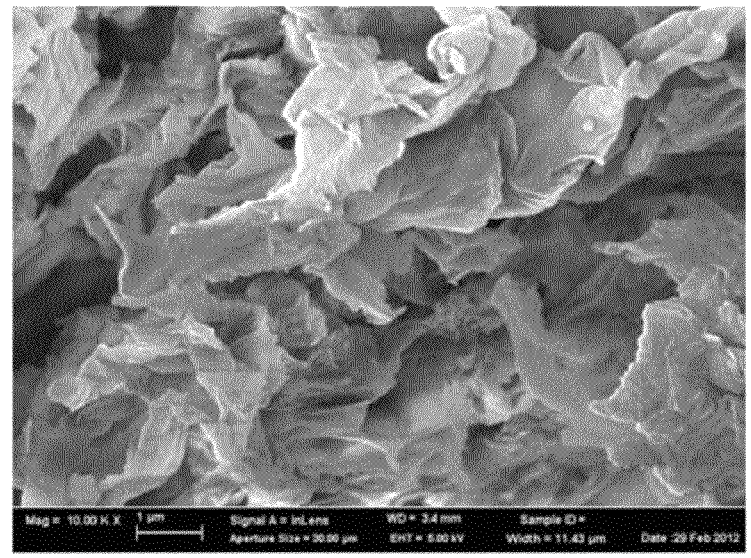

Bromination of emulsion polymerized styrene-divinylbenzene particles was performed as follows. To dichloromethane (100 mL) in a 120-mL screw cap jar with a TEFLON® lid liner was added styrene-divinylbenzene particles (5 g), iron particles (10 micrometer or less, 0.518 g), a stir bar and bromine (7.68 g). The mixture was vigorously shaken and then placed on a roll mill. Within 30 minutes, the red solution became a jelled mass. The mixture was allowed to roll mill for 18 hours and then was chopped in a Waring blender with 250 mL of water. The polymer was collected and washed with methanol (two×250 mL) using a Waring blender, isolated by filtration and then rinsed with more methanol. The particles were then suspended and stirred for 2 hours in a jar with 90 mL of water and 10 mL of concentrated hydrochloric acid. The particles were filtered, washed with water (3 liters) and then with methanol (two times 200 mL). After isolation by filtration and drying, white particles were obtained. The % Br ranged between 32 wt. % and 35 wt. %. At 1 bromine atom per each styrene group the calculated % Br was 44 wt. % and for 1 Br per two styrene groups, the calculated wt. % Br was 27.8. The morphology of the brominated product is shown in the SEM pictures depicted in FIGS. 34A, 34B, and 34C.

The particulate product was then dispersed into reverse osmosis (RO) water using a Misonix 3000 ultrasonic homogenizer for 5 minutes. The homogenizer was set to pulse mode (10 seconds on-10 seconds off) at 18 Watts. The resulting dispersion was filtered onto a Millipore filter (0.5-μm pore), washed with isopropanol, and then air-dried to break-up the particles into smaller dimensions.

Example 23

An ion exchange polymer material with pendant aza-15-crown-5 groups was made as follows. Aza-15-crown-5 (1 g) in dry tetrahydrofuran (100 mL) in a Schlenk flask (under argon equipped with a rubber septum and an argon inlet) was cooled to about −30° C. in an isopropanol-liquid nitrogen bath. Via syringe, n-butyllithium (3.5 mL of a 1.6 molar solution in hexanes) was added. The reaction mixture was allowed to return to 23° C. and was stirred for 30 minutes. Chloromethylated particles (1 g) were added in dry tetrahydrofuran (20 mL) and the reaction was allowed to proceed for 1 week at 23° C. The reaction mixture was concentrated under vacuum and then was blended with water (250 mL). The particles were isolated by filtration, washed with water and then methanol and then were dried. These particles were suspended in methylene chloride and methanol and filtered onto Celgard 2320 battery separators.

Example 24

Emulsion polymerization of 60 wt. % styrene and 40 wt. % divinylbenzene with persulfate was performed as follows. About 100 g of water, about 0.1 g of potassium persulfate, about 0.1 g of sodium hydrogen phosphate, and about 1 g of sodium dodecyl sulfate were added to a bottle (e.g., a 6.5 fluid ounce bottle) equipped with a magnetic stirrer. After the mixture dissolved, another mixture of about 10.446 g of styrene and about 6.964 g of divinylbenzene was added, and the bottle was sealed with a rubber septum. Argon was passed over the emulsion to replace the air and to disperse the reactants. The argon was removed, and the mixture in the sealed bottle was stirred at about 60° C. for about 18 h, and then at about 95° C. for about 2 h. The latex formed included about 3.34 g of polymer solids, which were filtered off through a 100 μm polypropylene mesh (Sefar) and discarded. The remaining emulsion was transferred to a dialysis tube, and was dialyzed for 1 week with frequent water changes. After freeze-drying, about 13.9 g of 100 nm particulate product was obtained.

Example 25

Emulsion polymerization of 4'-vinylbenzo-18-crown-6 was performed as follows. About 10 g of water, about 0.005 g of potassium persulfate, about 0.005 g of sodium hydrogen phosphate, and about 0.05 g of sodium dodecyl sulfate were added to a 50-mL, one-neck flask with a 14/20 joint including a stir bar. After the mixture dissolved, about 1 g of 4'-vinylbenzo-18-crown-6 and about 0.05 g of freshly distilled divinylbenzene (about 1 drop) was added. The flask was then equipped with a reflux condenser, a yellow Keck clamp, and a rubber suba seal septum for sparging the liquid with argon using a long needle for an argon gas inlet and another needle connected to a silicone oil bubbler for an exit. Argon was passed over the emulsion to replace the air and disperse the reactants for about 30 minutes. The argon gas was removed, and the mixture in the sealed flask was stirred in a 70° C. oil bath for about 2 h, then at about 95° C. (i.e., oil bath set temperature) for about 16 h. The cooled emulsion was transferred to a dialysis tube (Spectropore), and was dialyzed for 1 week with frequent water changes. After freeze-drying, about 0.9 g of poly(vinylbenzo-18-crown-6) was obtained in the form of 120 nm diameter white beads.

Figure 35A:
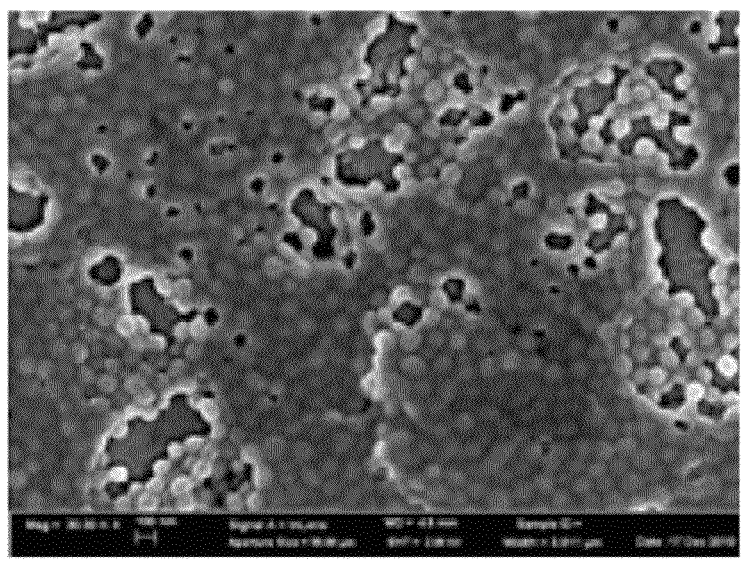
FIGS. 35A and 35B are SEM images of 100 nm, crosslinked particles of poly[4'-vinylbenzo-18-crown-6] on Celgard 2320.
Figure 35B:
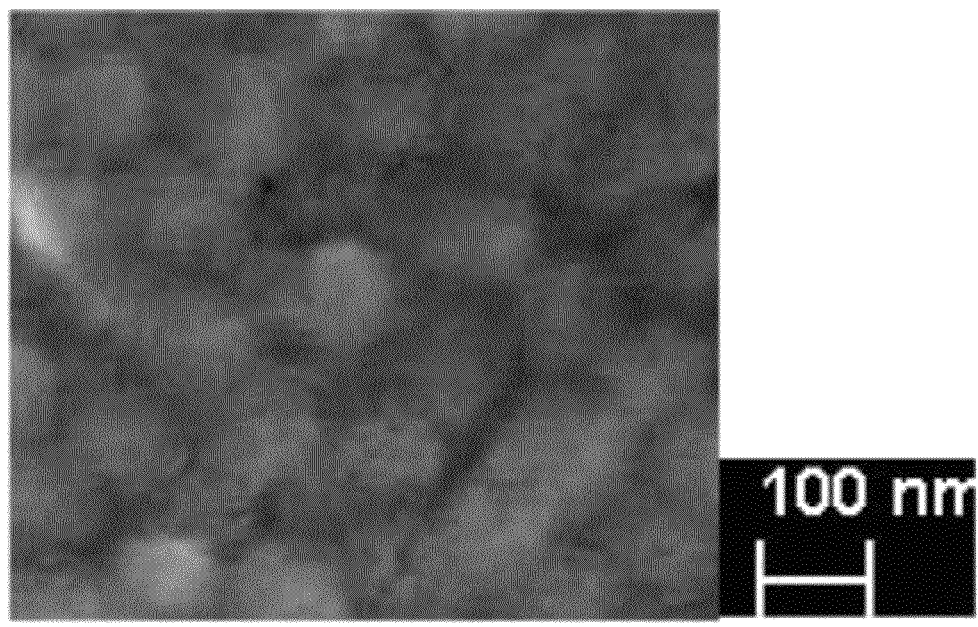

The freeze-dried particles were suspended in isopropanol and vacuum filtered onto Celgard 2320. After air-drying, the composite was used as a lithium battery separator. SEM images of the particles on the Celgard 2320 battery separators are shown in FIGS. 35A and 35B.

Example 26

The compound 4'-hydroxymethylbenzo-15-crown-5 was prepared as follows. To 4'-formylbenzo-15-crown-5 (1 g) in dry tetrahydrofuran (THF, 20 mL) was added under argon with stirring, an excess of 1.3 M borane-THF (via syringe). The mixture was refluxed for 8 hours and then allowed to cool to 23° C. Dilute acetic acid was added dropwise until the borane had reacted and then the solvent was removed under vacuum. Methylene chloride (100 mL) was added, and the solution was dried over sodium sulfate and filtered. After the methylene chloride was removed under vacuum, 4-hydroxymethylbenzo-15-crown-5 remained, which was recrystallized from diethyl ether.

Example 27

Vinylbenzyloxymethylbenzo-15-crown-5 was made by reacting 4-hydroxymethylbenzo-15-crown-5 (1 g) with vinylbenzyl chloride (0.5 g) in tetrahydrofuran (50 mL) with excess sodium hydride (2 g, as a 60 wt. % dispersion in oil) under argon for 5 days at 23° C. The reaction mixture was filtered and the unreacted sodium hydride was neutralized cautiously with isopropanol. The tetrahydrofuran was removed under vacuum and the residue was vinylbenzyloxymethylbenzo-15-crown-5, which was purified with alumina chromatography using toluene as the eluent.

Example 28

The compound 2'-hydroxyethylbenzo15-crown-5 was made by reacting 4'-vinylbenzo-15-crown-5 (1 g) in dry THF (50 mL) with 1.3 M borane-THF (added via a syringe). The mixture was refluxed for 8 hours and then hydrogen peroxide (5 mL of a 30 wt. % solution) and sodium hydroxide (5 mL of a 50 wt. % solution) was added. The reaction mixture was stirred for 16 h at 23° C. The reaction mixture was neutralized with dilute hydrochloric acid and the tetrahydrofuran solvent was removed under vacuum. The aqueous mixture was extracted with methylene chloride, dried over sodium sulfate and filtered. The residue was purified by alumina chromatography with methanol as the eluent to obtain 2'-hydroxyethylbenzo-15-crown-5.

It is to be understood that the ranges provided herein include the stated range and any value or sub-range within the stated range. For example, a range from about 0.5 g to about 1 g should be interpreted to include not only the explicitly recited limits of about 0.5 g to about 1 g, but also to include individual values, such as 0.6 g, 0.75 g, etc., and sub-ranges, such as from about 0.7 g to about 0.9 g, etc. Furthermore, when "about" is utilized to describe a value, this is meant to encompass minor variations (up to +/−5%) from the stated value.

While several examples have been described in detail, it will be apparent to those skilled in the art that the disclosed examples may be modified. Therefore, the foregoing description is to be considered non-limiting.

The invention claimed is:
1. A lithium ion battery, comprising:
a positive electrode;
a negative electrode;
a microporous polymer separator soaked in an electrolyte solution, the microporous polymer separator disposed between the positive electrode and the negative electrode; and
an ion exchange polymer material any of i) incorporated as a binder in any of the positive electrode or the negative electrode, ii) deposited onto a surface of any of the positive electrode or the negative electrode, iii) incorporated into the microporous polymer separator, or iv) deposited onto a surface of the microporous polymer separator;
wherein the ion exchange polymer material is one polymerized monomer, and the one monomer is selected from the group consisting of:

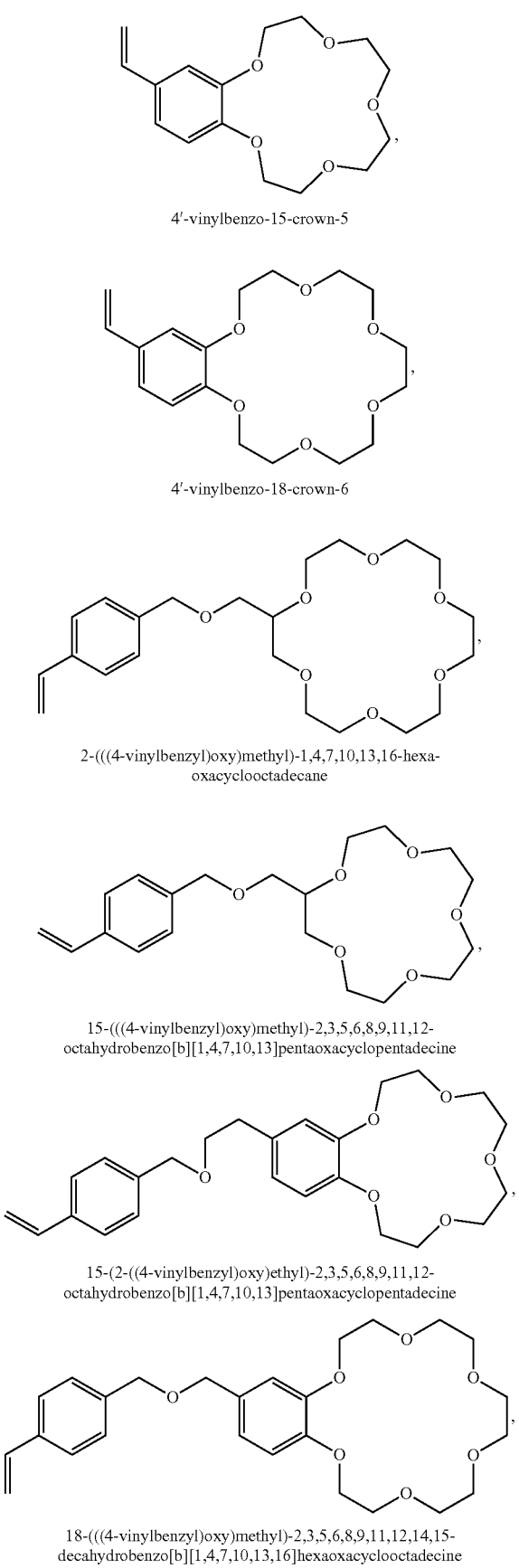

4′-vinylbenzo-15-crown-5

4′-vinylbenzo-18-crown-6

2-(((4-vinylbenzyl)oxy)methyl)-1,4,7,10,13,16-hexa-oxacyclooctadecane 15-(((4-vinylbenzyl)oxy)methyl)-2,3,5,6,8,9,11,12-octahydrobenzo[b][1,4,7,10,13]pentaoxacyclopentadecine 15-(2-((4-vinylbenzyl)oxy)ethyl)-2,3,5,6,8,9,11,12-octahydrobenzo[b][1,4,7,10,13]pentaoxacyclopentadecine 18-(((4-vinylbenzyl)oxy)methyl)-2,3,5,6,8,9,11,12,14,15-decahydrobenzo[b][1,4,7,10,13,16]hexaoxacyclooctadecine

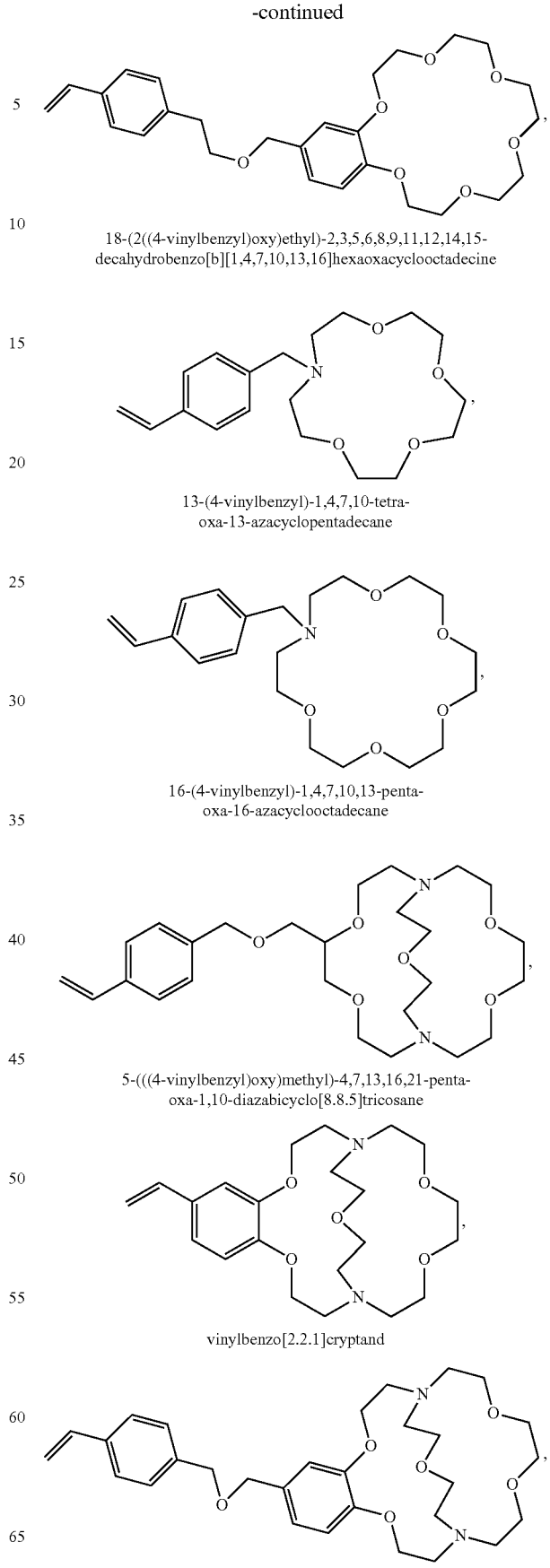

18-(2((4-vinylbenzyl)oxy)ethyl)-2,3,5,6,8,9,11,12,14,15-decahydrobenzo[b][1,4,7,10,13,16]hexaoxacyclooctadecine 13-(4-vinylbenzyl)-1,4,7,10-tetra-oxa-13-azacyclopentadecane 16-(4-vinylbenzyl)-1,4,7,10,13-penta-oxa-16-azacyclooctadecane 5-(((4-vinylbenzyl)oxy)methyl)-4,7,13,16,21-penta-oxa-1,10-diazabicyclo[8.8.5]tricosane vinylbenzo[2.2.1]cryptand -continued

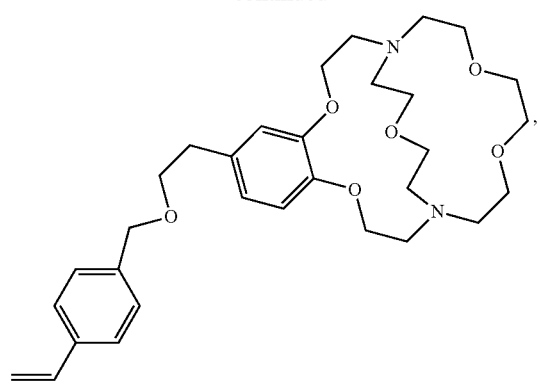

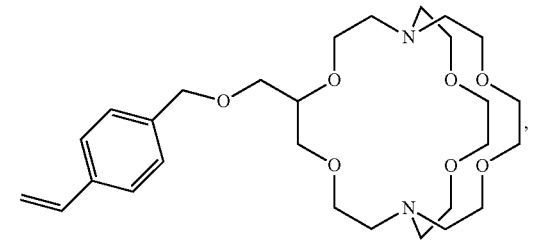

vinylbenzyl[2.2.2]cryptand

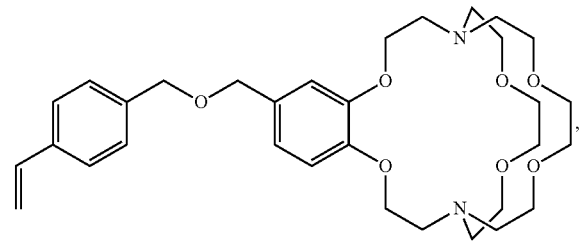

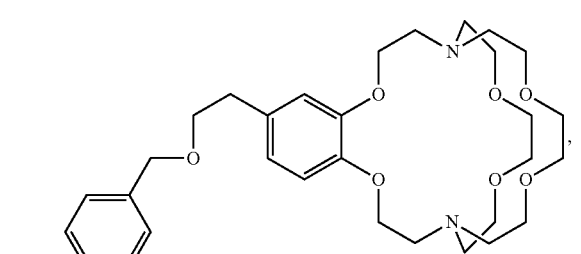

-continued

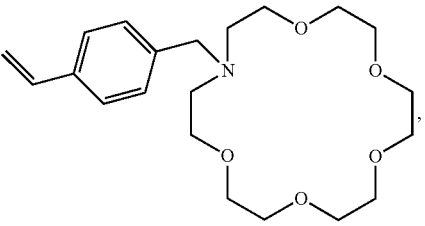

13-(4-vinylbenzyl)-1,4,7,10-tetraoxa-13-aza-cyclopentadecane

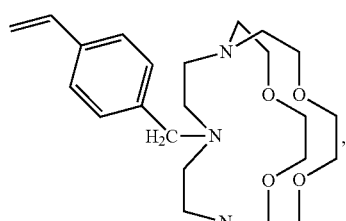

16-(4-vinylbenzyl)-1,4,7,10,13-pentaoxa-16-aza-cyclooctadecane

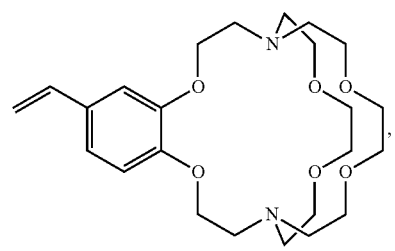

5-(((4-vinylbenzyl)oxy)methyl)-4,7,13,16,21,24-hexa-oxa-1,10-diazabicyclo[8.8.8]hexacosane 21-(4-vinylbenzyl)-4,7,13,16-tetra-oxa-1,10,21-triazabicyclo[8.8.5]tricosane and isomers thereof.

2. The lithium ion battery as defined in claim 1 wherein the ion exchange polymer material is cross-linked with a cross-linking agent selected from the group consisting of

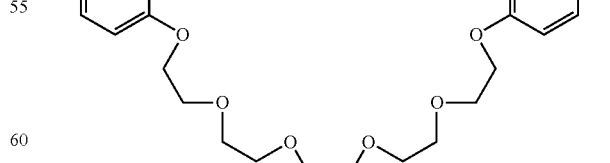

2,23-divinyl-6,7,9,10,12,13,15,16,18,19,26,27,29,30,32,33,35,36,38,39-icosahydrodibenzo[b,t][1,4,7,10,13,16,19,22,25,28,31,34]dodecaoxacyclohexatriacontine or isomers thereof, and

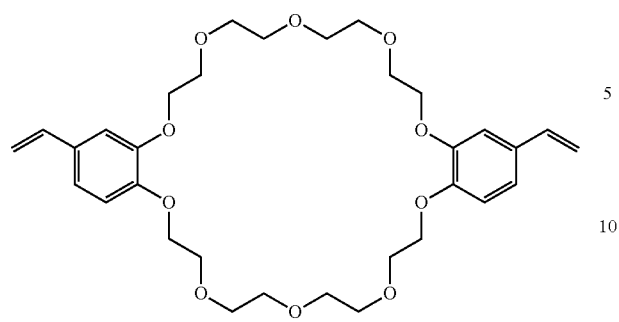

2,20-divinyl-6,7,9,10,12,13,15,16,23,24,26,27,29,30,32,33-hexadecahydrodibenzo[b,q][1,4,7,10,13,16,19,22,25,28]decaoxacyclotriacontine or isomers thereof.

3. The lithium ion battery as defined in claim 1 wherein the ion exchange polymer material is deposited onto the surface of any of the positive electrode or the negative electrode.

4. A lithium ion battery, comprising:

a positive electrode;

a negative electrode;

a microporous polymer separator soaked in an electrolyte solution, the microporous polymer separator disposed between the positive electrode and the negative electrode; and an ion exchange polymer material any of i) incorporated as a binder in any of the positive electrode or the negative electrode, ii) deposited onto a surface of any of the positive electrode or the negative electrode, iii) incorporated into the microporous polymer separator, or iv) deposited onto a surface of the microporous polymer separator;

wherein the ion exchange polymer material is

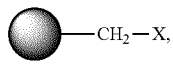

and wherein X is selected from the group consisting of:

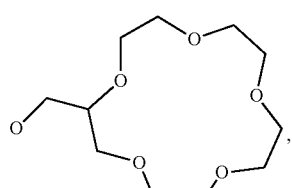

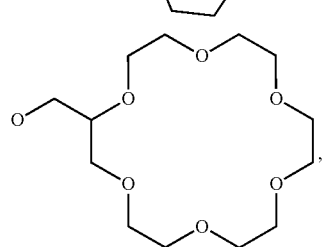

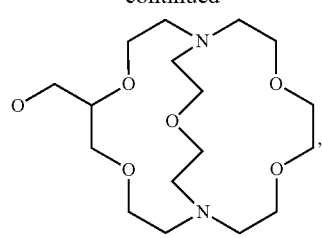

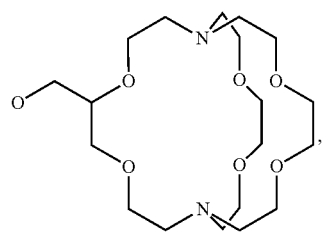

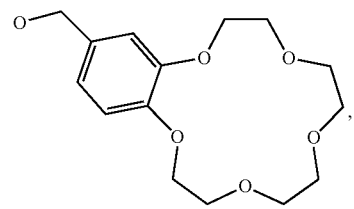

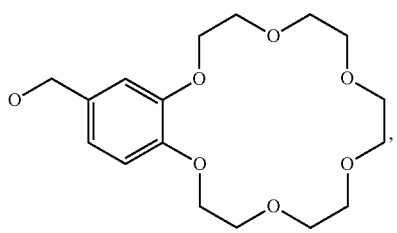

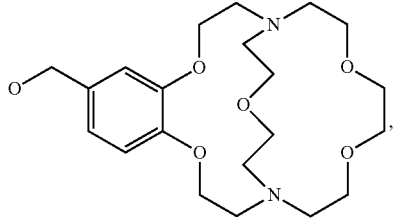

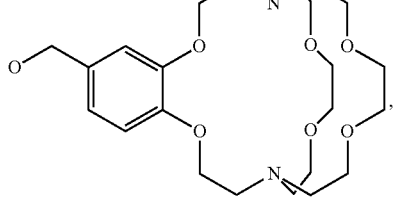

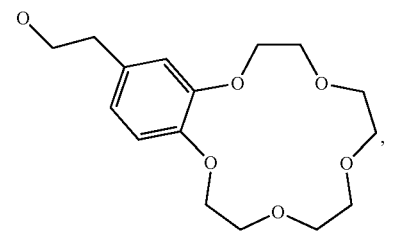

-continued

[chemical structures]

and isomers thereof; and wherein the ⬤ is selected from the group consisting of polyurethanes, polycarbonates, polyetheretherketones, polyethersulfones, polyimides, polyamide-imides, polyethers, polyoxymethylene, polybutylene terephthalate, polyethylenenaphthenate, polybutene, acrylonitrile-butadiene styrene copolymers, polystyrene copolymers, polymethylmethacrylate, polyvinyl chloride, polysiloxane polymers, polybenzimidazole, polybenzoxazole, polyphenylenes, polyarylene ether ketones, polyperfluorocyclobutanes, polytetrafluoroethylene, liquid crystalline polymers, polyaramides, polyphenylene oxide, and combinations thereof.

5. A lithium ion battery, comprising:
a positive electrode;
a negative electrode;
a microporous polymer separator soaked in an electrolyte solution, the microporous polymer separator disposed between the positive electrode and the negative electrode; and
an ion exchange polymer material any of i) incorporated as a binder in any of the positive electrode or the negative electrode, ii) deposited onto a surface of any of the positive electrode or the negative electrode, iii) incorporated into the microporous polymer separator, or iv) deposited onto a surface of the microporous polymer separator;
wherein the ion exchange polymer material is one polymerized monomer; the one monomer is

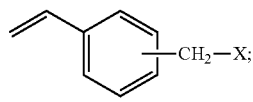

and X is selected from the group consisting of:

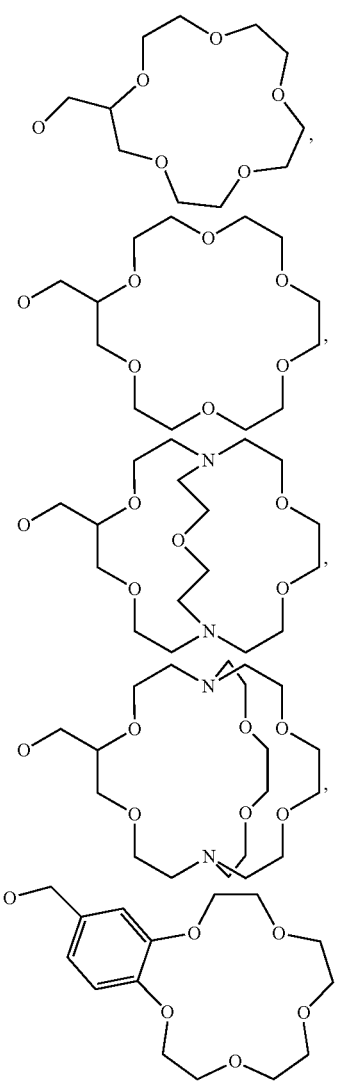

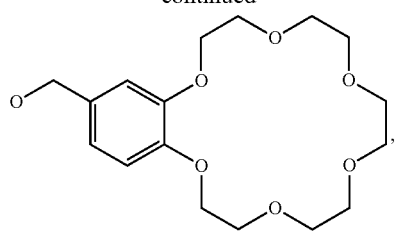

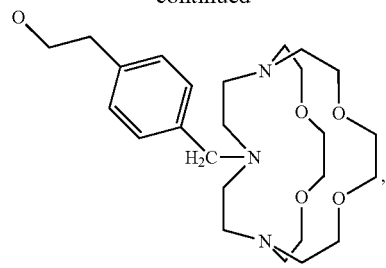

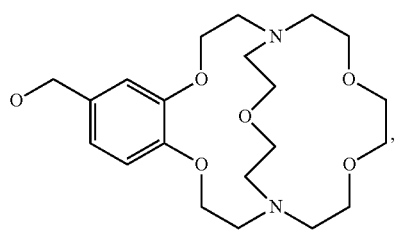

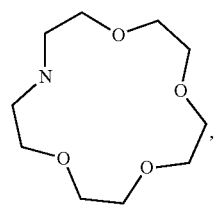

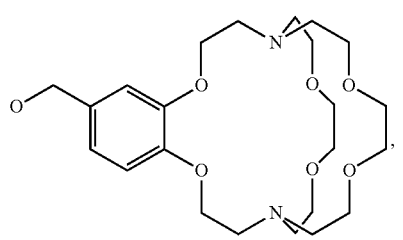

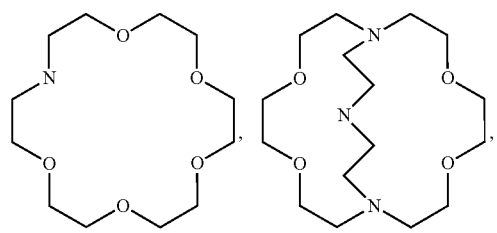

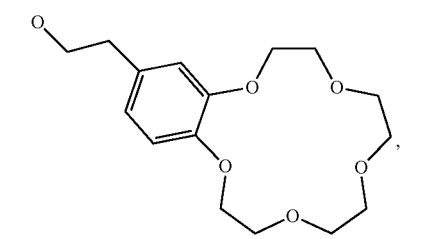

and isomers thereof.

6. A lithium ion battery, comprising:

a positive electrode;

a negative electrode;

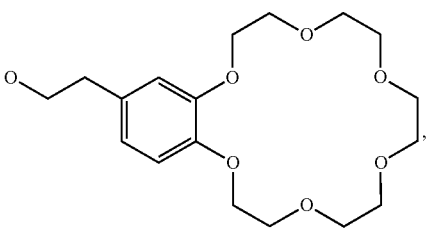

a microporous polymer separator soaked in an electrolyte solution, the microporous polymer separator disposed between the positive electrode and the negative electrode; and an ion exchange polymer material any of i) incorporated as a binder in any of the positive electrode or the negative electrode, ii) deposited onto a surface of any of the positive electrode or the negative electrode, iii) incorporated into the microporous polymer separator, or iv) deposited onto a surface of the microporous polymer separator;

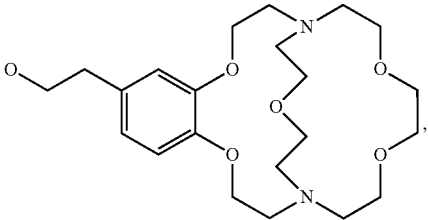

wherein a precursor to the ion exchange polymer material is

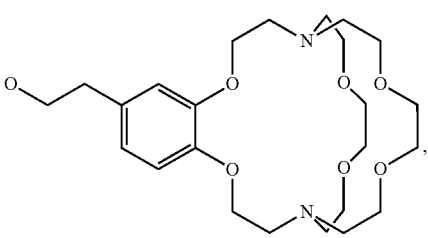

reacted with a hydroxy-substituted cryptand so the hydroxy-substituted cryptand replaces the Cl group and becomes a pendant group of the ion exchange polymer material, the hydroxy-substituted cryptand being selected from the group consisting of:

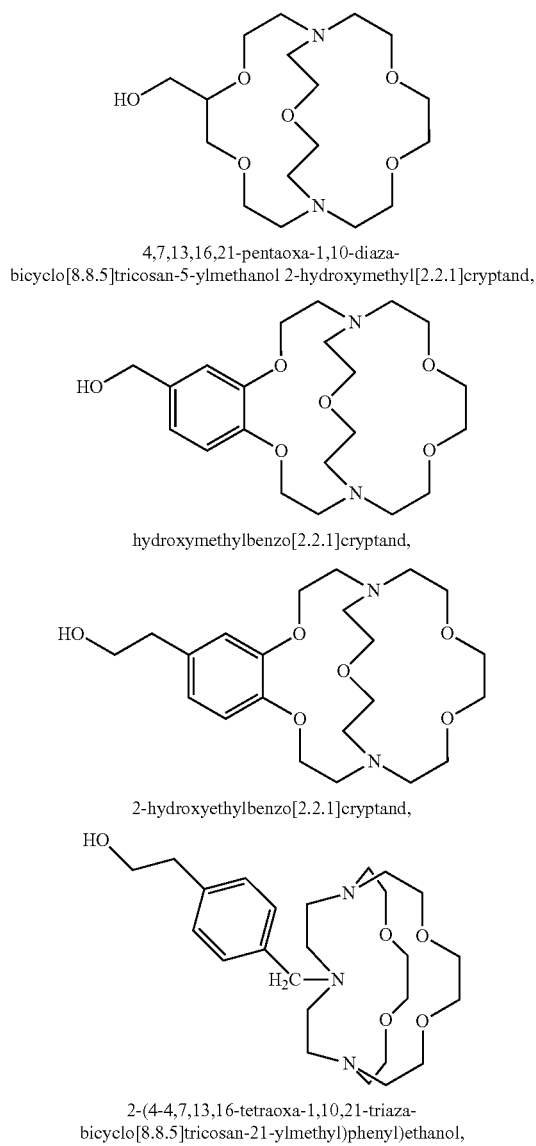

4,7,13,16,21-pentaoxa-1,10-diaza-
bicyclo[8.8.5]tricosan-5-ylmethanol 2-hydroxymethyl[2.2.1]cryptand, hydroxymethylbenzo[2.2.1]cryptand, 2-hydroxyethylbenzo[2.2.1]cryptand, 2-(4-4,7,13,16-tetraoxa-1,10,21-triaza-
bicyclo[8.8.5]tricosan-21-ylmethyl)phenyl)ethanol, and isomers thereof.

7. A lithium ion battery, comprising:

a positive electrode;

a negative electrode;

a microporous polymer separator soaked in an electrolyte solution, the microporous polymer separator disposed between the positive electrode and the negative electrode; and an ion exchange polymer material any of i) incorporated as a binder in any of the positive electrode or the negative electrode, ii) deposited onto a surface of any of the positive electrode or the negative electrode, iii) incorporated into the microporous polymer separator, or iv) deposited onto a surface of the microporous polymer separator;

wherein the ion exchange polymer material is i) a functionalized bead, or ii) a polymerized monomer reacted with any of:

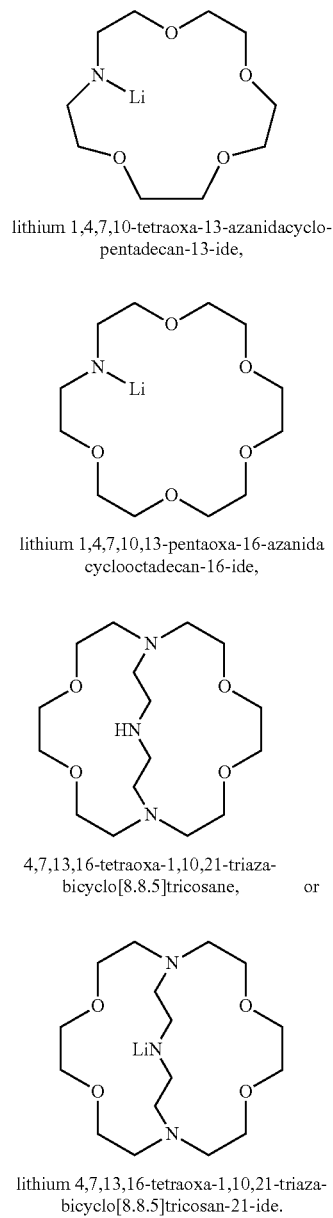

lithium 1,4,7,10-tetraoxa-13-azanidacyclo-
pentadecan-13-ide, lithium 1,4,7,10,13-pentaoxa-16-azanida
cyclooctadecan-16-ide, 4,7,13,16-tetraoxa-1,10,21-triaza-
bicyclo[8.8.5]tricosane,          or lithium 4,7,13,16-tetraoxa-1,10,21-triaza-
bicyclo[8.8.5]tricosan-21-ide.

8. The lithium ion battery as defined in claim 7 wherein the polymerized monomer is vinylbenzyl chloride.

9. A lithium ion battery, comprising:

a positive electrode;

a negative electrode;

a microporous polymer separator soaked in an electrolyte solution, the microporous polymer separator disposed between the positive electrode and the negative electrode; and an ion exchange polymer material any of i) incorporated as a binder in any of the positive electrode or the negative electrode, ii) deposited onto a surface of any of the positive electrode or the negative electrode, iii) incorporated into the microporous polymer separator, or iv) deposited onto a surface of the microporous polymer separator;

wherein the ion exchange polymer material is
and wherein R is selected from the group consisting of:
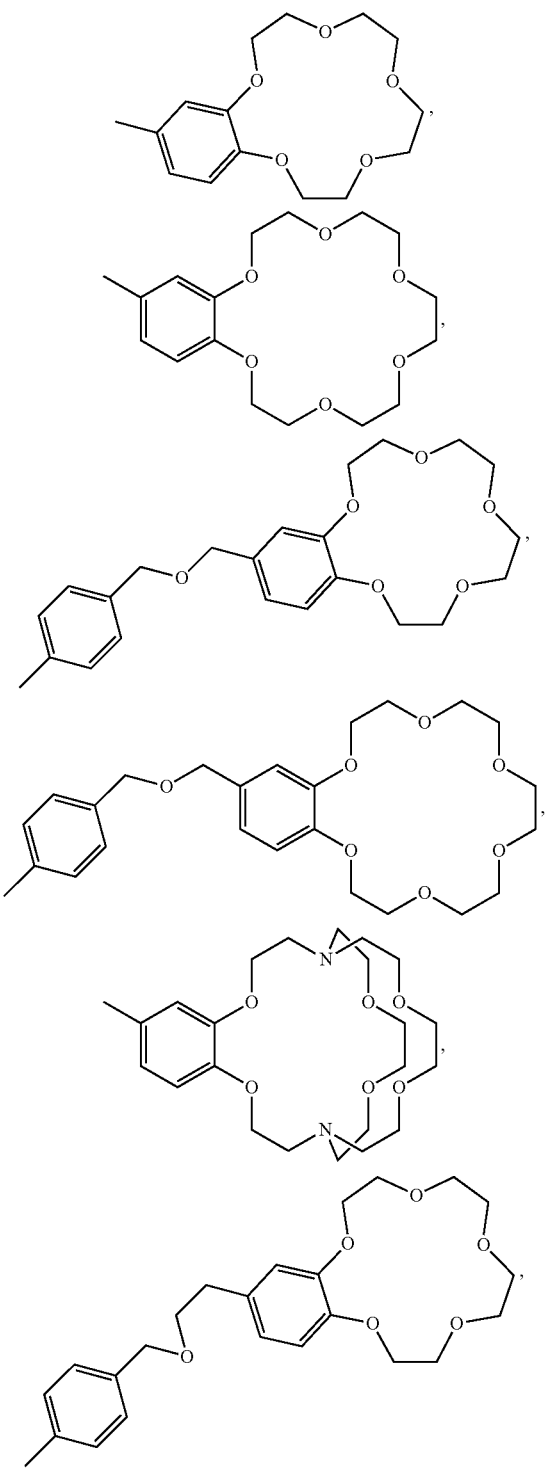
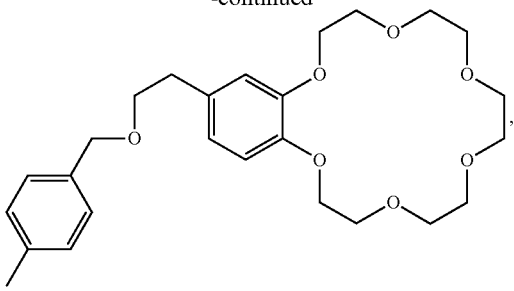

-continued

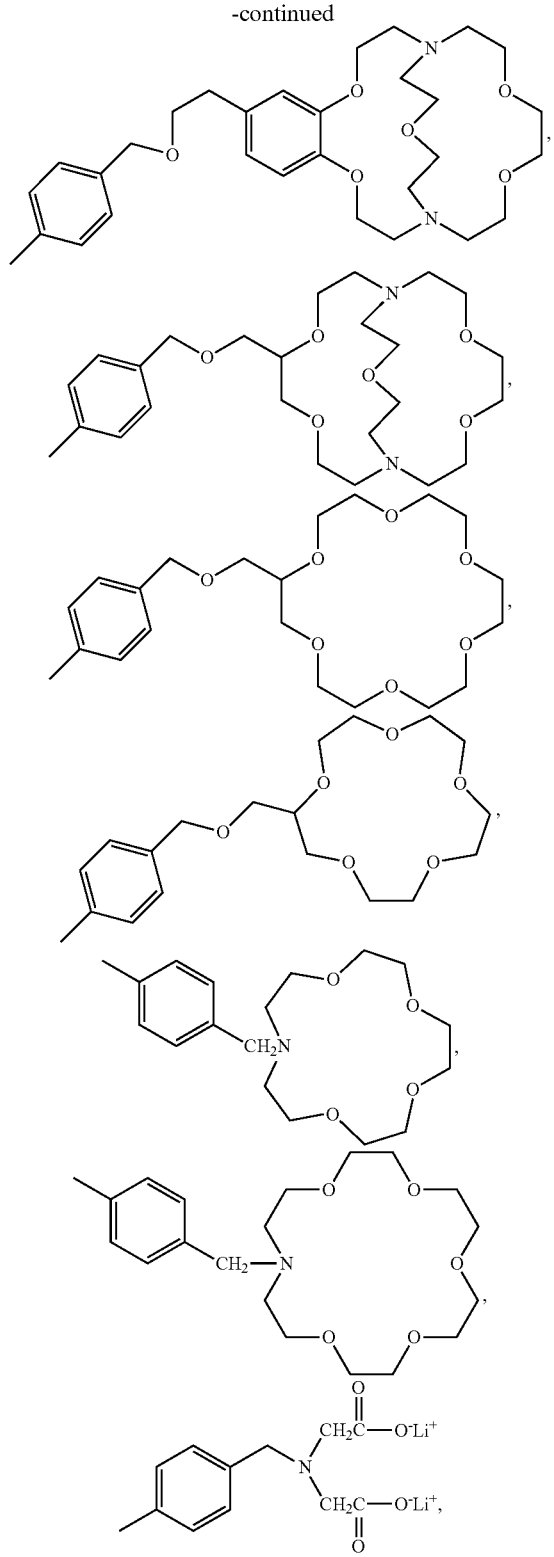

and isomers thereof.

10. A method of forming an ion exchange polymer material, comprising:

forming a crown ether or a cryptand, the crown ether or the cryptand having one of an OH group or an NH group; any of:

i) forming a polymer bead by emulsion polymerization of styrene and divinylbenzene; and then
functionalizing the polymer bead to attach a functional group selected from the group consisting of a halogen and an organic molecule including a halogen; or ii) forming a polymer bead and functionalizing the polymer bead in a single step, the forming and the functionalizing being accomplished by polymerizing styrene, divinylbenzene, and vinylbenzyl chloride to form the polymer bead having a functional group of $CH_2Cl$ attached thereto; or iii) forming a polymer bead and functionalizing the polymer bead in a single step, the forming and the functionalizing being accomplished by polymerizing divinylbenzene and vinylbenzyl chloride to form the polymer bead having a functional group of $CH_2Cl$ attached thereto; and replacing the functional group attached to the polymer bead with the crown ether or the cryptand, thereby forming the ion exchange polymer material having a pendant crown ether or a pendant cryptand.

11. The method as defined in claim 10 wherein the crown ether is

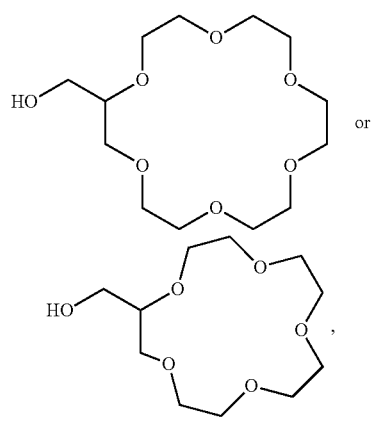

or the cryptand is

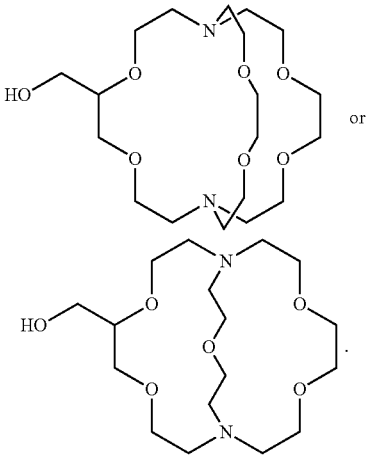

* * * * *